(12) United States Patent
Weidenbach et al.

(10) Patent No.: US 12,522,529 B2
(45) Date of Patent: Jan. 13, 2026

(54) DEVICES, SYSTEMS, AND METHODS FOR FLOATING ONBOARD RENEWABLE ENERGY-POWERED AERATION

(71) Applicant: Hawaii Fish Company Inc., Waialua, HI (US)

(72) Inventors: Ronald Paul Weidenbach, Waialua, HI (US); Robert George Marciel Izuta, Omaha, NE (US); Severine Marie-Pierre Busquet, Honolulu, HI (US); Mikia Lynn Weidenbach, Waialua, HI (US); Stewart Alexander DesMeules, Waialua, HI (US)

(73) Assignee: Hawaii Fish Company Inc., Waialua, HI (US)

( * ) Notice: Subject to any disclaimer, the term of this patent is extended or adjusted under 35 U.S.C. 154(b) by 0 days.

(21) Appl. No.: 19/022,119

(22) Filed: Jan. 15, 2025

(65) Prior Publication Data

US 2025/0289742 A1    Sep. 18, 2025

Related U.S. Application Data

(60) Provisional application No. 63/566,158, filed on Mar. 15, 2024.

(51) Int. Cl.
*C02F 7/00* (2006.01)
*B01F 23/23* (2022.01)
(Continued)

(52) U.S. Cl.
CPC .............. *C02F 7/00* (2013.01); *B01F 23/231* (2022.01); *B01F 23/2312* (2022.01);
(Continued)

(58) Field of Classification Search
CPC B01F 23/231; B01F 23/2311; B01F 23/2312; B01F 23/231265; B01F 23/231154
See application file for complete search history.

(56) References Cited

FOREIGN PATENT DOCUMENTS

| CN | 102092865 A | * | 6/2011 |
| CN | 206033386 U | * | 3/2017 |

(Continued)

*Primary Examiner* — Robert A Hopkins
(74) *Attorney, Agent, or Firm* — FRESH IP PLC; Clifford Hyra; Aubrey Chen

(57) ABSTRACT

Disclosed herein are devices, systems, and methods for water aeration and/or circulation, including, but not limited to, floating, onboard renewable energy-powered aeration for aquaculture ponds and/or other man-made and/or natural bodies of water (e.g., tanks, farm ponds, and reservoirs). In at least one embodiment, an aeration system has one or more photovoltaic (PV) panels to provide power to the aeration system. In at least one embodiment, the aeration system captures wind energy as an optional secondary power source. The aeration system may be either a battery-power or a direct-power system. The aeration system may also provide programmable settings. The system can be modular and scaled and/or customized to fit user needs. The aeration system may also include one or more float modules having an internal cavity, one or more pontoons and/or pontoon accessories for blocking and/or directing air and/or water flow, and/or one or more novel diffusers.

80 Claims, 51 Drawing Sheets

(51) Int. Cl.
*B01F 23/231* (2022.01)
*B63B 35/44* (2006.01)

(52) U.S. Cl.
CPC ...... *B01F 23/231262* (2022.01); *B63B 35/44* (2013.01); *B63B 2035/4453* (2013.01); *B63B 2035/446* (2013.01); *C02F 2201/008* (2013.01); *C02F 2201/009* (2013.01)

(56) References Cited

FOREIGN PATENT DOCUMENTS

| | | | | |
|---|---|---|---|---|
| CN | 209152024 | U | * | 7/2019 |
| CN | 212087665 | U | * | 12/2020 |
| DE | 202019103585 | U1 | * | 11/2020 |

* cited by examiner

DEVICES, SYSTEMS, AND METHODS FOR FLOATING ONBOARD RENEWABLE ENERGY-POWERED AERATION

CROSS-REFERENCE TO RELATED APPLICATION

This application claims priority to U.S. Provisional Application No. 63/566,158, filed Mar. 15, 2024, which is hereby incorporated by reference in its entirety.

STATEMENT REGARDING FEDERALLY SPONSORED RESEARCH OR DEVELOPMENT

This invention was made with government support under Contract DE-SC0021762 awarded by the U.S. Department of Energy. The government has certain rights in this invention.

FIELD

The disclosure relates generally to renewable energy-powered aeration and/or circulation devices, systems, and methods for use in aquaculture operations and/or in other man-made and/or natural bodies of water (e.g., tanks, farm ponds, reservoirs, and natural ponds, lakes, and estuaries). In particular, the disclosure relates to novel floating, onboard renewable energy-powered aeration and/or circulation that can be placed freely and/or autonomously in a water body with no required connection to the land.

BACKGROUND

Many artificial and/or man-made bodies of water, such as aquaculture ponds and reservoirs, require sufficient aeration and/or circulation in order to function appropriately. For instance, aquaculture ponds and tanks are widely used for growing fish and producing other aquaculture products. Dissolved oxygen (DO) is a critical water quality parameter; low DO levels are a leading cause of loss of fish and other aquaculture crops. Aeration can help to achieve targeted DO levels, as well as other water quality needs, that support fish and other aquaculture crops. In addition to meeting water quality targets, aeration and/or circulation can provide other benefits, including, but not limited to, prevention or disruption of water stratification and/or ice formation. Water stratification creates distinct layers in a water body that prevent the mixing of heat, carbon, oxygen, and other nutrients needed by organisms throughout the water column, which can lead to loss of aquatic life. Ice formation can also be detrimental to farming operations by preventing the degassing of noxious gases for fish and access to drinking water for livestock. However, the commonly used mechanical methods of aeration and/or circulation are often costly, both in terms of initial capital outlay and continued operating costs.

Further, aeration devices that are currently available rely on grid power or diesel generators to function, which increases reliance on fossil fuels and fossil fuel-generated electricity. Moreover, as the costs of such electric power increases, aeration devices and systems have become increasingly costly for users, including aquaculture producers and farmers. Large-scale aquaculture farms can spend up to 10% of their monthly operating costs on running their current aeration. Further, power grid and/or generator reliance ties these aeration devices to the land, which physically limits their placement in a water body and ease of relocating.

Existing aeration devices that use renewable energy are limited and all suffer from various drawbacks, including, for instance, being limited to shallow water depths, being relatively small in size and limited to small water bodies (e.g., backyard garden ponds), being tied to land-based renewable energy sources, being designed primarily for treating aesthetic needs rather than specific DO or other water quality requirements (e.g., improving water clarity in golf course ponds), and lacking the flexibility to scale and customize the system to accommodate diverse pond sizes and operation needs.

Aeration devices and systems that use renewable energy rather than costly diesel or grid-tied power can therefore be useful in reducing costs for aquaculture producers and other water body managers. Further, aeration systems with the renewable energy sources situated on the aeration system itself will not be physically tied to the land and can be placed in the pond to best complement other aeration infrastructure, to provide optimal aeration (e.g., placed above the optimal depths for the aeration technology), to complement activities within the water body (e.g., placed away from high-use areas and/or easily moved), and/or to best utilize solar and wind resources (e.g., to avoid shade). Further, renewable energy-based aeration systems with the ability to scale and customize component selection (e.g., compressor size and type) can take into account variables including but not limited to pond depth, pond size, seafood stocking density, and environmental conditions. Ponds that can be aerated using off-grid sources can also provide additional benefits such as energy independence for aquaculture producers and access to aeration for ponds in remote locations.

Farm ponds not used in aquaculture, including but not limited to livestock watering ponds and irrigation ponds, could also benefit from aeration devices and systems that use renewable energy to meet water quality targets (e.g., increase DO) and/or provide circulation. Aerating these ponds can provide additional benefits, such as, for instance, providing clean water, preventing winter ice formation in watering holes for livestock, increasing the fish stocking capacity of ponds to allow for aquaculture and/or recreational fishing, and the like. This can further reduce secondary costs or even provide a secondary revenue stream of seafood sales for producers or farmers.

Other man-made bodies of water, such as reservoirs, could also benefit from aeration devices and systems that use renewable energy to meet water quality targets (e.g., increase DO) and/or provide circulation. Such devices and systems could reduce the cost of supplying clean water to communities. Moreover, communities can use renewable energy-powered aeration systems to reduce their energy costs and their reliance on fossil fuels.

Natural bodies of water, including freshwater, saltwater, and brackish waters, could also benefit from aeration devices and systems that use renewable energy to meet water quality targets (e.g., increase DO) and/or provide circulation. In particular, natural waters impacted by physical, chemical, or biological changes, including but not limited to changes brought on by land use (e.g., agricultural or urban development) and/or changes in species composition or biodiversity (e.g., fish stocking for recreational fishing), may benefit from aeration devices or systems. For instance, aeration may prevent algae blooms by creating balanced water quality conditions or help to promote restoration through aerobic biodegradation of organic sediment build-up.

Renewable energy-powered aeration systems can also serve as complements to existing aeration devices by increasing DO levels throughout the day to reduce the need for aeration at night, by providing overall increased aeration capacity and water circulation, by aerating areas difficult to access with traditional aeration devices, by providing or complementing current backup aeration systems, and/or by helping off-set the costs of traditional grid- and/or generator-based aeration devices.

Given the foregoing, there exists a significant need for improved aeration devices, systems, and methods in aquaculture operations and/or in ponds, reservoirs, and other man-made and/or natural bodies of water. In particular, there exists a significant need for stand-alone and/or customizable floating aeration devices and systems powered by renewable-energy resources.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In certain embodiments, the disclosed embodiments may include one or more of the features described herein.

In general, the present disclosure is directed to devices, systems, and methods for water aeration and/or circulation, including, but not limited to, renewable energy-powered aeration and/or circulation for aquaculture ponds/tanks and/or other water bodies (e.g., farm ponds, such as livestock watering ponds and irrigation ponds, and reservoirs). In particular, novel floating, onboard renewable energy-powered devices, systems, and methods are disclosed that provide dissolved oxygen (DO), which is critical for the survival and/or production of seafood and/or seaweed.

The term "aquaculture operations," at least as used herein, refers to any controlled cultivation of aquatic organisms. Such operations take place both in natural bodies of water (e.g., natural ponds, lakes, estuaries, and the like) and man-made bodies of water (e.g., tanks, ponds, reservoirs, and the like). In particular, aquaculture operations can include aeration and/or circulation of water (e.g., for the benefit of wildlife, such as fish, that either naturally occur in the body of water and/or have been stocked in the body of water for recreational purposes). Thus, aquaculture operations are not limited to bodies of water such as specifically-designed or specifically-constructed aquaculture ponds or aquaculture tanks.

The terms "body of water" or "water body," which are used interchangeably herein, refer to any accumulation of water, including, but not limited to, water accumulating or accumulated in a structure such as a tank or container. A body of water may, but need not be, still or contained; thus, rivers, streams, canals, and the like are "bodies of water." Additionally, a body of water may, but need not be, naturally occurring geographical features, as described above herein. Further, a body of water need not have any specific water depth. Thus, the term "water body manager" refers to an individual who manages, either in whole or in part, one or more aspects and/or functions of the body of water or any operations (including, for instance, aquaculture operations) related to the body of water.

The term "seafood," at least as used herein, includes various life forms that live in water for at least some portion of their life span, non-limiting examples of which include fish, invertebrates, algae, plants, and the like.

In at least one embodiment, an aeration system is disclosed that comprises one or more photovoltaic (PV) panels, which may be attached and/or connected to (e.g., via one or more mountings) one or more floats and/or floatation modules that sit directly on the surface of the water (e.g., of a pond or tank). These PV panels can be a primary or sole power source for the aeration system.

In at least one embodiment, the PV panels are supplemented by an additional renewable energy capture device or system (e.g., one or more wind turbines, which may also be attached and/or connected to one or more floats and/or floatation modules). Thus, the aeration system, in at least one embodiment, captures wind energy as an optional secondary power source in locations with favorable wind conditions.

In at least one embodiment, the aeration system is fully autonomous, with the PV panels and/or wind turbines provided onboard the aeration system, and no power connection to the land or shore. These floating aeration systems are unique in that they are fully autonomous, with the PV panels and/or wind turbine provided onboard the systems and no required power connection to the land. However, in at least one example, the floating aeration system is fully autonomous, but also has an optional power connection to land for supplementing the onboard power sources.

In at least one embodiment, the aeration system comprises three subsystems: (1) one or more power subsystems, (2) one or more aeration subsystems, and (3) one or more floatation subsystems. In at least one example, the power subsystem comprises one or more PV panels and/or wind turbines mounted on a float, as well as one or more compressors and auxiliary equipment (e.g., electrical controls, sensors, and ventilation and safety equipment) housed within an internal cavity of or mounted to the float. The power subsystem may also comprise an optional battery storage system (BSS) that may be charged by the renewable energy resource (e.g., PV panels and/or wind turbines) and can be used to power the device's compressor(s) and auxiliary equipment. The power subsystem's auxiliary equipment includes, but is not limited to, the Data Acquisition and Control System (DACS), indicator equipment such as lights, safety equipment such as a Surge Protection Device (SPD), and/or ventilation equipment such as cooling fans, which may be located inside the internal cavity or mounted on the float. The power subsystem may also power a secondary load, including, but not limited to, additional compressor(s), sump pump(s), heating element(s), bird deterrent(s), automatic feeder(s), water quality sensor(s), and/or solar panel cleaning device(s). In at least one example, the aeration subsystem contains one or more air compressor(s), air compressor manifold, pressure sensor(s), relief valve(s), and air hose(s) housed within an internal cavity of the float or mounted to the float and one or more air hose(s), check valve(s), and diffuser(s) suspended from the float in the water below. The aeration subsystem may include one or more custom diffusers(s) designed to be suspended in the water column at flexible water depths and to self-level to achieve optimum aeration capacity. In at least one example, the floatation subsystem comprises one or more floats and/or floatation modules that float in the water and support one or more other components or portions of the aeration system (e.g., one or more PV panels, one or more wind turbines, etc.). In at least one example, a single float module may be comprised of a single housing or exterior/external structure or multiple instances of housing or exterior/external structures that fit together. Regardless of whether a single float module is comprised of a single housing or multiple instances of housing, a float module may, in at least one example, be comprised of a float cover that fits on top of, and is secured to, a float bottom to form an internal cavity where the float cover is above the water and the float bottom is partially submerged within the water. These float modules can connect to additional float modules to customize the size and configuration of the aeration system. The float module may also have unique form features, as described further below herein, to support the function of the aeration system.

In at least one embodiment, the aeration system is modular and/or scalable to match the water body size, seafood and/or seaweed stocking density, and/or aeration needs of a user (e.g., a farmer or water body manager). The number of floats and/or floatation devices, and the type and number of associated compressors, diffusers, PV panels, wind turbines, and/or batteries can be adjusted. For instance, a first floatation module may contain power and/or aeration subsystems comprising a single PV panel, an air compressor, submerged diffusers, a BSS with multiple deep cycle batteries, and the electronic system. Additional floating modules with only PV panels, wind turbines, and/or batteries could then be attached to this first floatation module to create a larger array with greater available power and aeration capacity. In at least one example, the floatation modules are configured to be nested within each other for ease of shipping and storage. In at least one example, the weight of the batteries can serve as ballast for one or more floatation modules (e.g., depending on selected battery storage capacity and the weight of such batteries).

In at least one embodiment, the aeration system is a battery-power system (e.g., via a battery-power power subsystem) where the renewable energy resource(s) (e.g., PV panels and/or wind turbines) charge a BSS in addition to powering the compressor(s) and auxiliary equipment. The stored energy in the BSS enables the aeration system to run even when there are no, or limited, available solar and/or wind resources (e.g. at night) and to have set operation times/modes.

In at least one embodiment, the aeration system is a direct-power system (e.g., via a direct-power power subsystem) with no BSS, where one or more compressors are powered directly by a direct renewable energy source, e.g., solar and/or wind power. The solar and/or wind resource also powers the auxiliaries and a small uninterruptible power supply (UPS) or other method of ensuring the continuous operation of the control system and therefore the larger aeration system.

In at least one embodiment, one or more bottom surfaces of the one or more float bottoms are configured to prevent entrapment of rising diffused air bubbles underneath the float and to disperse air bubbles laterally in all directions from the center. In at least one example, this is achieved by a unique bottom construction that disperses the aeration bubbles and current flow radially out from the aeration system. A smooth bottom profile also allows nets or other tools (e.g., seine nets) to be pulled or moved underneath the aeration system without snagging. In at least one example, the bottom also has unique shapes and/or form factors (e.g., tabs, indentations, holes, guides, etc.) for various functions including, but not limited to, providing a watertight seal with the float cover, denoting the water line, placement of turbine mast, and/or placement of bolts or rivets, anchoring and/or tethering of the aeration system, mounting the PV panels, wind turbine stays, pontoons, grounding plates and/or internal surfaces, connecting to other float modules, providing relief contours to reduce the stress on the air hoses, providing ventilation, providing access to the internal cavity, positioning and securing internal components, and enabling nestable shipping.

In at least one embodiment, the aeration system comprises one or more covers that, along with a float bottom, form a single float module. The renewable energy source, sensitive electronics, batteries, compressors, and/or other components may be mounted on the float module and/or disposed within an internal cavity. The covers therefore prevent water ingress into the floatation modules and any resulting damage to the power and/or aeration subsystems that may be housed within the internal cavity. In at least one example, at least a portion of the cover is raised and sloped and can have a height of, for instance, about 7 to 12 inches above the float bottom. In at least one example, the cover also has unique shapes and/or form factors (e.g., sloped surfaces, tabs, indentations, holes, guides etc.) for various functions including, but not limited to, providing a watertight seal with the float bottom, shedding water and/or snow, denoting the placement of bolts, anchoring and/or tethering of the aeration system, mounting the PV panels, wind turbine stays, and/or pontoons, connecting to other float modules, providing relief contours to reduce the stress on the air hoses, allowing for water-tight exiting of power cables and/or air hoses, and enabling nestable shipping. In at least one example, the cover meets an ingress protection rating (IP) of IP22 for solid object protection from objects larger than a finger and liquid protection from water sprayed at an angle of greater than 15° from the vertical position and water splashing against the cover. In at least one example, the cover can further comprise one or more openings that may be partially or fully covered to (1) allow protected air ingress, (2) allow egress to vent one or more portions of the power subsystem and/or aeration subsystem, (3) support the mounting of a wind turbine mast, and/or (4) allow access to inside the cavity (e.g., through a hatch or removeable panel). In at least one example, one or more PV panels are disposed above and/or on top of the cover (e.g., one or more PV panels may be flush against the cover). In at least one example, there is an air gap in between the PV panel and the cover to reduce wind resistance.

In at least one embodiment, the aeration system comprises one or more pontoons and/or pontoon accessories. The pontoons can (1) increase load capacity and/or stability, (2) block aeration and/or current flow (e.g., potentially erosive water flow), and/or (3) direct aeration and/or current flow (e.g., potentially erosive water flow). In at least one example, the pontoons comprise one or more fins that sit below the surface of the water and block and/or direct aeration flow from under the aeration system. Multiple pontoons can be placed in various combinations around the perimeter of the aeration system (e.g., around the perimeter of one or more floats) to direct the rising air bubbles and resultant water currents in one or more particular directions.

In at least one embodiment, the aeration system comprises a power subsystem with electronic controls that have one or more customizable settings, including, for instance, different programmable operation modes (e.g., daytime operation, nighttime operation, prioritizing continuous operation of the compressor(s), prioritizing battery charge etc.), run times that can be established by a user (e.g., setting a start and end time and/or a duration), and/or established thresholds (e.g., DO level) measured by the system itself or communicated from external devices (e.g., existing DO monitors and/or aeration devices used by the water body manager) that can adjust the system's operation (e.g., turn the system on or off). In at least one embodiment, the system's program and/or data can be accessed through a wired connection and/or remotely via a remote or wireless connection (e.g., through a wireless communication device or cellular network), and adjusted and/or downloaded through a human-machine interface (HMI) on a computing device and/or a control panel. The accession of the system's program and/or data, as well as the aforementioned HMI, will be described in further detail below herein. In at least one example, the power subsystem is a battery-power subsystem. In at least another example, the power subsystem is a direct-power subsystem.

In at least one embodiment, the aeration system comprises a power subsystem with electronics that may vary the level of power to the air compressor(s) in proportion to another set or measured parameter. In at least one example, this parameter may be in proportion to the solar and/or wind availability and/or corresponding battery charge and/or voltage. In at least one example, such varying the level of power is accomplished using a signal relay, Pulse Width Modulation (PWM) signal, controller, and/or Variable Frequency Drive (VFD) to manage the power to the compressor(s) based on the level of battery charge and/or voltage and/or solar radiation. In at least one embodiment, a custom control board is used to manage the VFD.

In at least one embodiment, the aeration system comprises an aeration subsystem with one or more compressors (e.g., AC/DC compressors, piston compressors, linear piston compressors, etc.), one or more manifolds, one or more pressure valves, one or more pressure sensors, one or more check valves, one or more flexible air hoses (e.g., one or more weighted and/or UV-stabilized output hoses), and one or more diffuser devices. In at least one example, the one or more check valves prevent water and/or air from being pushed back into the one or more air hoses and/or compressors. This may occur if, for instance, the compressor or compressors are turned off, lose power, and/or otherwise fail to operate and produce compressed air. Such backflow could result in entry of water into the air hose and/or compressor (s), potentially damaging the one or more compressors and, in freezing wintertime conditions, potentially resulting in the intruding water freezing and rupturing the air hose(s). In at least one example, the one or more pressure relief valves present on the manifold to the compressor release excess pressure that may occur if the diffusers are placed at a depth that is greater than the operating pressure limit for a given compressor, which could potentially damage the compressor.

In at least one embodiment, the aeration system, or one or more subsystems thereof (e.g., an aeration subsystem), comprises one or more novel diffuser device(s) uniquely designed to be suspended in a water column at flexible water depths. All diffuser elements should ordinarily be maintained at the same depth or water pressure in order to maintain equally distributed air flow for optimal aeration. Many existing diffusers accomplish this by resting the diffuser on the ground, which limits the placement of the diffuser in the water body (e.g., to level ground and/or where the ground is at the appropriate depth for the compressor) and can lead to problems, including, but not limited to, diffuser fouling and ground erosion. The novel diffuser(s) can be suspended in a water column at flexible water depths corresponding to the selected compressor's optimal performance specifications due to its ability to self-level and easily adjust to the compressor's airflow capacity. In at least one example, the diffuser achieves self-leveling through a combination of various features, including, but not limited to: (1) the weight of the weighted tube and terminal components that establish the vertical orientation, and (2) connecting the horizontally positioned manifold to a vertical, stiff weighted tube or rigid pipe to maintain a plumb angle. In addition, the novel diffuser can accommodate the differing airflow requirements of different depths by adjusting the total length of diffuser tubing segments connected to the diffuser manifold.

In at least one embodiment, the aeration system has one or more of the following features: (1) the ability to select specific levels and water depths of aeration, number and/or type of compressor, number and/or type of diffuser, number of PV panels, number of modules (e.g., floatation modules), and/or battery storage capacity, as needed for a specific water body size (e.g., depth, acres), environment (e.g., latitude and seasons), and/or operational requirements (e.g., seafood stocking density), (2) one or more optional wind turbines as an additional power source, (3) sub-surface aeration from submerged diffuser(s) (as opposed to traditional surface aerators), which may utilize custom diffuser(s) that self-level and can be adjusted to various water depths (as opposed to traditional diffusers that rest on the ground), (4) unique shapes and/or form factors (e.g., depressions, holes, etc.) for air bubble and/or water current dispersal, ventilation, access to the internal cavity, water-tight fit between cover and bottom, anchoring and/or tethering, mounting of the PV panels, wind turbines, and/or pontoons, prevention of stress on air hoses, and connecting other floatation modules, as well as for nestable shipping, (5) a power subsystem that is powered directly by the renewable energy source (e.g. a direct-solar system) or that is powered by a battery storage system that is charged by the renewable energy source, (6) a power subsystem with programmable parameters for aeration operation, including periodic, continuous, and/or variable run-times and/or modes that may be specified by time of day and/or duration, various levels of power to the compressor, various levels of minimum charge to the battery, various levels of solar/wind availability and/or various levels of water quality parameters, such as DO, (7) a power subsystem with remote access and control options (e.g., via wireless or cellular networks) and/or the ability to communicate with other external devices (e.g., DO monitors and other aeration devices), (8) a power subsystem that can adjust its power to the air compressor in proportion to a set or measured parameter such as, for instance, the battery voltage, battery charge, and/or available solar and/or wind energy (rather than typical on-or-off operation at a set power level), (9) being fully self-contained and mobile to be optimally placed for aeration/circulation and/or to avoid interference with other equipment (e.g., harvesting nets or tools), (10) light emitting diode (LED) lights or other visual indicators or signals to indicate when the system is operating (e.g., green light) and when the system is off (e.g., red light), thereby enabling visual shore-based determination of operating status and/or physical location of the system, even in low-light or nighttime conditions, (11) lightning strike protection components to help minimize lightning strike damage, and (12) one or more pontoons and/or pontoon accessories to enhance system stability, block aeration and/or current flow, and/or direct aeration and/or current flow.

Therefore, based on the foregoing and continuing description, the subject invention in its various embodiments may comprise one or more of the following features in any non-mutually-exclusive combination:

An aeration system comprising one or more float modules having one or more pieces that fit together to form an internal cavity, one or more diffusers that aerate and circulate water around the one or more float modules, and one or more photovoltaic (PV) panels on the one or more float modules that provide solar energy to power the aeration system;

The aeration system further comprising one or more connections to a land-based power source;

The one or more pieces comprising one or more float covers and one or more float bottoms;

Each of the one or more float covers being attached to the one or more float bottoms to form the internal cavity;

The aeration system floating entirely in the water;

The aeration system being autonomous such that the aeration system is operational without any connection to land;

The aeration system being modular such that a size of the aeration system can be increased or decreased based on one or more operational requirements;

The one or more float modules being sized to fit on a standard pallet;

The one or more pieces being stackable and/or nestable within each other;

The one or more float modules comprising one or more surfaces that are sloped toward one or more outer edges of the one or more float modules;

The aeration system comprising a plurality of tabs disposed on one or more surfaces of the one or more float modules;

The plurality of tabs comprising at least a first tab that is level with respect to the one or more surfaces;

The plurality of tabs comprising at least a second tab that is raised with respect to the one or more surfaces;

The plurality of tabs being configured for installation of one or more external components;

The aeration system comprising one or more contours disposed along one or more outer perimeters of the aeration system;

The one or more contours corresponding with placement of one or more air hoses to prevent pinching of the one or more air hoses when the one or more air hoses are suspended in the water;

The aeration system comprising one or more outer perimeters of the one or more float modules on which one or more connectors are disposed;

The one or more connectors attaching the one or more float modules to each other;

The aeration system comprising one or more tabs within the internal cavity to mount a surface for placement of one or more internal components;

The one or more float covers having a shape that corresponds to, and fits with, a shape of the one or more float bottoms, thereby generating a water-tight seal between the one or more float covers and the one or more float bottoms;

The one or more float bottoms having an edge that is raised above a contact surface with a perimeter of the one or more float covers, thereby preventing intrusion of the water into the internal cavity;

The aeration system comprising an indicator that corresponds to a pre-determined water line when the one or more float modules are placed in the water;

The one or more float covers having a raised portion to increase a size of the internal cavity;

The one or more float covers having one or more sloped surfaces;

The one or more sloped surfaces being disposed vertically underneath the one or more PV panels such that one or more empty spaces exist between the one or more sloped surfaces and the one or more PV panels;

The one or more empty spaces enabling wind to flow through the one or more empty spaces, thereby reducing wind resistance of the aeration system;

The one or more float covers having one or more covered openings;

The one or more covered openings providing access to the internal cavity;

The one or more float covers having one or more depressions disposed on one or more surfaces of the one or more float covers;

One or more holes being cut into the one or more depressions;

The one or more holes receiving one or more components;

The one or more components comprising ventilation components and/or power components;

One or more PV panels being disposed on a top surface of the one or more float covers;

The aeration system comprising one or more air compressors;

The one or more air compressors being disposed within internal cavities of the one or more float modules;

The one or more air compressors comprising different types of compressors;

The aeration system comprising one or more pontoons that increase load capacity and/or stability of the aeration system;

The one or more pontoons comprising one or more fins for blocking and/or directing aeration flow from underneath a bottom surface of the aeration system;

The one or more pontoons being rotatable to alter directional flow of the water;

The alteration of directional flow comprising blocking a flow of the water, allowing a flow of the water, and/or directing a flow of the water;

The aeration system comprising a plurality of areas for receiving one or more attachments to secure one or more pontoons to the one or more float modules;

The plurality of areas comprising at least one area that is level with respect to one or more surfaces on the one or more float modules;

The plurality of areas comprising at least one area that is raised with respect to the one or more surfaces;

The aeration system comprising one or more indentations in a perimeter area of the one or more float modules;

The one or more indentations being configured to attach to one or more pontoons;

The aeration system comprising one or more diffuser aerators that are adjustable, thereby allowing aeration to be adjusted based on aeration capacity of a body of water in which the aeration system is disposed;

The aeration system comprising a diffuser device that is self-leveling at a mid-water depth in-between a surface of a body of water and a bottom of the body of water;

The diffuser device comprising a manifold, a plurality of diffuser segments, and a tube;

The manifold being connected to (i) the plurality of diffuser segments, and (ii) the tube;

The tube being a vertical weighted or rigid tube;

The diffuser device comprising a base plate attached underneath the plurality of diffuser segments, thereby preventing erosion beneath the diffuser device;

The diffuser device comprising a valve configured to (i) allow air to flow to the diffuser device, and (ii) prevent the water from flowing into the diffuser device;

The manifold and the plurality of diffuser segments being arranged in a horizontal plane that is perpendicular to the tube;

The diffuser device being attached to a weighted air hose, thereby maintaining a vertical orientation in the water;

The plurality of diffuser segments being adjustable in length;

The one or more float modules comprising one or more bottom surfaces that disperse air bubbles and water flow around the one or more float modules;

The one or more bottom surfaces dispersing the air bubbles laterally to increase an amount of air bubble-to-water contact time, resulting in an increased transfer of oxygen into a body of water;

The one or more bottom surfaces further distributing the air bubbles to prevent the air bubbles from collecting in pockets underneath the one or more float modules;

The one or more bottom surfaces further directing the air bubbles towards one or more pontoons disposed around one or more edges of the one or more float modules;

The one or more bottom surfaces having a smooth profile to minimize interference with one or more other pieces of equipment;

The aeration system comprising one or more indentations on the one or more bottom surfaces for attaching a ground plate for protection against lightning strikes;

The aeration system comprising one or more electronic systems with a plurality of programmable settings;

The plurality of programmable settings comprising data acquisition settings and operation settings;

The one or more electronic systems being accessible to adjust data, view data, and/or download data;

The one or more electronic systems being accessible via a wireless connection;

The one or more electronic systems being accessible via a wired connection connected to one or more ports on the one or more float modules;

The aeration system comprising a human-machine interface (HMI) accessible through one or more computing devices and/or one or more control panels disposed on the one or more float modules;

The operation settings comprising a start time and an end time for powering one or more compressors;

The operation settings comprising a time duration for powering one or more compressors;

The operation settings comprising selection of a distribution of power between charging one or more batteries and powering one or more loads;

The operation settings comprising a mode that runs the aeration system only when dissolved oxygen in the water reaches a pre-determined level;

The aeration system comprising one or more batteries;

The operation settings comprising a mode that runs the aeration system only when the one or more batteries reaches one or more pre-determined charge and/or voltage levels;

The operation settings comprising a mode that runs the aeration system only when available renewable energy reaches one or more pre-determined levels;

The operation settings comprising (i) a first mode that prioritizes charging the one or more batteries over powering one or more compressors up to a set battery voltage level and/or a set battery charge level, (ii) a second mode that splits available power between charging the one or more batteries and powering the one or more compressors, and/or (iii) a third mode that prioritizes powering the one or more compressors to maximize aeration over charging the one or more batteries;

The aeration comprising one or more measuring device(s);

The one or more measuring device(s) comprising a dissolved oxygen measuring device to determine when dissolved oxygen in the water reaches a pre-determined level, a device to measure battery voltage, current, temperature, and/or charge, a device to measure air pressure, a device to measure temperature, a device to measure solar radiation, and/or a device to measure wind strength and/or direction;

The one or more measuring device(s) being sensors;

The operation settings comprising a mode that provides additional power to a compressor beyond a predetermined power level, and/or powers the compressor outside of a predetermined time period, when a battery has a charge greater than a predetermined charge level;

The one or more electronic systems being configured to communicate with one or more external dissolved oxygen sensors, thereby determining when dissolved oxygen in the water reaches a pre-determined level;

The one or more electronic systems being configured to communicate with one or more external aeration systems, thereby coordinating operation of the aeration system with the one or more external aeration systems;

The aeration system comprising a power subsystem;

The power subsystem being configured to run one or more air compressors at variable power in proportion to one or more pre-defined parameters;

The one or more pre-defined parameters comprising an available amount of the renewable energy, battery charge, and/or battery voltage;

The aeration system comprising one or more batteries to (i) store the renewable energy, and/or (ii) power the aeration system;

The aeration system (i) not containing a battery-powered energy source for operating one or more compressors, and/or (ii) being powered directly by the renewable energy;

The aeration system comprising one or more wind turbines to provide wind energy to power the aeration system;

The one or more wind turbines being mounted on the one or more float modules;

The aeration system comprising one or more batteries, one or more primary compressor loads, and one or more secondary loads that are powered with excess power not required to (i) operate the one or more primary compressor loads, and/or (ii) charge the one or more batteries;

The one or more secondary loads comprising one or more heating elements to heat the one or more PV panels, one or more pumps to remove water from the internal cavity and/or a surface of the one or more float modules, one or more bird deterrents, one or more solar panel cleaning devices, one or more water quality sensors, one or more additional compressors, and/or one or more automatic feeders;

The one or more secondary loads comprising one or more power outlets;

The aeration system comprising a lightning protection system;

The lightning protection system comprising a ground plate submerged beneath a surface of the water;

The aeration system comprising a plurality of lights configured to indicate operational status and/or physical location of the aeration system;

The plurality of lights comprising one or more light-emitting diode (LED) lights;

The aeration system comprising one or more bird deterrents mounted to the one or more float modules;

The one or more pieces comprising one or more double-walled float bottoms;

The one or more double-walled float bottoms comprising an exterior wall and an interior wall;

The interior wall surrounding at least a portion of an interior cavity;

The interior wall comprising a floor on which rest one or more components disposed within the interior cavity;

The floor comprising (i) one or more partitions for positioning one or more of the one or more components, and/or (ii) one or more depressions in which at least one of the one or more components is disposed;

The exterior wall and the interior wall being separated by a space that is compartmentalized to contain and isolate any water that enters into the space; and The exterior wall being shaped so as to disperse (i) air bubbles in the water from an underside of the exterior wall, and (ii) flow of the water from the underside of the exterior wall.

Each of the one or more float modules having one or more holes along a perimeter thereof (e.g. in a float bottom and/or float cover perimeter) for attaching an anchoring or tethering system (e.g. tie ropes to tether to the land, stick a pole through to anchor into mud, tie a chain and anchor to etc.) and/or for securing together two or more of the one or more float modules (e.g. rather than or in addition to bolting them together with metal connectors, linking them together at these holes with corresponding peg structures or just using the holes for attaching connectors).

These and further objects and features of the invention are apparent in the disclosure, which includes the above and ongoing written specification, as well as the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. The invention will be more particularly described in conjunction with the following drawings wherein.

DETAILED DESCRIPTION

Figure 1:
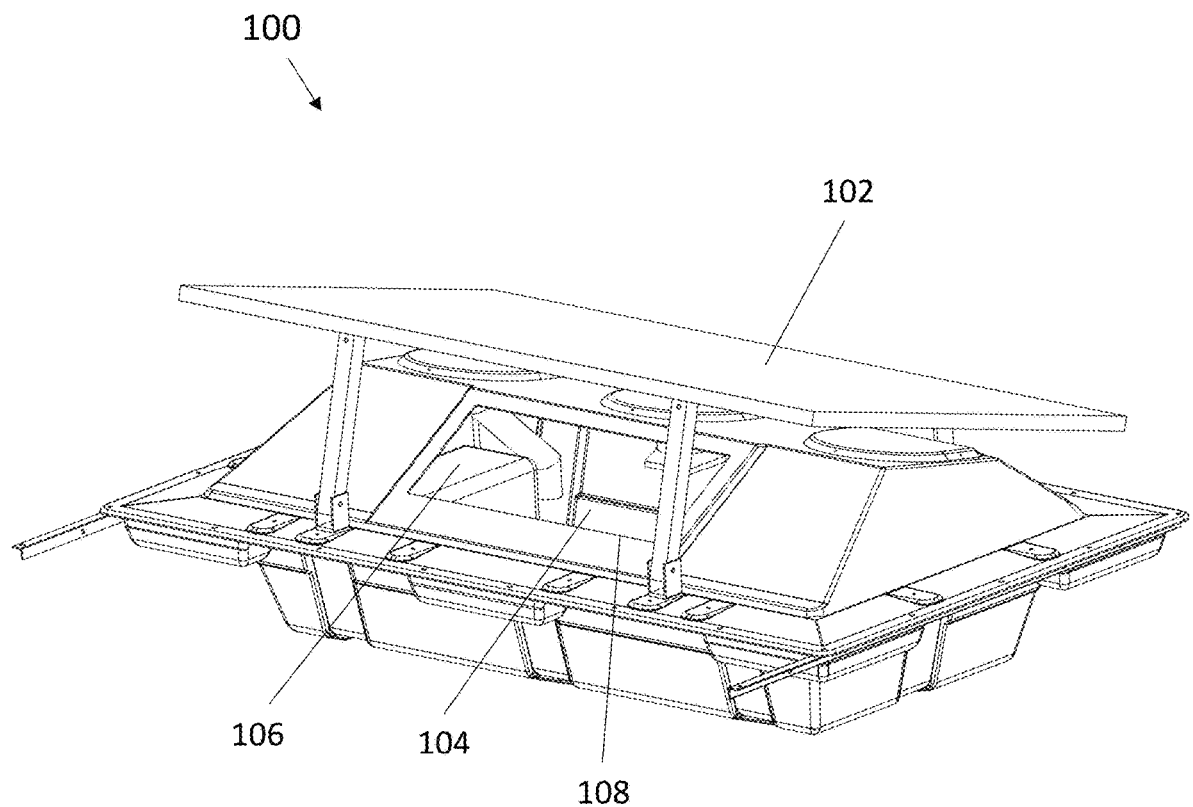
FIG. 1 shows a float and/or floatation module, according to at least one embodiment of the present disclosure.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, "at least one of A, B, and C" indicates A or B or C or any combination thereof. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

As used herein, ranges are used herein in shorthand, so as to avoid having to list and describe each and every value within the range. Any appropriate value within the range can be selected, where appropriate, as the upper value, lower value, or the terminus of the range.

"About" means a referenced numeric indication plus or minus 10% of that referenced numeric indication. For example, the term "about 4" would include a range of 3.6 to 4.4. All numbers expressing quantities of ingredients, reaction conditions, and so forth used in the specification are to be understood as being modified in all instances by the term "about." Accordingly, unless indicated to the contrary, the numerical parameters set forth herein are approximations that can vary depending upon the desired properties sought to be obtained. At the very least, and not as an attempt to limit the application of the doctrine of equivalents to the scope of any claims, each numerical parameter should be construed in light of the number of significant digits and ordinary rounding approaches.

The words "comprise," "comprises," and "comprising" are to be interpreted inclusively rather than exclusively. Likewise, the terms "include," "including," and "or" should all be construed to be inclusive, unless such a construction is clearly prohibited from the context. The terms "comprising" or "including" are intended to include embodiments encompassed by the terms "consisting essentially of" and "consisting of." Similarly, the term "consisting essentially of" is intended to include embodiments encompassed by the term "consisting of." Although having distinct meanings, the terms "comprising," "having," "containing," and "consisting of" may be replaced with one another throughout the description of the invention.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Wherever the phrase "for example," "such as," "including" and the like are used herein, the phrase "and without limitation" is understood to follow unless explicitly stated otherwise.

"Typically" or "optionally" means that the subsequently described event or circumstance may or may not occur, and that the description includes instances where said event or circumstance occurs and instances where it does not.

Generally, the present disclosure is directed towards devices, systems, and methods for aeration and/or circulation of man-made and/or natural water bodies, including renewable energy-powered aeration and/or circulation. In particular, the disclosure is directed to novel floating, onboard renewable energy-powered aeration of aquaculture ponds/tanks (e.g., to provide aeration to support fish survival), farm ponds (e.g., to provide aeration in off-grid livestock watering or irrigation ponds), reservoirs (e.g., to provide aeration in reservoirs that have water quality issues that pose health and/or aesthetic concerns), natural waters (e.g., to support restoration of waters impacted by human activities), and/or other water bodies.

In at least one embodiment, floating aeration systems and/or subsystems are disclosed that provide necessary dissolved oxygen for the survival and production of seafood and/or seaweed in the aquaculture and farm ponds and reservoirs. The floating aeration systems and/or subsystems described herein have numerous advantages over (1) existing floating aerators, which are typically used for smaller applications, tied to the land, and/or lack the desirable features detailed herein, (2) existing aerators that must be connected to a power grid and rely on such a grid for electricity, and/or (3) existing aerators that are dependent on fossil fuels for electric power.

Aeration Systems

In at least one embodiment of the present disclosure, an aeration system is disclosed that is compatible with one or more different compressors (e.g., AC/DC and different aeration capacity), and/or to be modular to accommodate the size and needs of different water bodies (e.g., different aquaculture pond and/or tank depths, fish stocking density, existing aeration etc.).

In at least one embodiment, an aeration system comprises one or more float modules, at least one of these one or more float modules being powered by one or more renewable energy power sources. A "float module" is generally a float, which may have additional components mounted to the float or contained within the float, the module being configured to float on the surface of water and to connect to identical or similar float modules, for example by having connection points such as tabs, flat surfaces, and holes (e.g., for securing float modules to each other and/or anchoring or tethering such modules) around its perimeter where connectors can attach. It should be understood that in various disclosed embodiments comprising one or more attached float modules, the invention also encompasses embodiments in which float modules are replaced by a unitary float structure, i.e. not having modules that are configured to removably attach to other such modules. A single float module may be comprised of a single piece or multiple pieces that fit together or are otherwise connectable. In at least one embodiment, a single float module may consist of a float cover that fits on top of and is secured to a float bottom where the float cover is normally above the water and the float bottom is at least partially submerged within the water. The connected float cover and bottom form an internal cavity.

The float module or one or more pieces that comprise the float module may be manufactured as a single-wall or double-wall piece, which may be accomplished through manufacturing process including, but not limited to, single sheet thermoforming and/or twin sheet thermoforming (e.g., as shown in FIGS. 6A-6G). In at least one embodiment, a twin-sheet module (e.g., made from twin sheet thermoforming) provides for a double-walled bottom that is an additional barrier against water entering the interior of the module, including, but not limited to, an interior cavity (which may, in at least one example, contain one or more components, including electrical components, disposed within the cavity). Further, an interior wall of the double-walled bottom may have a different shape than the exterior wall of the double-walled bottom. In at least one example, such interior wall may be a floor, or may comprise a floor, on which one or more components are disposed and/or secured. The exterior wall may, as described further herein, be shaped so as to disperse air bubbles and water flow.

In at least one example, at least one of the aforementioned float modules houses one or more compressors, one or more batteries, and/or an electronic system in its internal cavity. In at least one example, the renewable energy power source is solar energy (e.g., from one or more photovoltaic (PV) panels) and/or wind energy (e.g., from one or more wind turbines). Thus, in at least one example, each of the one or more float modules is powered by one or more PV panels and/or one or more wind turbines.

Turning now to FIG. 1, a representative float module 100 is shown. The float module contains a mounted solar panel 102, an internal cavity 104, and a cut-out/opening 108 to the internal cavity that may be covered by a hatch or other removeable panel (not shown). One or more components 106, described further below herein, may be disposed within the internal cavity 104. In different embodiments, the float and/or floatation module (e.g., any of the floats and/or floatation modules described herein) comprises a single unit or a plurality of pieces that fit together to create a floating module, such as a float cover and float bottom, with a weatherproof internal cavity that may house one or more components.

Figure 2:
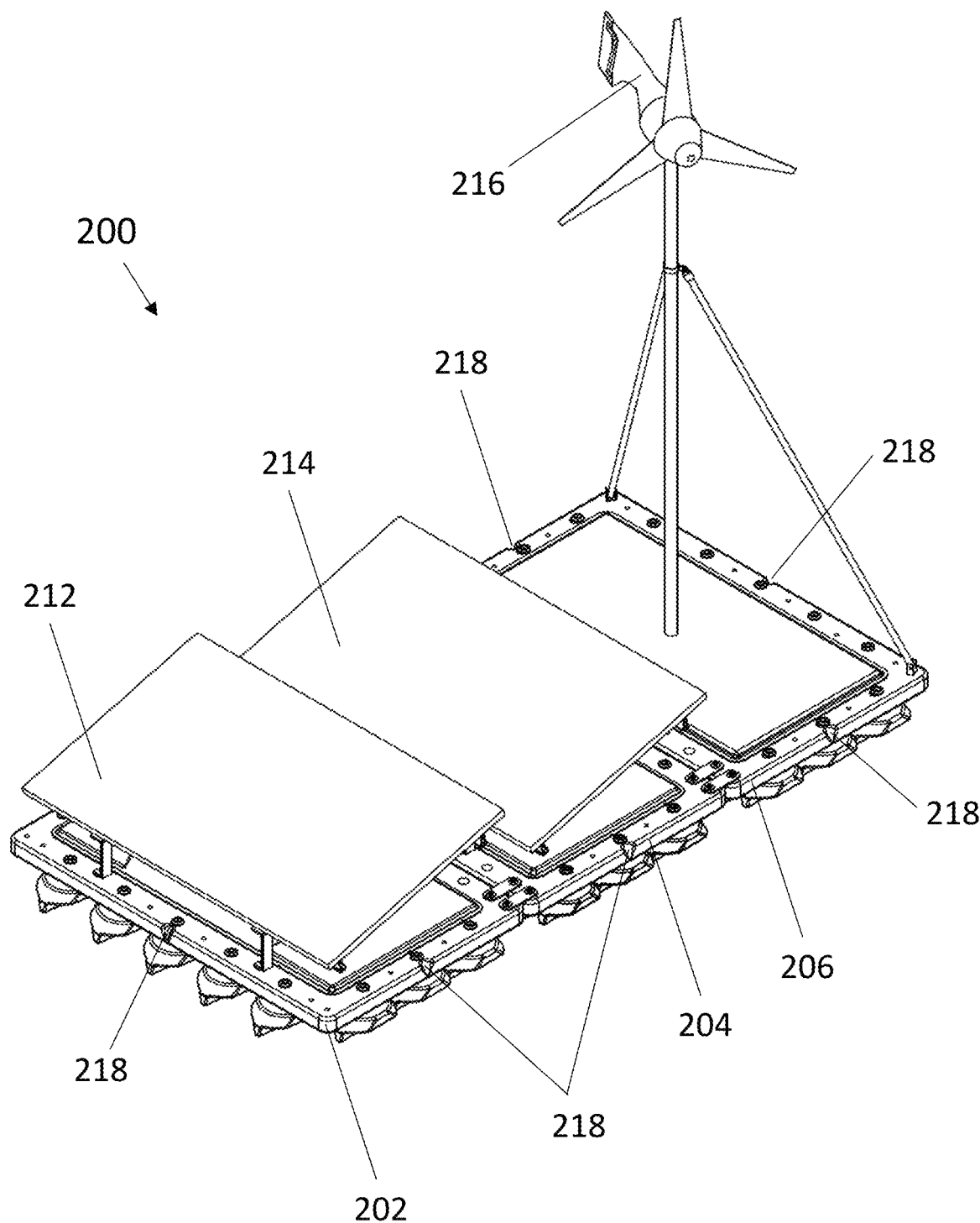
FIG. 2 shows an aeration system, according to at least one embodiment of the present disclosure.

Turning now to FIG. 2, a non-limiting example of an aeration system 200 is shown. The system 200 comprises three float modules (specifically, modules 202, 204, and 206). Module 202 includes a mounted solar panel 212. Similarly, module 204 includes a mounted solar panel 214.

Module 206 includes a wind turbine 216. One or more of the modules 202, 204, and 206 can house an electronics system within and/or on top of the module (not shown) that operates the system 200. In some embodiments of the system, for example in some embodiments having larger numbers of float modules, a single electronics system may operate only a subsystem rather than the entire system. The electronics system can be connected to the solar panels 212 and 214, wind turbine 216, and one or more batteries (not shown) disposed within and/or on top of the modules for energy storage. Also shown are hose relief contours 218, which may be configured as depressions along the perimeter of the modules 202, 204, and/or 206. These relief contours may be present on the perimeter of the float bottom and/or the float cover that comprise the float module. Portions of one or more flexible aeration hoses (which can be connected to one or more diffusers, as described in further detail below herein) may be disposed within the contours 218 such that the hoses drape over the edge of the modules to minimize the potential for stress, such as pinching of the hoses on rigid and/or sharp edges. Such contours 218 may be placed anywhere along the perimeter of any one or more modules 202, 204, and/or 206, depending on the location of the flexible aeration hose(s) with respect to the diffusers to which the hose(s) are connected.

In at least one embodiment, an aeration system comprises one or more PV panels that are mounted to a custom float (e.g., one or more float modules) that sits directly on the water. These PV panels provide power to the aeration system and may be oriented, in at least one example, in a south-facing orientation. Further, the system may also be configured to capture wind power as a secondary power source (e.g., using one or more wind turbines) in locations with favorable wind conditions.

In at least one embodiment, the aeration system, and/or the subsystems comprised therein, is fully autonomous, with the PV panels and/or wind turbines provided onboard the systems and no power connection to land. However, in at least one example, the floating aeration system is fully autonomous, but also has an optional power connection to land for supplementing the onboard power sources.

In at least one embodiment, an aeration system comprises three subsystems: (1) a power subsystem, (2) an aeration subsystem, and (3) a floatation subsystem. The power subsystem contains one or more PV panels/small wind turbines mounted on the float and an optional battery storage system (BSS) and other electronics housed within the cavity of the float and/or mounted to the float. The aeration subsystem contains one or more air compressor(s) housed within the cavity of the float and/or mounted to the float and air diffuser(s) suspended from the float in the water below. The floatation subsystem comprises one or more float modules configured to keep the entire aeration system sitting directly on the water (e.g., of a pond or tank).

In at least one embodiment, the aeration system, and/or the subsystems comprised therein, is modular and can be scalable in nature to match the water quality needs of the water body. This may be based on pond size, fish stocking density, and/or other aeration needs of the farmer or manager of the water body. The number of float modules and associated PV panels/small wind turbines, batteries, and aeration components can be increased or decreased. As a non-limiting example, the first float module could have a complete power and aeration subsystem comprising a single PV panel, an air compressor, submerged diffusers, a BSS with multiple deep cycle batteries, and the electronic system. Additional float modules with just PV panels/wind turbines could then be attached to this first float module to create a larger array with greater available power and aeration capacity.

In at least one embodiment, one or more portions and/or components of the aeration system (e.g., float covers and bottoms) have one or more different and/or unique form factors (e.g., depressions, holes, etc.) for the anchoring and/or mounting of PV panels and/or wind turbines or portions thereof, connecting other modules of the aeration system (e.g., connecting other floats), connecting the float cover and bottom cover, connecting tethers and/or anchors, providing air ventilation and access to the internal cavity, directing the flow of water, nesting within each other during shipping, and the like.

In at least one embodiment, one or more of the floatation modules are configured to be nested for ease of shipping and storage (e.g., the float bottoms can stack on top of each other and with the float covers when they are flipped upside down and vice versa).

In at least one embodiment, the aeration system comprises one or more lightning strike protection components (e.g., which may be submerged beneath the water line) to help minimize lightning strike damage. In at least one example, the one or more lightning strike protection components may include a metal disc submerged in the water and suspended from a metal wire that is mounted to the float cover with a ground lug.

In at least one embodiment, the aeration system comprises one or more novel diffuser device(s) (e.g., as described further below herein) uniquely designed to be suspended in a water column at flexible water depths.

In at least one embodiment, the aeration system comprises a power subsystem with one or more customizable settings, including, for instance, different programmable operation modes (e.g., daytime operation, nighttime operation, prioritizing continuous operation of the compressors, prioritizing battery charge, operating outside of selected operation hours if there is excess power, etc.), run times that can be established by a user (e.g., setting a start and end time and/or a duration), and/or established thresholds (e.g., DO level) measured by the system itself or communicated from external devices (e.g., existing DO monitors used by the pond manager) that can adjust the system's operation (e.g., turn it on or off). In at least one example operation mode, after one or more batteries are charged to a pre-defined charge level and there are renewable energy resources (e.g. wind, solar) still available, a compressor and/or other electronics are run even if it is outside of set hours of operation without depleting the one or more batteries below the pre-defined level (which can be an amount reserved for one or more specific hours or periods of operation). In at least one embodiment, the system's program and/or data can be accessed remotely (e.g., through a wireless communication device or cellular network) and adjusted and/or downloaded.

In at least one embodiment, the aeration system comprises a power subsystem that may vary the level of power to the air compressor(s) in proportion to a specific parameter, which may be a measured parameter such as the battery charge and/or voltage and/or the solar and/or wind level.

Battery-Power Aeration Systems

In at least one embodiment of the disclosure, an aeration system has battery-power (e.g., via a battery-power power subsystem, described in further detail below herein) where the renewable energy resource(s) (e.g., PV panels and/or wind turbines) charge a BSS in addition to powering the compressor(s) and auxiliary equipment. Such a battery-power system can be used for extended run-time applications and/or applications or instances in which there is limited renewable energy capacity and/or capability (e.g., limited periods of solar energy capability, such as, for instance, nighttime aeration).

The battery-power system can, in at least one example, include an optional wind turbine for locations with favorable wind resources and/or wind energy generation capabilities.

In at least one embodiment, the weight of the batteries in the aeration system can serve as ballast for one or more floatation modules (e.g., depending on selected battery storage capacity and the weight of such batteries).

Figure 3:
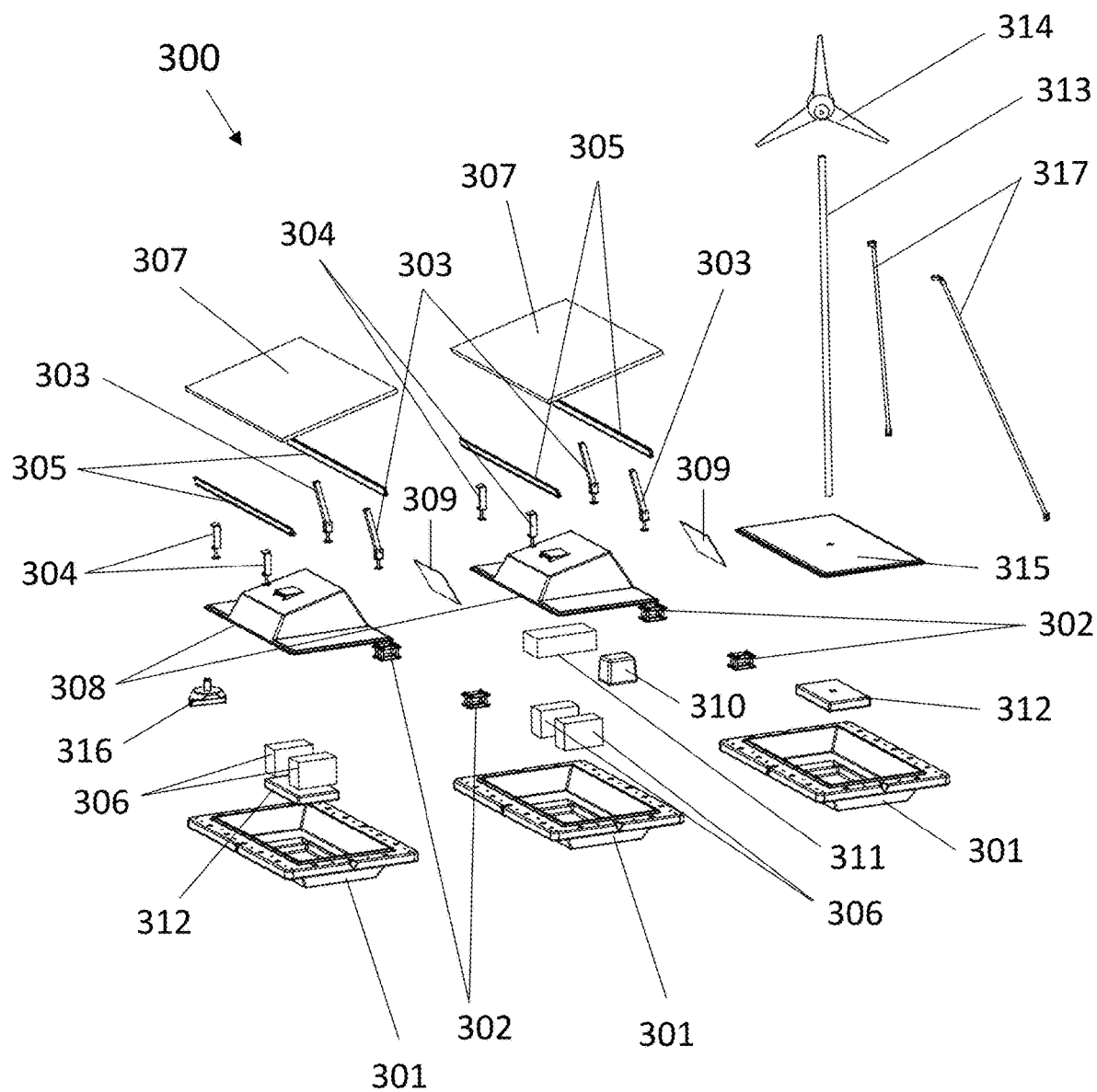
FIG. 3 shows a battery-power aeration system, according to at least one embodiment of the present disclosure.

Turning now to FIG. 3, a battery-power aeration system 300 is shown in an exploded view. The system 300 comprises float bottoms 301, connector assemblies 302, first tilt legs 303, second tilt legs 304, rails 305, batteries 306, PV panels 307, float covers 308, access panels 309, a compressor 310, electronics components 311, a ballast 312, a wind turbine mast 313, a wind turbine (e.g., a marine wind turbine) 314, a flat cover 315, a pontoon accessory 316, and a wind turbine mast stay 317.

The float bottoms 301 sit directly on a surface of the water (e.g., of a pond or tank). Disposed within internal cavities made by at least one set of float covers 308 and float bottoms 301 are battery 306, compressor 310, electronics components 311, and ballast 312. As shown, one or more of the battery 306, compressor 310, electronics components 311, and ballast 312 may be disposed in the cavities of different float modules. For instance, the ballast 312 may be disposed in the cavity of a float module that contains the wind turbine. Access panel 309 permits one or more users to access the internal cavity of the floats, and/or the components disposed therein (e.g., the electronics components 311).

Float cover 308 and an example of a flat cover 315 cover the internal cavities. On top of cover 308 is PV panel 307, which is mounted on cover 308 via the first tilt leg 303, the second tilt leg 304, and the rail 305. It should be appreciated that the first and/or second tilt legs 303, 304 allow for the tilting of PV panel 307 to maximize solar energy generation, depending on the position of the sun. The battery 306 stores generated solar energy from the PV panels 307. In at least one embodiment, the PV panel may also be directly mounted to the float module without tilt legs 303 and 304.

Flat cover 315 has a flat surface on which wind turbine mast 313 is mounted. In at least one embodiment, the wind turbine mast may also be mounted using a raised float cover (not shown). Connected to the wind turbine mast 313 is wind turbine 314, which can generate renewable energy from wind resources. Wind turbine mast stays 317 assist in securing the wind turbine mast 313. Pontoon accessory 316 provides extra stability and directs flow for the system 300, and/or one or more of the floats 301. These pontoon accessories will be described in further detail below herein.

Direct-Power Aeration Systems

In at least one embodiment of the disclosure, an aeration system contains no BSS to run the compressor and the renewable energy (e.g., solar energy) received (e.g., by the PV panels) is used to power one or more compressor(s) directly. Such an aeration system can be a direct-power system (e.g., powered via a direct power subsystem, described in further detail below herein). The solar and/or wind resource may also directly power the auxiliaries and a small uninterruptible power supply (UPS) or other devices, systems, and/or methods of ensuring the continuous operation of the control system and therefore the larger aeration system. The signal to the compressor may be an on-off signal based on a minimum threshold (e.g., solar radiation level) and/or a variable signal that is proportional to the solar radiation, wind energy, and/or the battery charge and/or voltage.

Figure 4:
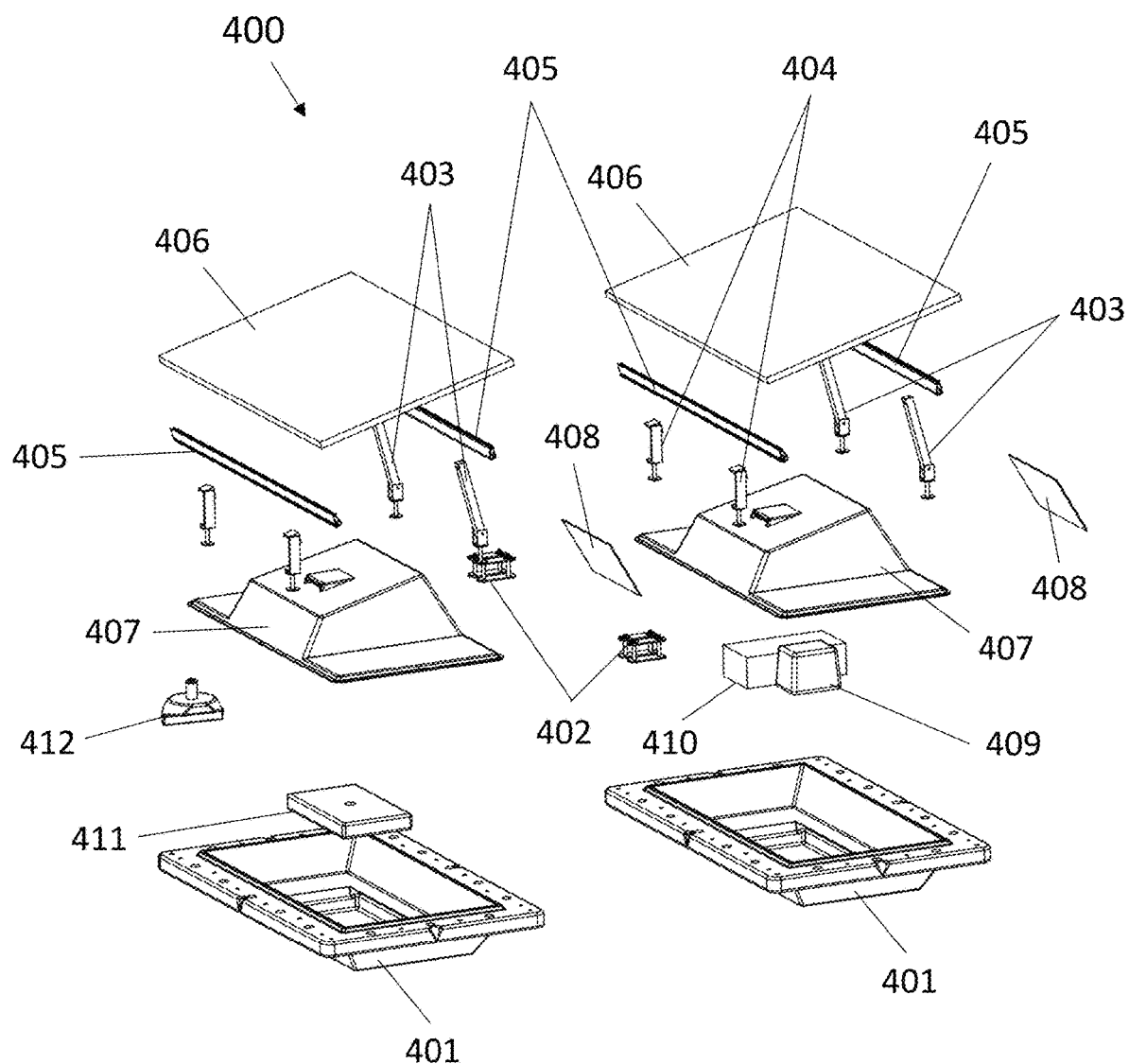
FIG. 4 shows a direct-power aeration system, according to at least one embodiment of the present disclosure.

Turning now to FIG. 4, a direct-power aeration system 400 is shown in an exploded view. The system 400 comprises float bottoms 401, a connector assembly 402, first tilt legs 403, second tilt legs 404, rails 405, PV panels 406, float covers 407, access panels 408, a compressor 409, electronics components 410, a ballast 411, and a pontoon accessory 412.

The float bottoms 401 sit directly on a surface of the water (e.g., of a pond or tank). Disposed within internal cavities made by at least one set of float covers 407 and float bottoms 401 are a compressor 409, electronics components 410, and ballast 411. As shown, one or more of the compressors 409, electronics components 410, and ballast 411 may be disposed in the cavities of different float modules. For instance, the ballast 411 may be disposed in the cavity of a different float module than the one that contains the electronics components 410. Access panel 408 permits one or more users to access the internal cavity of the floats, and/or the components disposed therein (e.g., the electronics components 410).

Float cover 407 covers the float bottom 401 to create an internal cavity. On top of covers 407 are PV panels 406, which are mounted on covers 407 via the first tilt legs 403, the second tilt legs 404, and the rails 405. It should be appreciated that the first and/or second tilt legs 403, 404 allow for the tilting of PV panel 406 to maximize solar energy generation, depending on the position of the sun. In at least one embodiment, the PV panel may also be directly mounted to the float module without tilt legs 403 and 404.

In at least one embodiment, a wind turbine mast may also be installed in a float module (not shown).

Pontoon accessory 412 provides extra stability and directs flow for the system 400, and/or one or more of the floats 401. These pontoon accessories will be described in further detail below herein.

Floatation Subsystem

Float Cover

Figure 15:
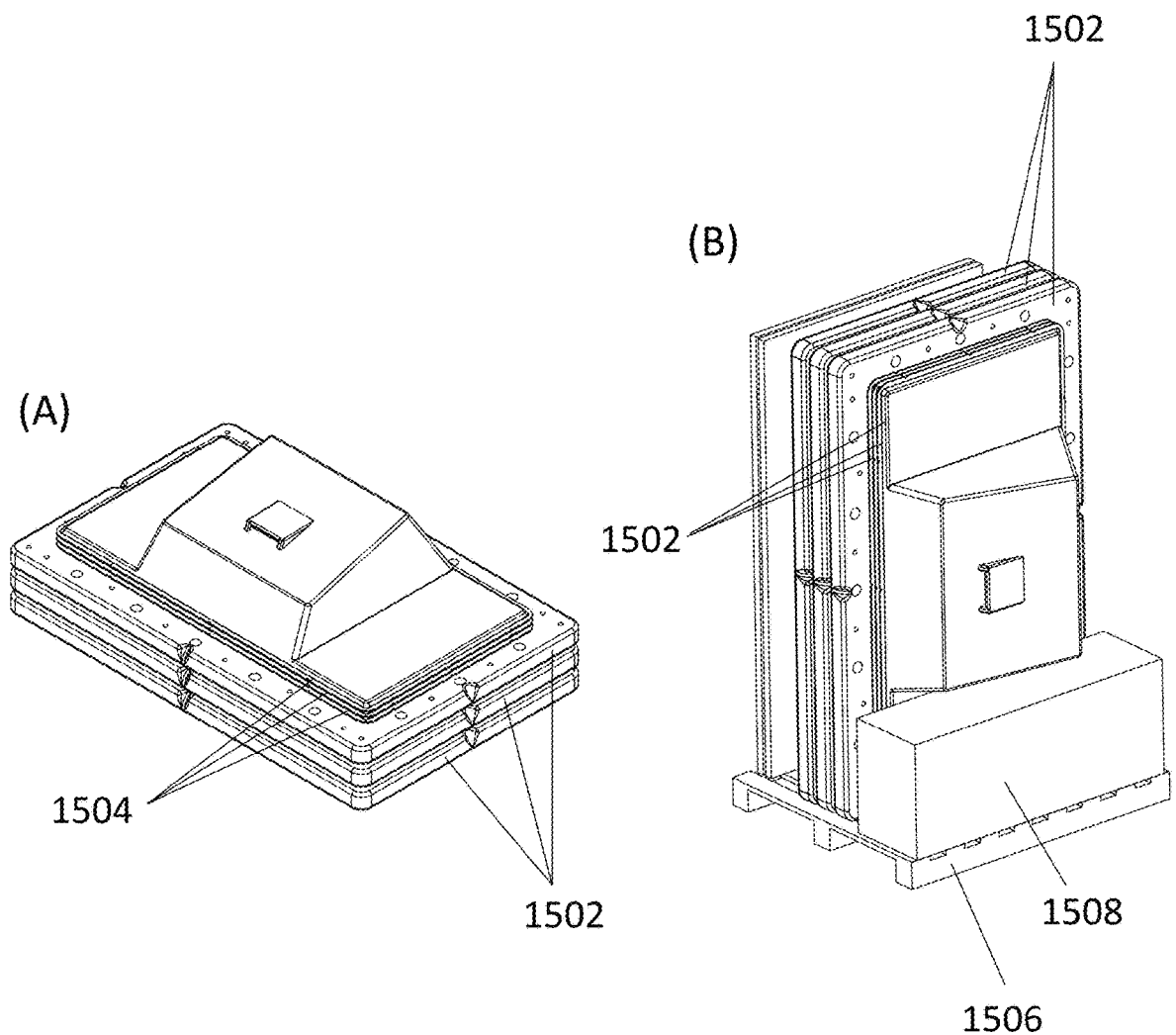
FIGS. 15A-15B show two stacking or nesting configurations, specifically a first orientation (FIG. 15A) and a second orientation (FIG. 15B), for modules of an aeration system, each according to at least one embodiment of the present disclosure.

In at least one embodiment, one or more of the float modules of the aeration system comprises a cover (e.g., any cover described herein including, without limitation, cover 308 and cover 407). The cover may have one or more of the following features: (1) the height of the cover is at least the minimum required height to fit all components in an internal cavity (e.g., compressor, electronics components, and/or battery) (e.g., the cover may be raised to fit internal components or flat if the height of the component(s) do not exceed the depth of the float bottom or there are no internal components within the float module), (2) the height of the cover is low enough to provide an air gap between the PV panel and the top of the cover to minimize wind resistance, (3) the cover is raised and angled to allow for a PV panel to be mounted (e.g., with mounting legs or without mounting legs by, for instance, being mounted directly on the cover) at minimum tilt (e.g., 10 degrees) without having to mount the PV panel at an excessive height above the cover and to optimize the height of the cover hatch, (4) the cover comprises a plurality of holes to allow for air inlet and/or outlet attachments (e.g., for heat management and/or ventilation of components in an internal cavity) that are further designed to minimize water and debris intrusion while allowing for air flow, (5) one or more such holes can be configured to be a stabilization point for a wind turbine mast as the wind turbine mast passes through the cover and is mounted inside the float (e.g. to a floor board), (6) the cover comprises an opening configured to receive a waterproof access hatch or other removeable panel, which can be used to access components in an internal cavity (e.g., compressor, electronics components, and/or battery) and/or to adjust device settings, (7) the cover comprises one or more surfaces (e.g., tabs configured as thicker and/or stronger points and/or areas and/or flat areas that are flush with the float bottom, as described in further detail herein) on a perimeter of the cover, configured as attachment points for various applications, including, but not limited to, securing the cover to the float bottom, securing connectors (e.g., metal, plastic, rubber, or other similar materials, as described in further detail herein) for joining two floats together, mounting solar panel racking, securing pontoons, securing wind turbine stays, and/or securing anchoring or tethering systems, (8) the cover is configured to be fully water-tight (e.g., by one or more seals, connecting surfaces, and/or gaskets, as described in further detail herein), (9) a cover surface (e.g., one or more surfaces, or all surfaces, of the cover, as described in further detail herein) can be sloped downward to shed water and/or snow, (10) the cover is configured to allow for water-tight exiting of power cables and/or air hoses (e.g., via one or more connectors having threaded portions and/or areas, contours, seals, sealing nuts, self-locking portions and/or areas, hose barbs, conduits, and waterproof glands, such as, for instance, compression glands), (11) the cover may have air hose relief contours (e.g., contours 218) such that the hoses drape over the edge of the float to minimize the potential for stress such as pinching of the hoses on rigid and/or sharp edges, and (12) the cover is designed for nestable shipping (a non-limiting example of which is shown in FIG. 15).

In at least one example, the PV panel rests directly on a surface of the float with no air gap in between the panel and the surface. Such an arrangement may be especially advantageous in areas and/or periods where there is little wind, and/or where the PV panel is at a low angle or flat.

In at least another example, one or more components (e.g., one or more electronics components) are housed on top of the float cover (e.g., when the float cover is flat). The housing for such components may be waterproof and/or weatherproof. Additionally or alternatively, the one or more components may also be housed within an internal cavity of the one or more float modules.

The various features above will now be described in further detail with reference to the below figures.

Figure 5A:
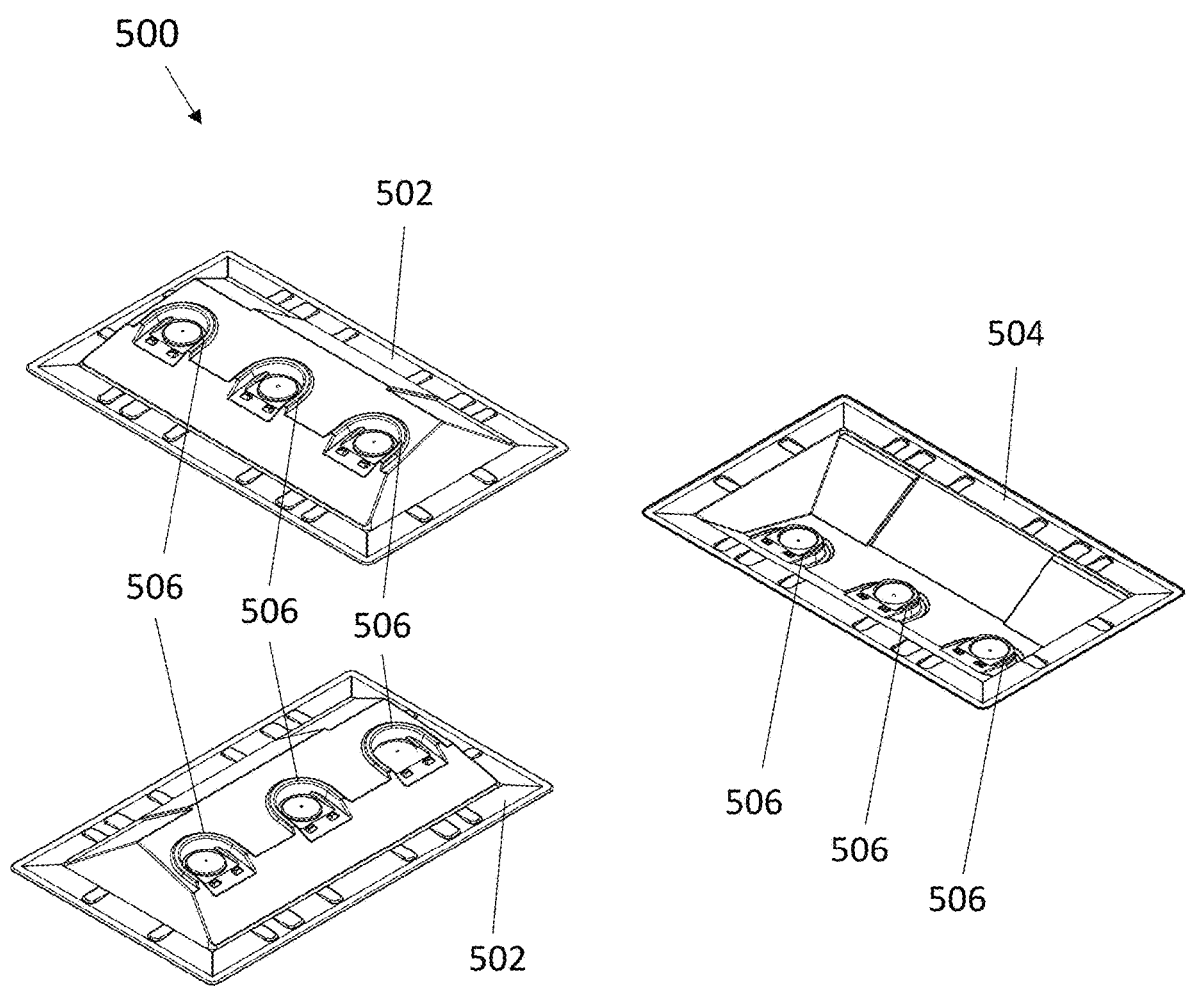
FIGS. 5A-5J show float covers and various aspects thereof, including a plurality of depressions (FIG. 5A), a plurality of holes (FIG. 5B), a representative depression with a plurality of protrusions (FIG. 5C), a representative depression and hole with a corresponding hole cover (FIG. 5D), a plurality of tabs (FIG. 5E), specific surfaces that provide areas of contact and a watertight seal between the float cover and bottom, as well as other unique features of the perimeter (FIG. 5F), float cover surfaces that have one or more slopes (FIG. 5G), an example of a barb fitting used with the cover (FIG. 5H), the cover hatch and an example of a removeable panel (FIG. 5I), and various hardware connections used with the cover (FIG. 5J), each according to at least one embodiment of the present disclosure.
Figure 5B:
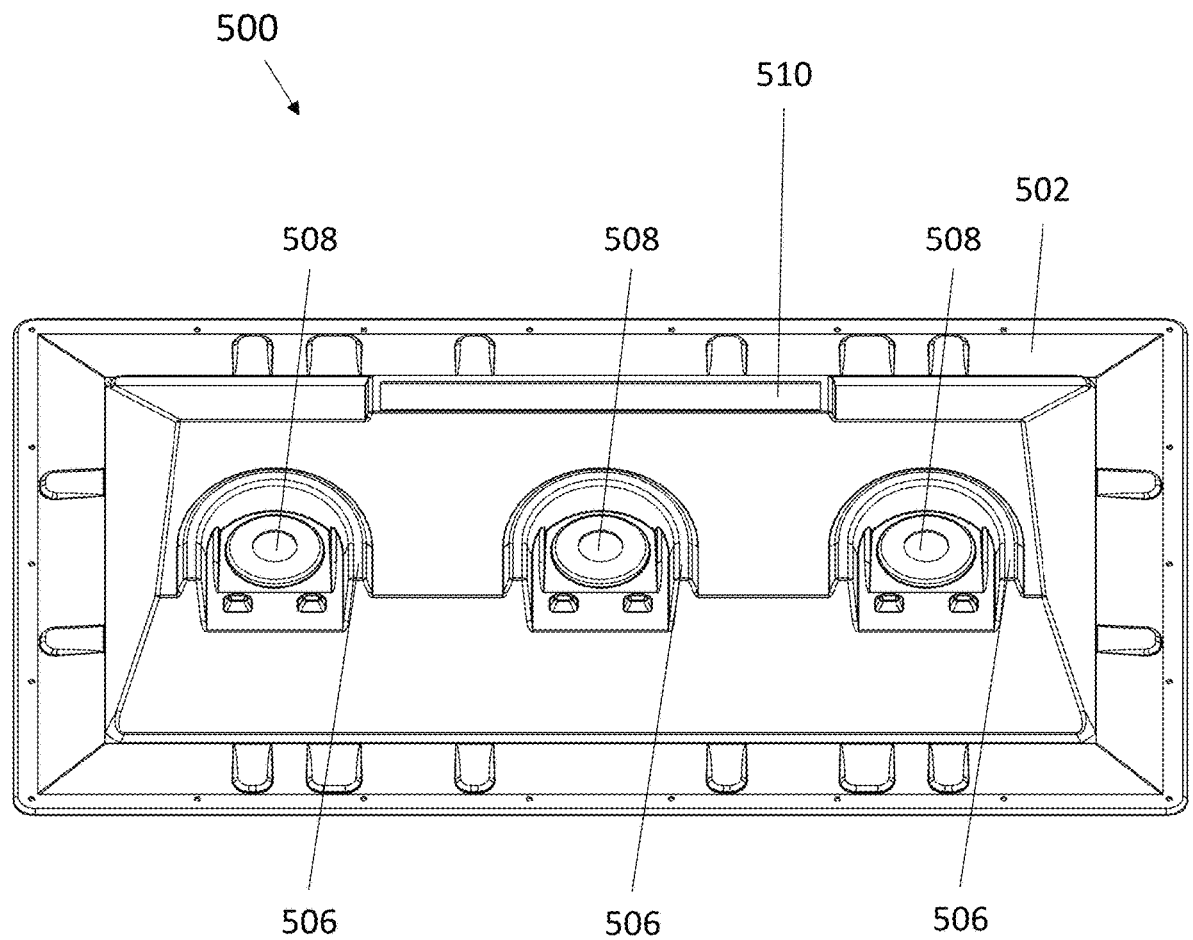

FIG. 5A shows a cover 500, and specifically a top surface 502 and a bottom surface 504 thereof. The cover 500 comprises a plurality of depressions 506. These depressions allow for a plurality of holes that can be cut to different sizes depending on their function, which are shown in FIG. 5B. Specifically, FIG. 5B shows the flat perimeter 502 of the cover 500, which rests directly on top of the corresponding flat perimeter of the float bottom. FIG. 5B also shows the plurality of depressions 506. A plurality of holes 508 are shown disposed in the depressions 506. These holes 508 can be used for air inlet and/or outlet and fan attachments (e.g., for heat management and/or ventilation of components in an internal cavity). One or more such holes 508 (e.g., the center hole of the holes 508) can be a wind turbine stabilization mounting point, at least if the cover is used in an aeration system that comprises such a wind turbine. An additional hole 510 may provide access to the internal cavity and may be covered by a hatch or other removeable panel to create a watertight seal.

Figure 5C:
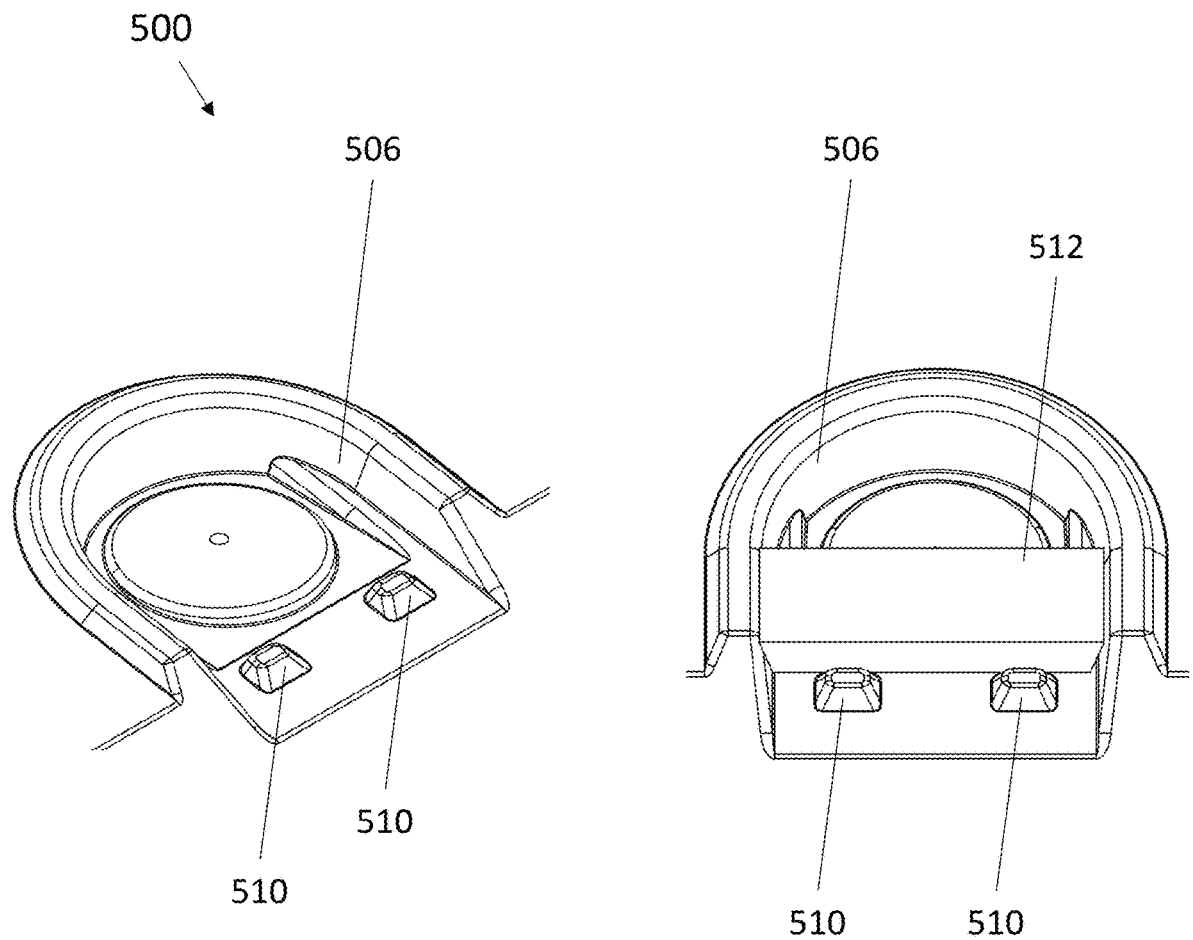

FIG. 5C shows a representative depression 506 disposed on cover 500. In at least one embodiment, one or more such depressions 506 contain protrusions 510 for holding a filter 512 in place. In at least one example, the filter 512 can be an air filter. Such a filter may be used, for instance, to prevent dust, wildlife, insects, and/or particles from entering the aforementioned internal cavity. In at least one example, the filter may comprise a porous and/or spongy material that can be held in place using the one or more tabs 510 described herein. Further, the cover may have one or more air intake holes (which themselves can be filtered and/or comprise one or more filters) and/or one or more air outlet holes (which can also be filtered and/or comprise one or more filters) through which air can be pushed out of the cavity by, for instance, one or more internal fans. Such internal fans can be mounted in the internal cavity and can be operated and/or controlled by the user for pre-determined conditions (e.g., temperature thresholds). In some embodiments, there are multiple filtered air intake holes in the cover and a filtered air outlet hole with a fan.

Figure 5D:
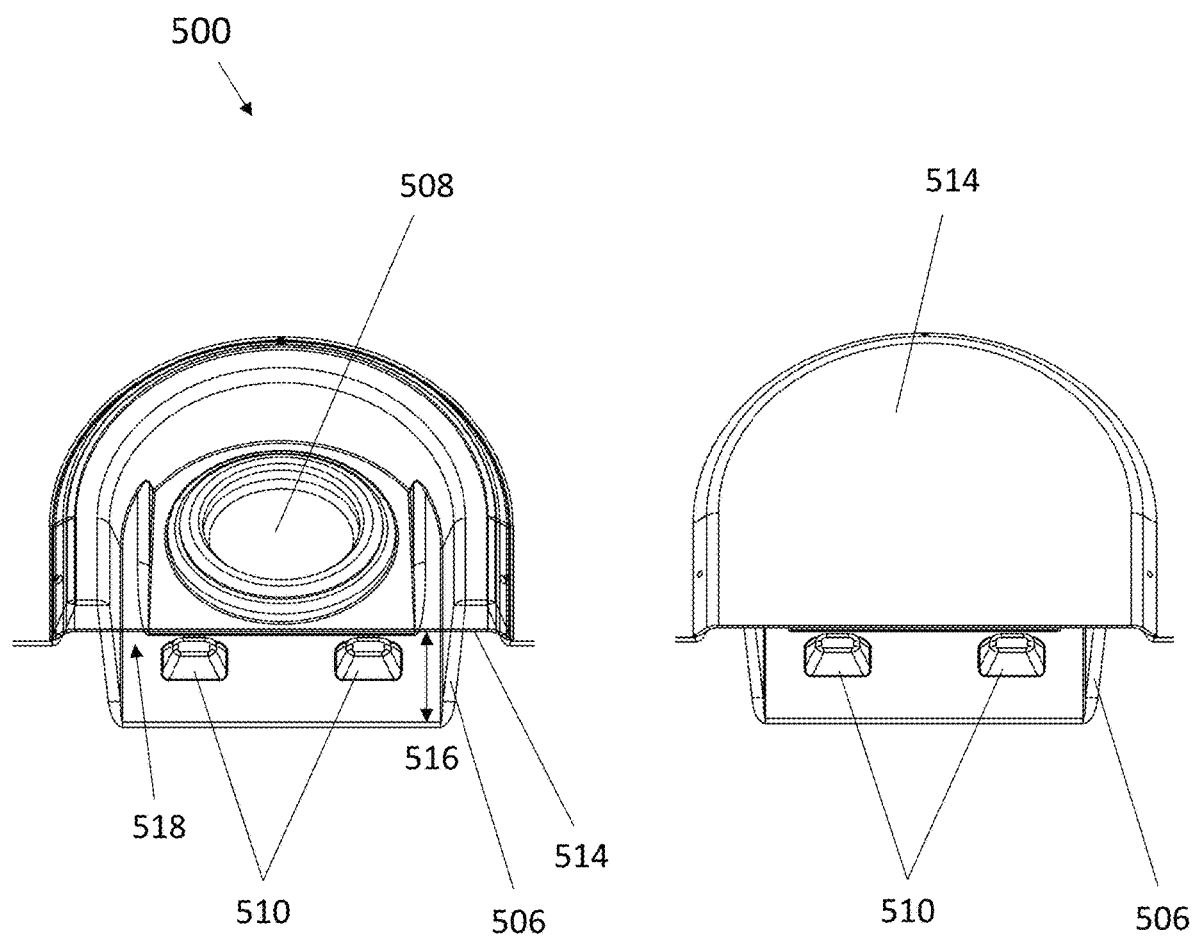

FIG. 5D shows a representative depression 506 and hole 508 disposed on cover 500. In at least one embodiment, one or more hole covers 514 are separately molded and attached over the holes 508 to prevent water intrusion while permitting air flow. Gap 516 underneath the hole cover 514 permits such air flow 518, which can flow through the gap 516 and down through hole 518 and into an interior cavity of a float and/or floatation module (not shown) on which the cover 500 is disposed. The air passing through the gap 516 can flow through the air filter 512 in FIG. 5C to block debris from entering the interior cavity. In at least one example, the bottom of the hole cover 514 may be, for instance, smooth and flat to further encourage such air flow 518.

Figure 5E:
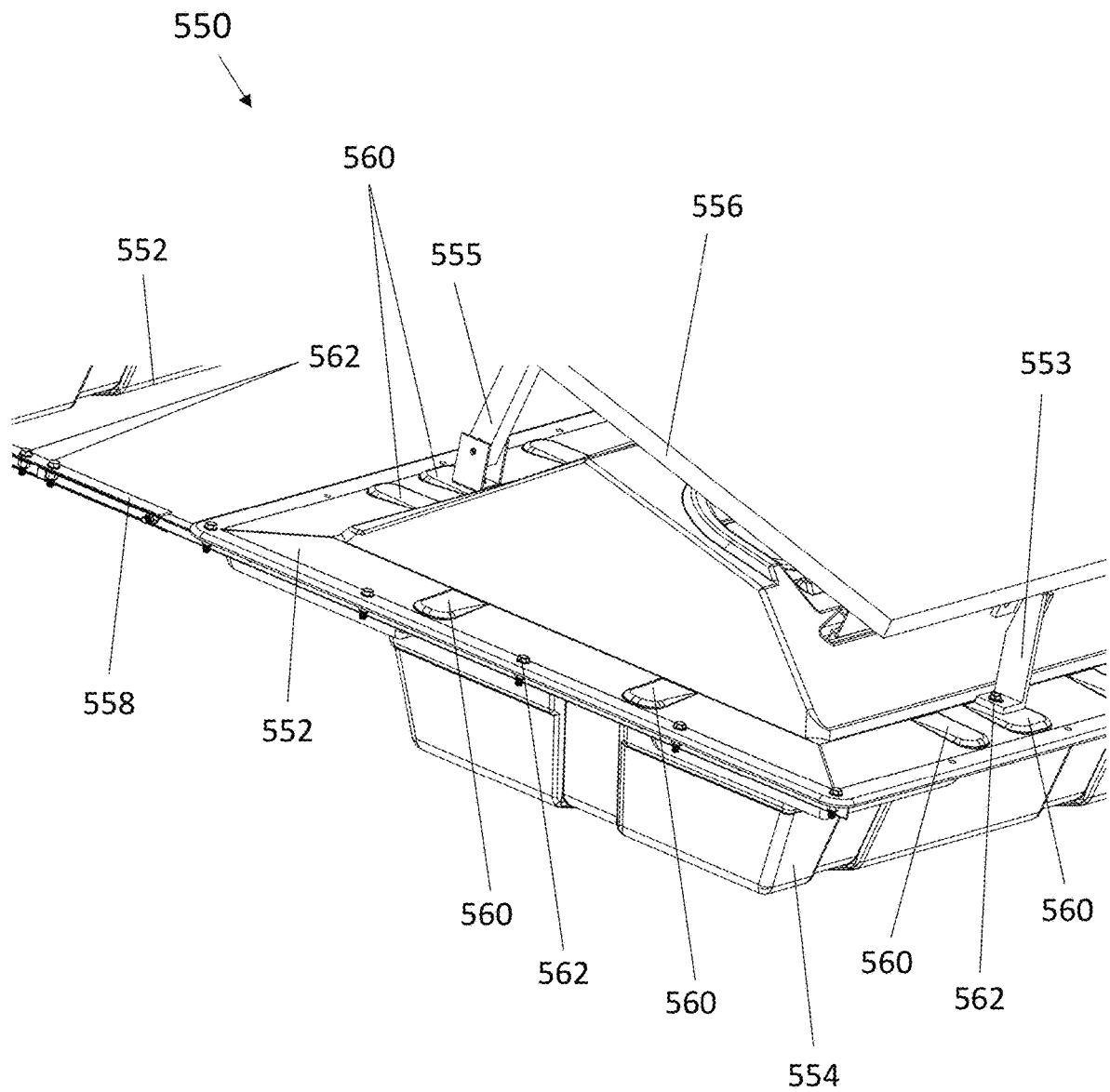

FIG. 5E shows float module 550 which may be similar to, or the same as, any other float module described herein (e.g., float module 100). Float module 550 comprises float cover 552, float bottom 554, PV panel racking legs 553 and 555, PV panel 556, and connector and/or rail 558 for connecting float module 550 with, e.g., another float module or an anchoring/tethering system (not shown). Additionally shown are one or more tabs 560 which, as described above herein, can be configured and/or implemented as thicker and/or stronger sections that are also raised to be level relative to the sloped surface of the cover 552 to allow for flush attachment points for PV panel racking, wind turbine stays, etc. The tabs 560 can be drilled to receive bolts 562, rivets, or similar hardware (e.g., having a length of about 1.25 inches to 1.75 inches). Further, as described above herein, connector and/or rail 558 may be made of metal, plastic, rubber, and/or any other material that is used to join two floats together (e.g., for joining float 550 to any other float as described herein). Bolts 562, or bolts of similar size, can also be used to secure the connector and/or rail together and to secure the outer perimeter of the cover 552 to the outer perimeter of the bottom 554.

Figure 6A:
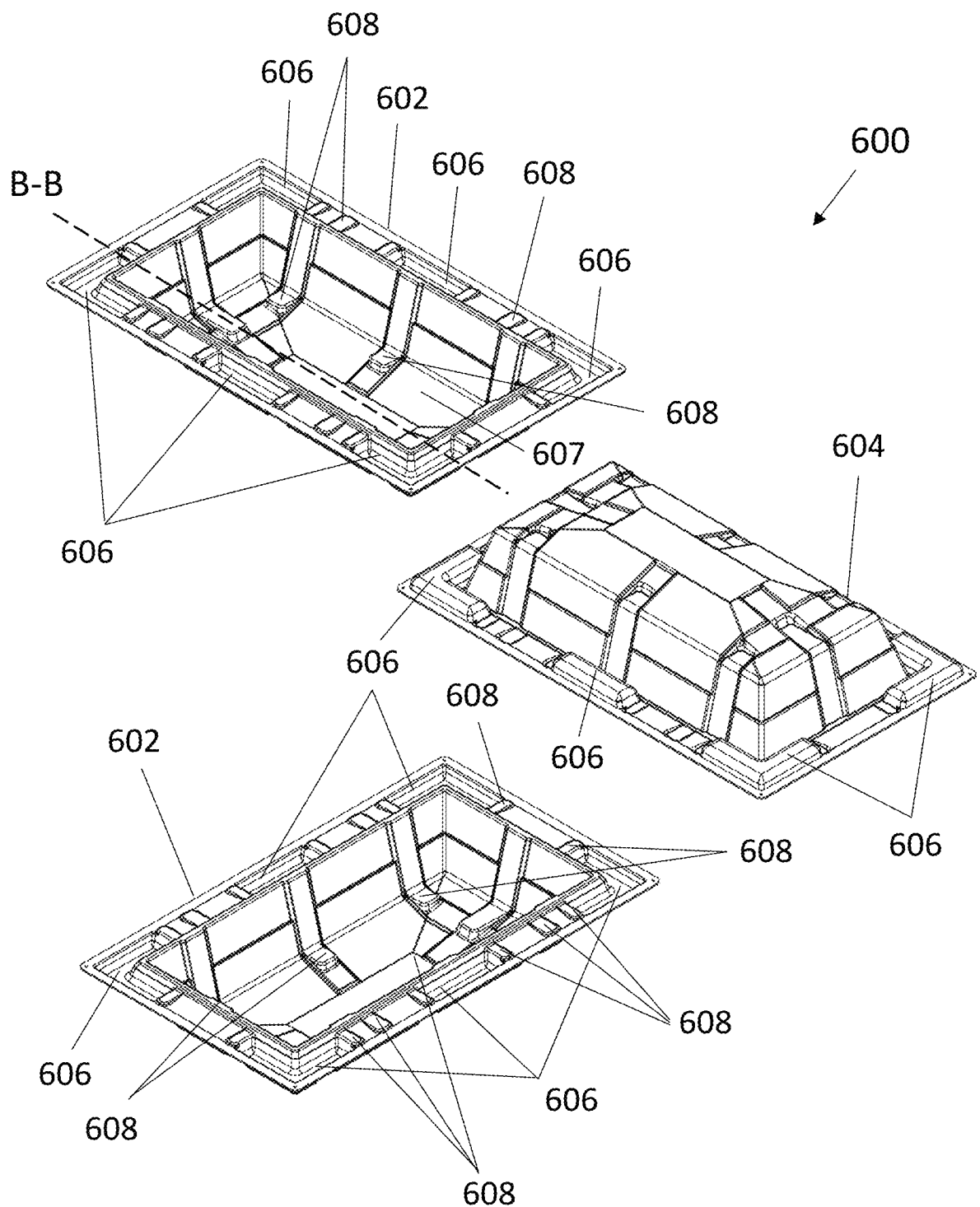
FIGS. 6A-6G show float bottoms, including a single-sheet form of a float bottom (FIG. 6A), a single-sheet form of the float bottom from a side view (FIG. 6B), a cross-section of a single-sheet form of the float bottom of FIG. 6A, taken along section line B-B, shown from a top perspective view (FIG. 6C), a cross-section of a single-sheet form of the float bottom of FIG. 6A, taken along section line B-B, shown from a side view (FIG. 6D), a twin-sheet form of the float bottom (FIG. 6E), a cross-section of a twin-sheet form of the float bottom of FIG. 6E, taken along section line A-A, shown from a top perspective view (FIG. 6F), a cross-section of a twin-sheet form of the float bottom of FIG. 6E, taken along section line A-A, shown from a side view (FIG. 6G), each according to at least one embodiment of the present disclosure.

Cover 552 sits on top of, and connected to, associated float bottom 554. The cover 552 overlaps and covers the top of the float bottom and its associated portions. In particular, cover tabs 560 overlap and connect with tabs 608 on the float bottom as shown in FIG. 6A to provide a flush, level and secure attachment point for a bolt 562 to connect together the PV panel legs 553 and 555, float cover 552, and the float bottom 554.

Figure 5F:
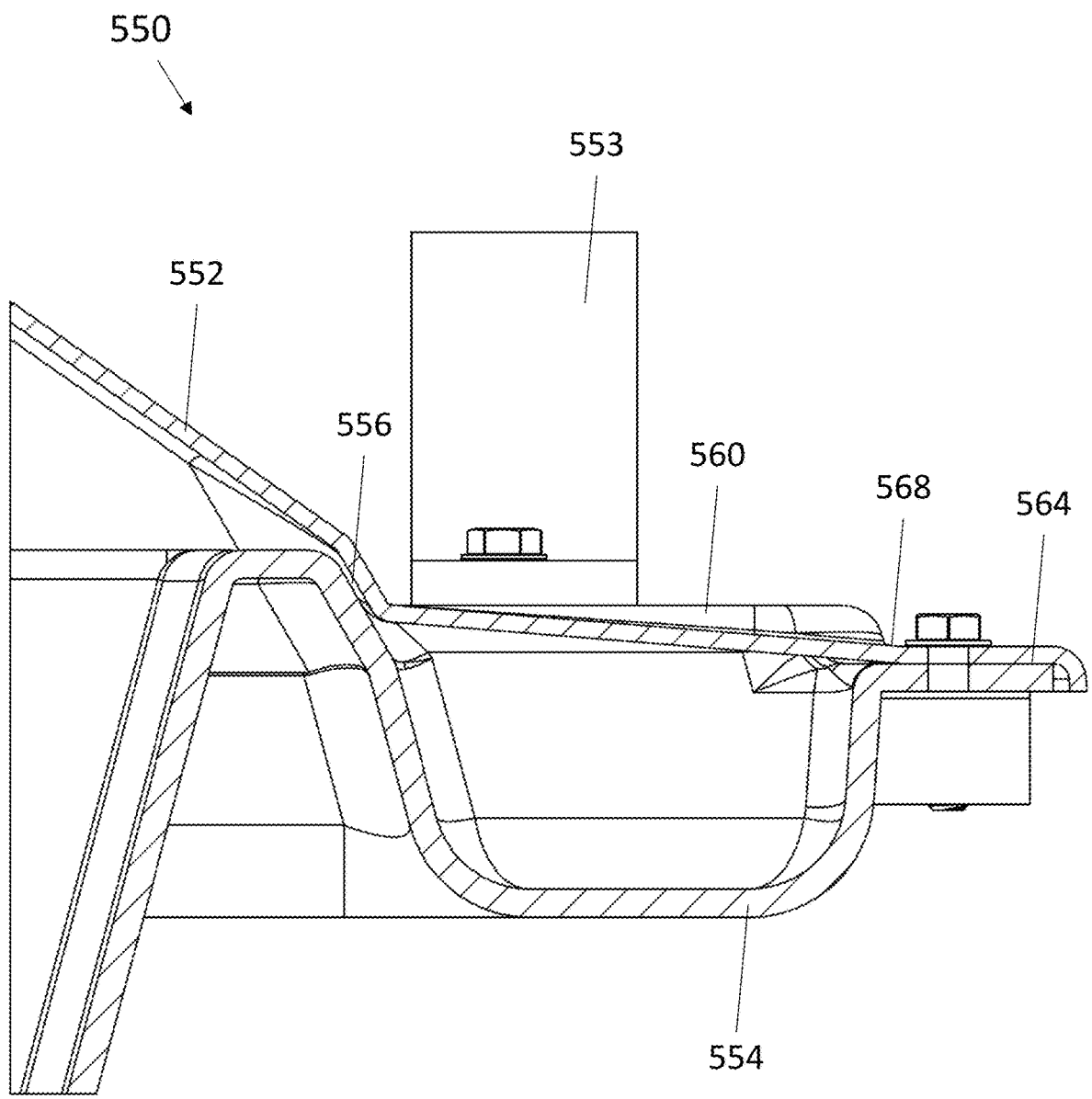

FIG. 5F shows float module 550 and associated float cover 552, leg 553, and float bottom 554. Additionally shown are surfaces 564 and 566, which provide areas of contact between the cover 552 and bottom 554. By providing such areas of contact, the surfaces 564 and 566 functionally act as a seal that prevents the intrusion of water and/or make the float module 550 water-tight, as described above herein. Further, one or more gaskets can be installed at area 566 (for example) and one or more bolts can be used along the float perimeter 564 to make the float module 550 water-tight. FIG. 5F also shows that the downward slope of the float perimeter 568 to shed water and/or snow, thereby preventing pooling of such water and/or snow. The downward slope contrasts the level surface of the raised tab 560, which can be level for the secure mounting of hardware such as, for instance, the PV panel racking legs 553.

Figure 5G:
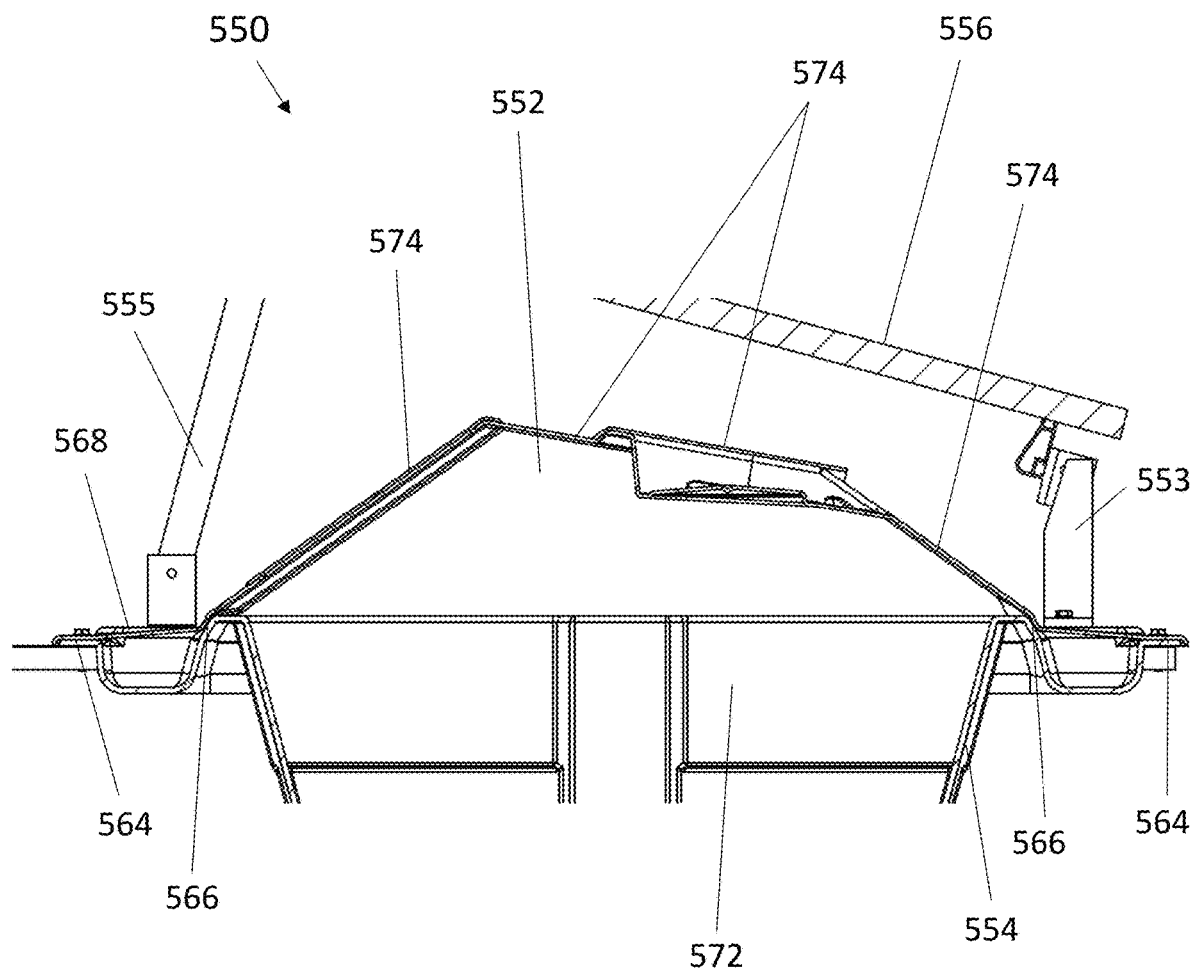

FIG. 5G shows float module 550 and associated float cover 552, float bottom 554, legs 553 and 555, PV panel 556, and surfaces 564 and 566. Additionally shown is interior cavity 572 and cover surfaces 574 and 568. As described above herein, such cover surfaces 574 and 568 can be sloped downward to shed water and/or snow, thereby preventing pooling of such water and/or snow. All surfaces of cover 574 and 568 may be at least gently downward sloping, leaving no and/or minimal areas for water to collect.

Figure 5H:
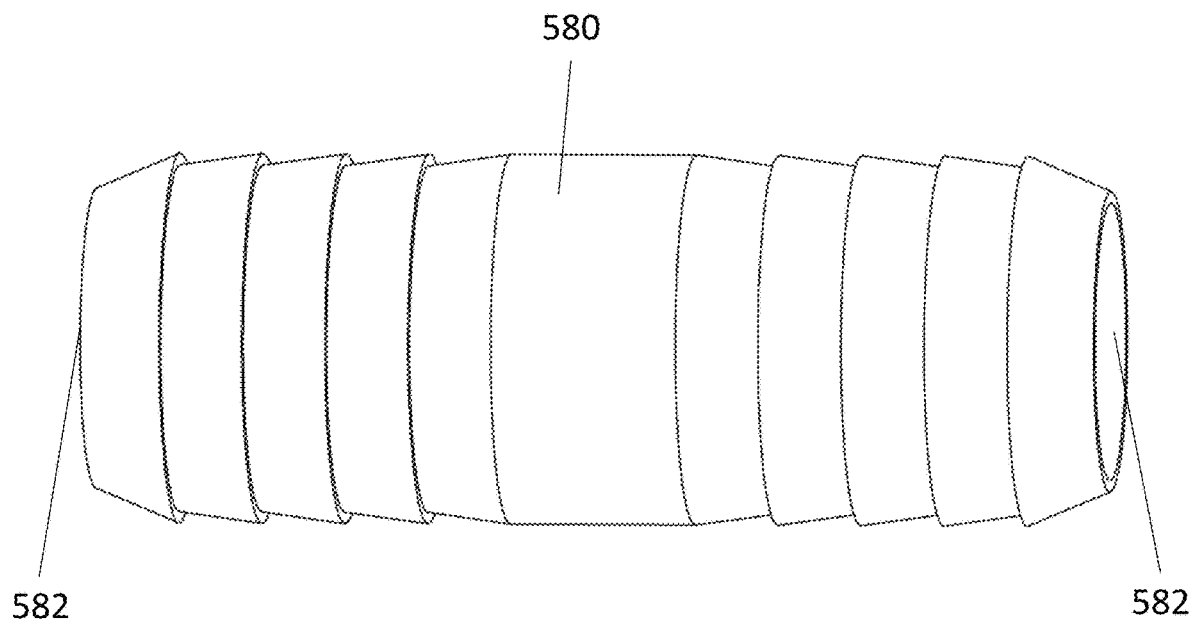

In at least one embodiment, and as described above herein, the cover (e.g., cover 552) is configured to allow for water-tight exiting of power cables (e.g., battery cables, solar and/or wind power cables, and cables from any other electronic component) and/or air hoses. In at least one example, water-tight exiting for battery cables, solar and/or wind power cables, and/or cables from any other electronic component may be provided by one or more connectors having threaded portions and/or areas, contours, seals, sealing nuts, self-locking portions and/or areas, and/or water proof glands (e.g., compression glands). In at least one example, a combination of one or more barb fittings 580, as shown in FIG. 5H, adaptors, and/or air hoses can provide a water-tight pathway for the air from the compressor to the submerged diffuser. The barb connector may be mounted to the cover and further waterproofed via a rubber gland (not shown) installed in the cover wall, which the barb fitting 580 or an adaptor can pass through. Air hoses can be connected to the barbed areas 582 on each side (e.g., one air hose can connect from within the cavity and one air hose can connect from outside of the cover). The attachment of the air hose to the barbed area 582 can be further reinforced with clamps (not shown).

Figure 5I:
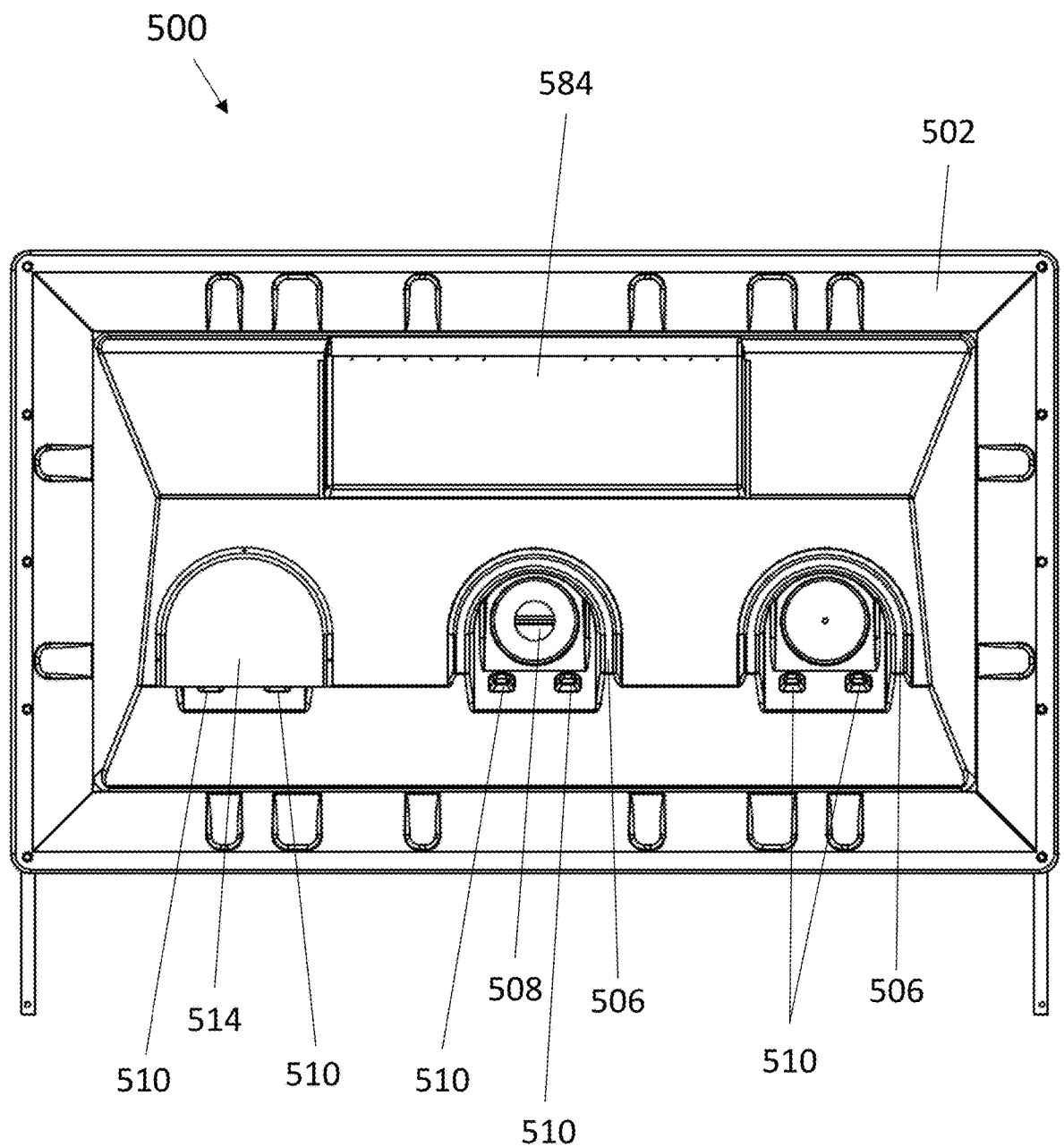
Figure 5J:
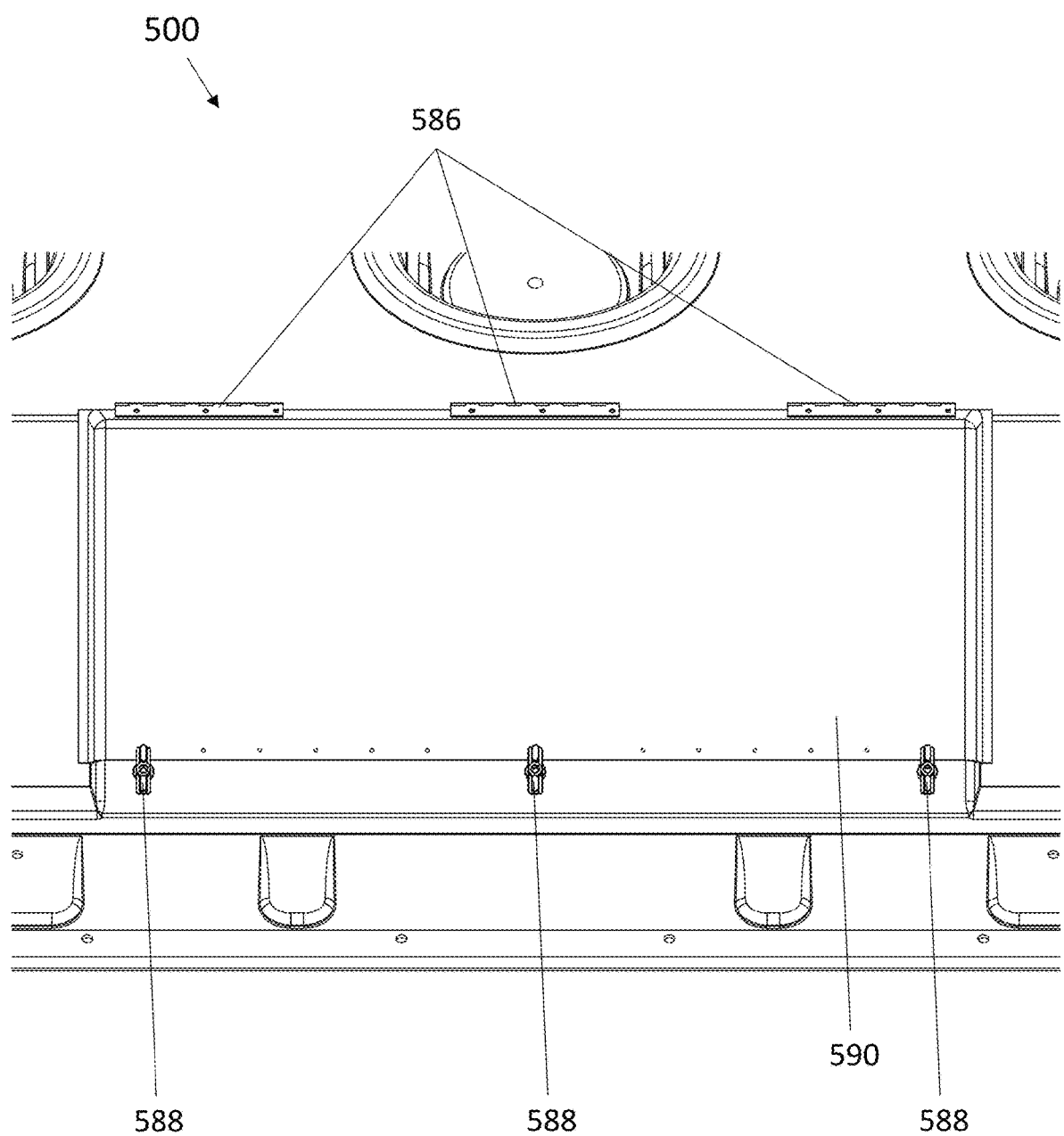

In at least one embodiment, as shown in FIG. 5I, there is a hatch 584 over the cut-out hole (e.g., holes 108 and 510) that provides access to the internal cavity (e.g., cavity 104) of the float cover (e.g., cover 552) while also providing a water-tight seal to protect the internal components. The hatch allows components to be removed, added, replaced, repaired, and/or otherwise adjusted. As an example, the hatch may provide a watertight seal by means of a panel that is attached to the float cover using a variety of hardware, including, but not limited to, various aspects shown in FIG. 5J, such as hinges 586, latches 588, rivets (not shown), and/or gaskets (not shown). In at least one example, the installed hatch may be a custom hatch 590.

Float Bottom

In at least one embodiment, the aeration system comprises one or more float bottoms (e.g., any float bottom described herein including, without limitation, bottom 301 and bottom 401). In at least one embodiment, the float bottom may be comprised of a single wall (e.g., manufactured through single sheet thermoforming), a non-limiting example of which is shown in FIG. 6A herein. In at least one other embodiment, the float bottom may be comprised of a double wall (e.g., manufactured through twin sheet thermoforming), such that the external and internal walls may have different profiles and the interior space between the walls may be filled with air, foam, and/or other buoyant material, a non-limiting example of which is shown in FIG. 6C herein.

Figure 6C:
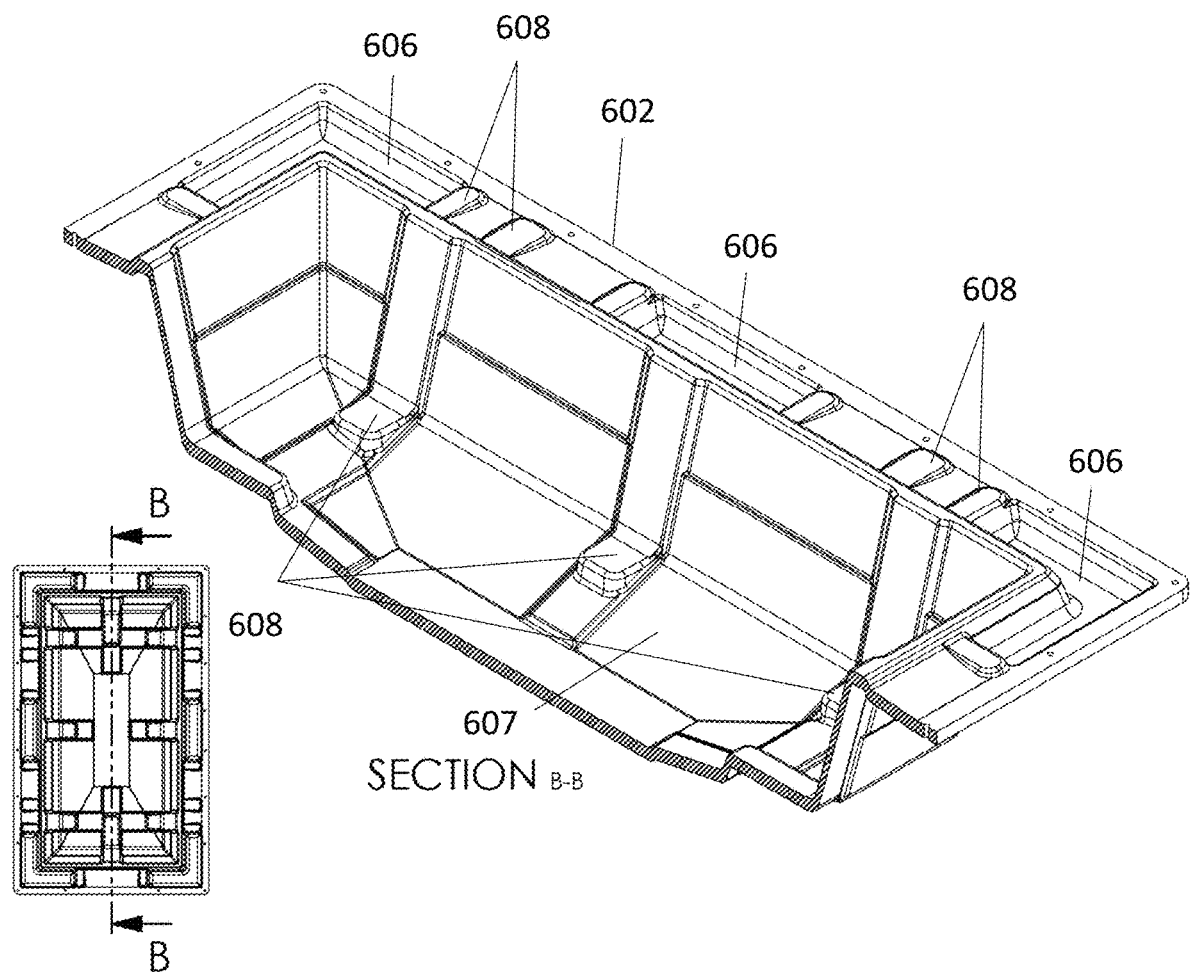
Figure 7:
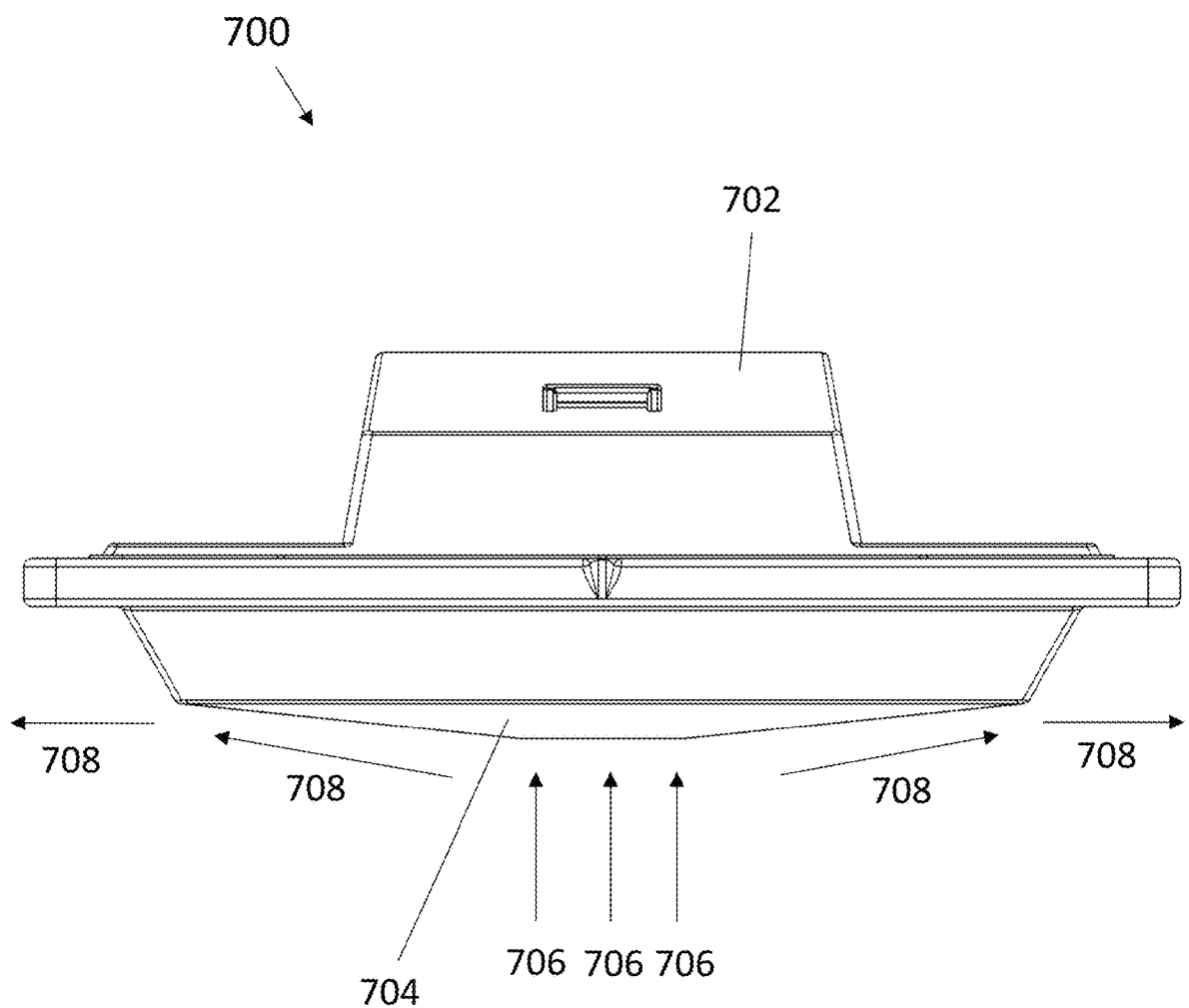
FIG. 7 shows the dispersion of water flow and air bubbles around a float and/or floatation module, including a float bottom that is shaped to disperse the flow of water and air bubbles outwardly, according to at least one embodiment of the present disclosure.
Figure 8A:
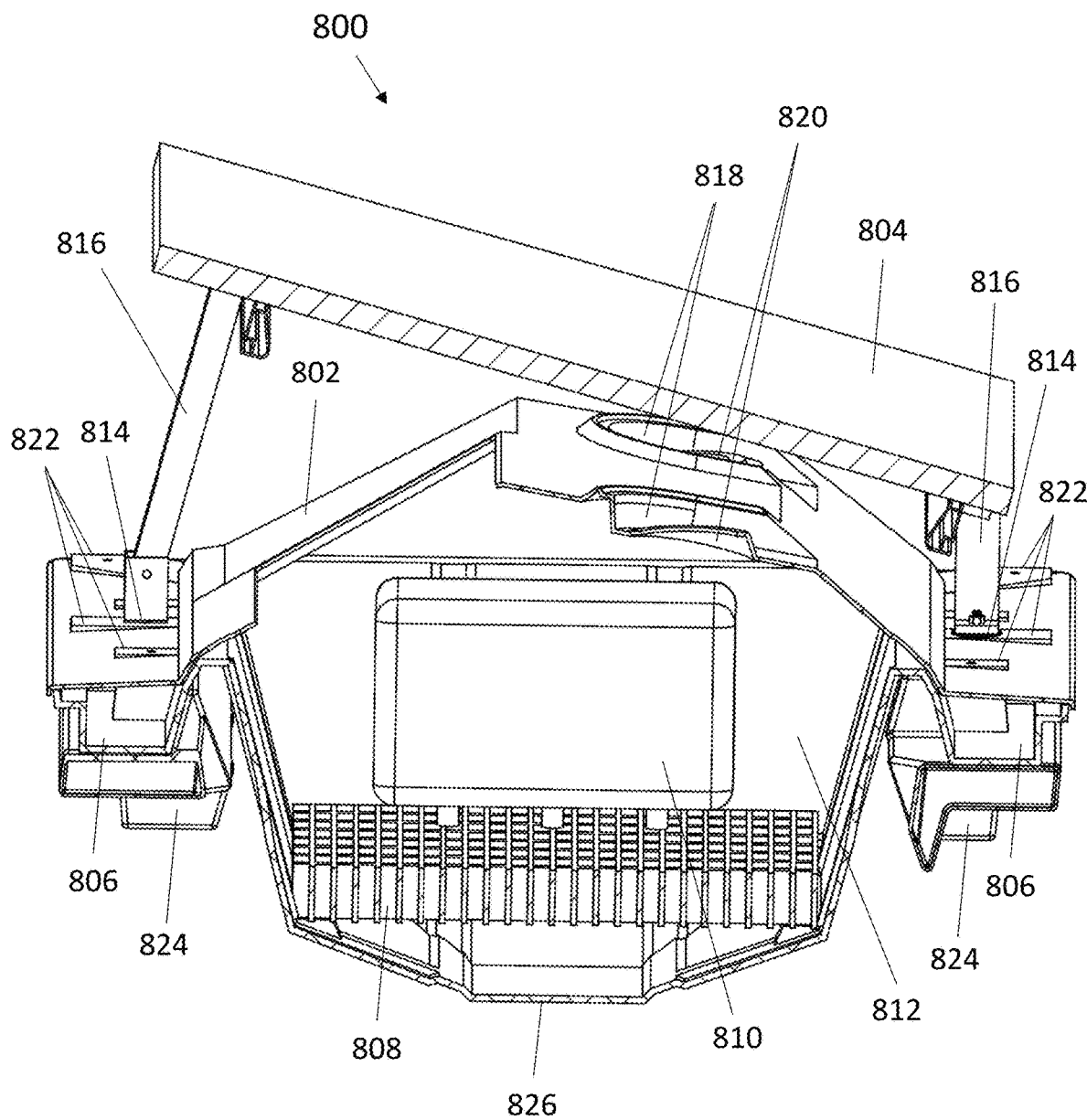
FIGS. 8A-8C show a float and/or floatation module with a cover and an attached PV panel (FIG. 8A), examples of the PV panel racking legs mounted to the cover (FIG. 8B), and an example wind turbine mast base (FIG. 8C), each according to at least one embodiment of the present disclosure.
Figure 8B:
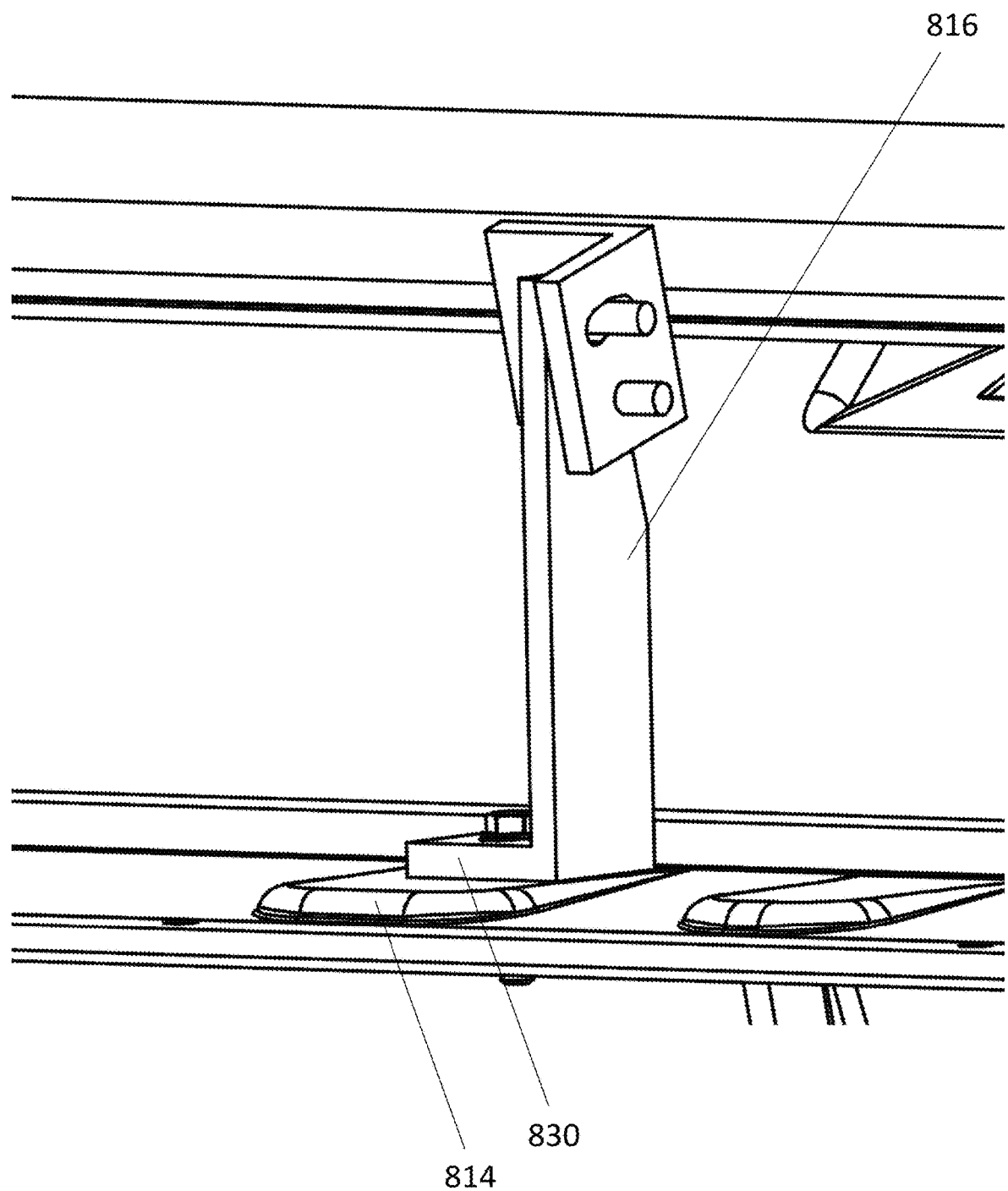
Figure 8C:
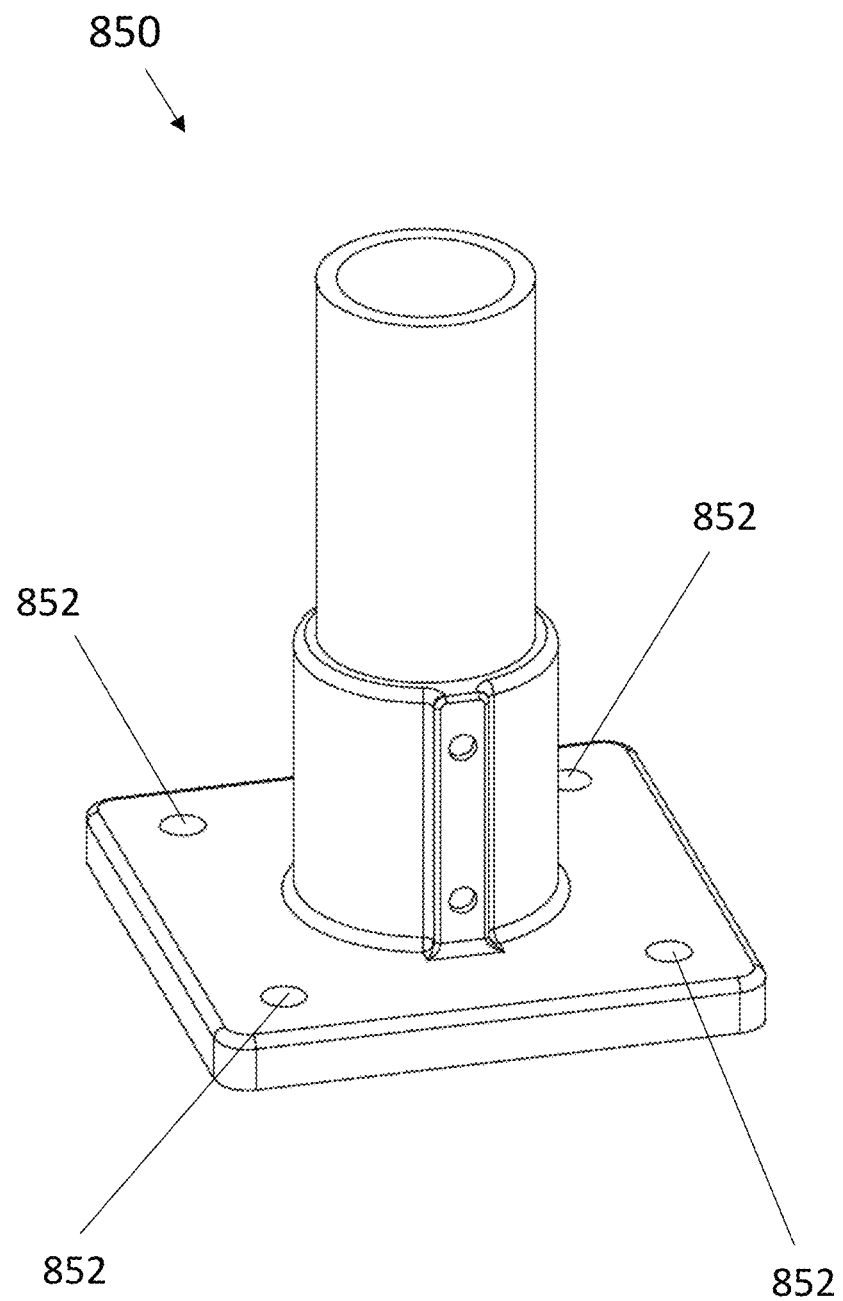

The float bottom may have one or more of the following features: (1) the float bottom provides buoyancy to the entire aeration system, accounting for both the wind resistance and weight of all system components and/or float modules, (2) the float bottom integrates with a cover to create a fully water-tight internal space that provides internal housing for various components (e.g., compressor(s), batteries, electronic system, and ballast), (3) the perimeter of the float bottom provides a plurality of secure attachment points for connecting the float cover to the bottom, securing rails and/or other attachment structures for joining two or more float modules together, mounting PV panels and/or panel racking, pontoons, securing wind turbine stays, and/or securing tethering and anchoring attachments, (4) the internal wall of the float bottom has a plurality of internal tabs 608 configured to receive an internal surface 808 (a non-limiting example of which is shown in FIG. 8A herein) that serves as a platform for internal components including, but not limited to, batteries, ballast, and/or electronics components, and also to allow for a second secure attachment point for the base of a wind turbine mast (a non-limiting example of which is shown in FIG. 8C), (5) the internal wall of the float bottom serves as a built-in floor with shapes 620 to position and hold in place the aforementioned internal components (a non-limiting example of which is shown in FIG. 6C herein), (6) the external profile of the float bottom is configured to laterally disperse air bubbles and to direct water flow from the diffuser(s) (e.g., to prevent air bubbles from getting trapped under the float and/or evenly distribute air, a non-limiting example of which is shown in FIG. 7), (7) a smooth external profile of the float is configured to allow one or more harvest nets to easily pass underneath the float and/or floatation module without snagging, (8) the interior space between a double-walled float bottom may have compartments to contain water leaks originating from the exterior wall to a particular location and reduce the likelihood of the float module sinking (not shown), (9) air hose relief contours 218 such that the hoses drape over the edge of the float to minimize the potential for stress (e.g., pinching of the hoses on rigid and/or sharp edges), and/or (10) nestable shipping (a non-limiting example of which is shown in FIG. 15).

The various features above will now be described in further detail with reference to the below figures.

FIG. 6A shows a float bottom 600, and specifically a top surface 602 and a bottom surface 604 thereof. The float bottom 600 comprises a plurality of cavities/protrusions 606 along the perimeter. In adverse external loading conditions, e.g., when the float lists/tilts to one side, the cavities/protrusions 606 can dip into the water and act as an outrigger on a canoe to increase stability and restore buoyancy moment force to return the float to its nominal position. The cavities may be filled with air, foam, or any other buoyant material. The cavities/protrusions 606 also locate and support the pontoons by providing points of contact. The pontoon may be shaped to fit with the shape of the cavities/protrusions 606 (a non-limiting example of which is shown in FIG. 8A). The float 600 also comprises a plurality of internal and perimeter tabs 608 that are level and/or reinforced to serve as attachment points (e.g., for grates and/or platforms 808 for batteries, ballast, electronics components, and/or other components (a non-limiting example of which is shown in FIG. 8A), for PV panel racking, for wind turbine masts and stays, etc.). The tabs may correspond with the placement of tabs on the float cover to provide a flush and secure connection surface for attachments. As can be seen, the float 600 also comprises an internal cavity 104, which can be used to house one or more components (e.g., electronics components and/or power subsystem).

Figure 6B:
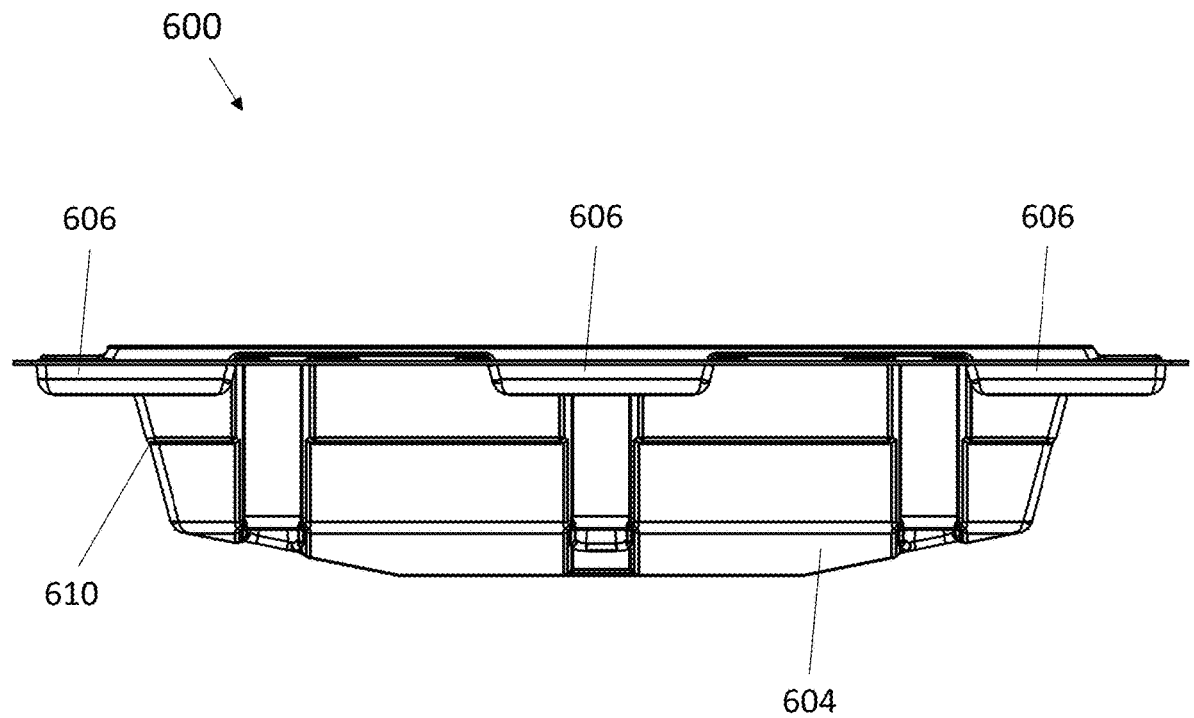

FIG. 6B is a side view of the float bottom 600. Three of the protrusions 606 are shown. Additionally, edge 610 indicates a target waterline (e.g., where the waterline will be when the float 600 sits in the water with the appropriate ballast). The buoyancy at this point may be determined by the system configuration. As a non-limiting example, the buoyancy can be a gross weight of around 400 pounds per float module. Finally, the bottom surface 604 is configured to laterally disperse water flow and air bubbles. Such dispersal can be achieved by, for instance, a surface 604 that slopes upwards and outwards from a central point.

Figure 6D:
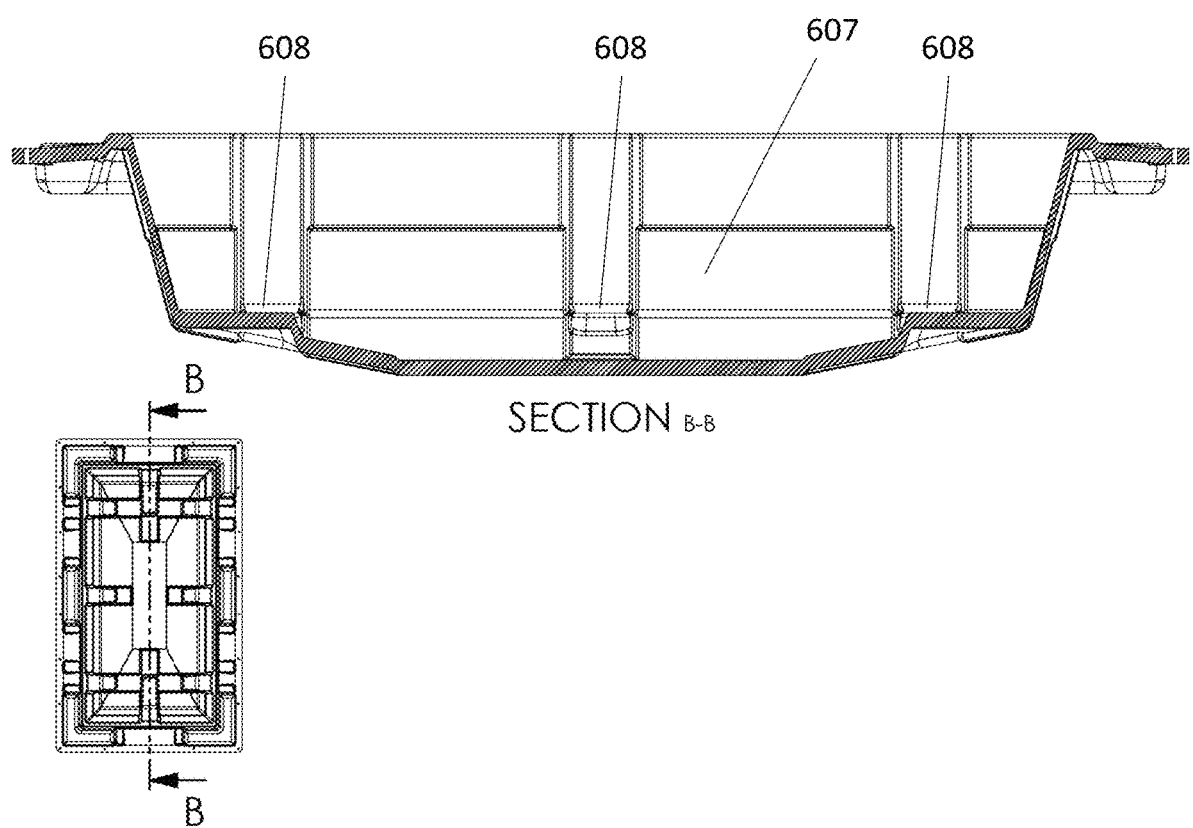
Figure 6E:
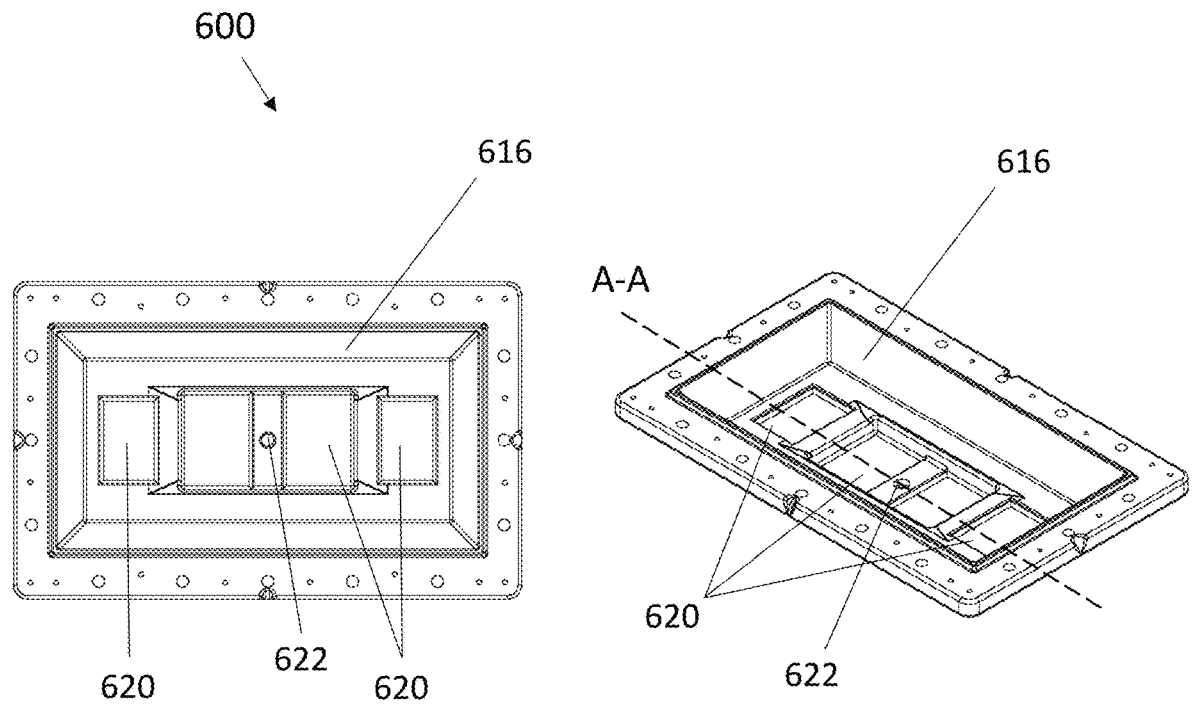
Figure 6F:
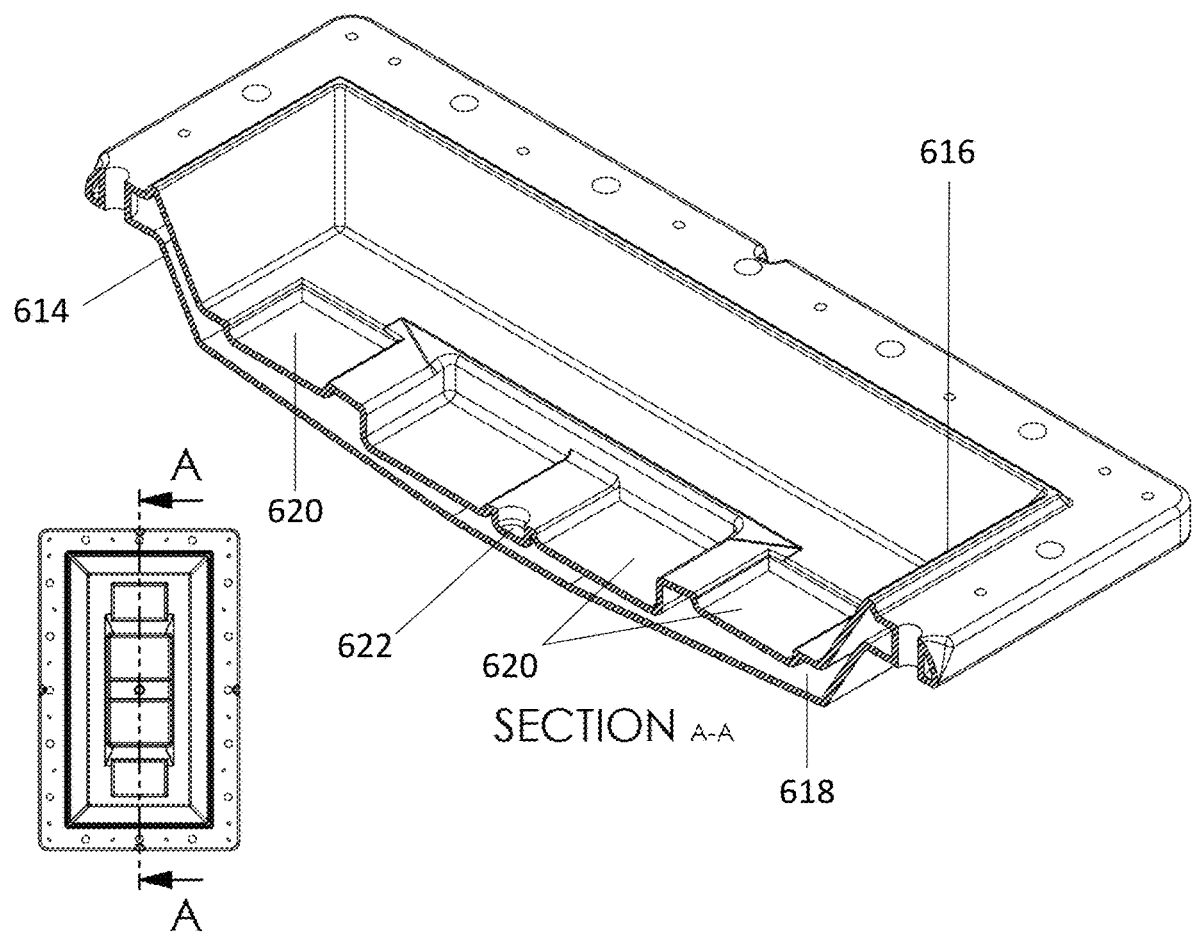
Figure 6G:
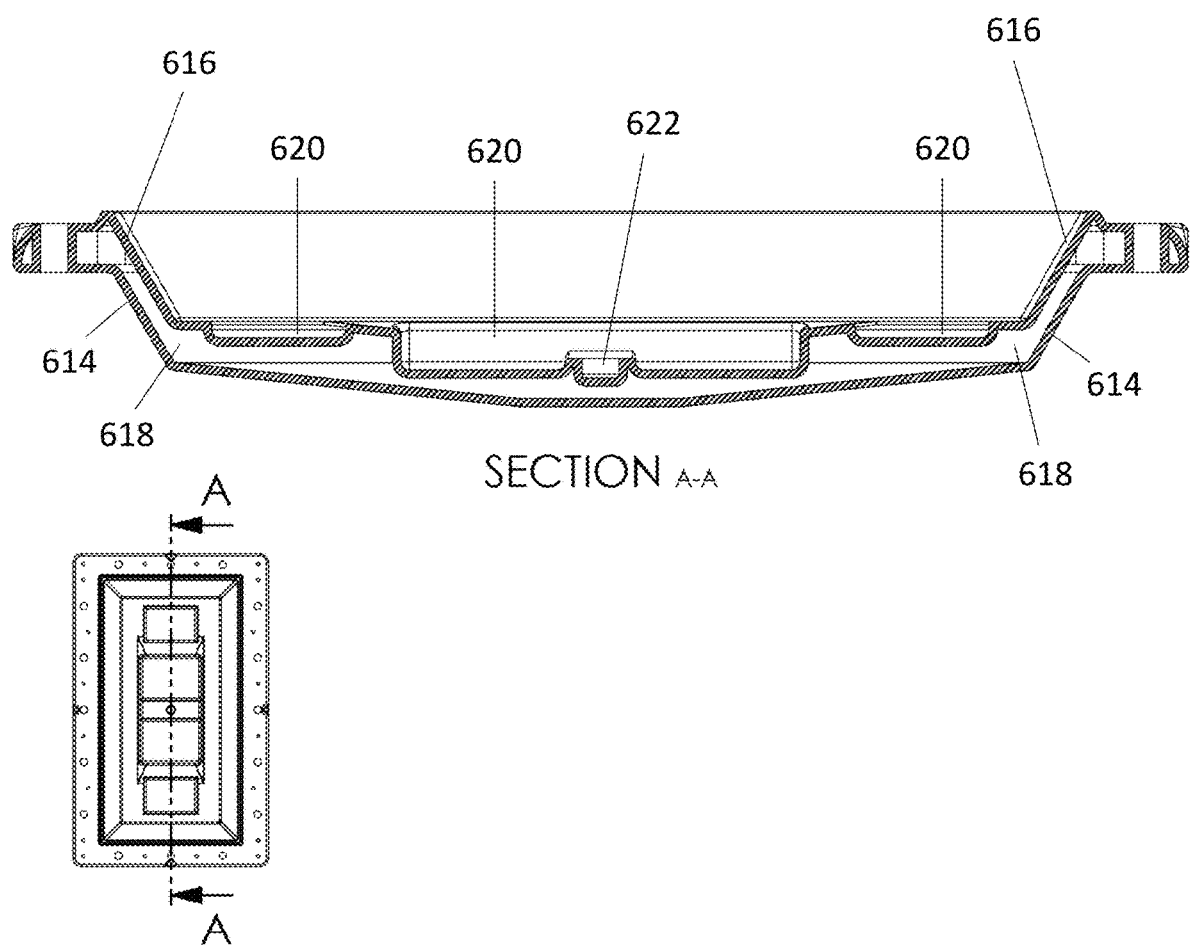

FIG. 6C shows a cross-section of the single-wall float bottom of FIG. 6A, taken along section line B-B, shown from a top perspective view. FIG. 6D shows a cross-section of the single-wall float bottom of FIG. 6A, taken along section line B-B, shown from a side view. In a single-wall embodiment (e.g., manufactured through single sheet thermoforming), the float bottom is comprised of a single profile 612 that both disperses water flow and air bubbles externally and receives an internal surface 808 (shown in further detail below with respect to FIG. 8A) on tabs 608 internally. In a double-wall embodiment (e.g., manufactured through twin sheet thermoforming) as shown in FIGS. 6E-6G, the float bottom is comprised of an external wall 614 and an internal wall 616 that together form an interior space 618, which may be filled with air, foam, and/or other buoyant material. The double wall enables the external wall 614 and internal wall 616 to have different profiles with distinct functions. In at least one embodiment, the external wall 614 has a profile for dispersing water flow and air bubbles outwardly and the internal wall 616 is shaped with indentations 620 to position and hold in place internal components. In at least one embodiment, the interior space 618 is comprised of compartments (not shown) to isolate and contain water leaks in the external wall 614 in order to slow down or prevent the interior space 618 from filling with water.

FIG. 6E shows a top view of one embodiment of the float bottom with a double wall. FIG. 6F shows a cross-section of a double-wall form of the float bottom of FIG. 6E, taken along section line A-A, shown from a top perspective view. FIG. 6G shows a cross-section of a double-wall form of the float bottom of FIG. 6E, taken along section line A-A, shown from a side view. While the wall(s) of the float bottom may be of various thicknesses, for the purpose of the cross-section views 6F and 6G (and also cross section views 6C and 6D) the wall thickness of the illustrated embodiments was chosen for ease and clarity of viewing the wall cross-sections. The internal wall 616 has built-in partitions and/or depressions 620 for receiving internal components and an indentation 622 for receiving a wind turbine mast at a known position. This position may be pre-determined to facilitate proper weight distribution for a given application, to align with a precut hole in a float cover, and/or for consistency in recommended length and angles for wind turbine stays.

FIG. 7 shows the bottom profile of the float bottom that supports the aforementioned dispersion of water flow and air bubbles in further detail. Float and/or floatation module 700 comprises a float cover 702 and float bottom 704 that together can provide a fully water-tight internal space. The float cover and/or the bottom may be similar to, or the same as, any other float and/or cover described herein. Aeration bubbles and water flow and/or current are generated by the system's diffusers (not shown, though non-limiting examples are described in further detail herein), which are submerged in the water adjacent to or underneath the float module. Air bubbles generated by the diffusers rising under the float would generally rise unimpeded upwards to the surface of the water if no structure was present to redirect them. However, when air bubbles contact bottom surface 704, which may slope evenly upwards and outwards from a central point, the bubbles follow the contours of the bottom 704, resulting in the air bubbles being redirected outwards and laterally away in direction 708. The aforementioned sloping may therefore serve to more evenly distribute the water flow/air bubbles, help direct the water flow/air bubbles to the pontoons if present, prevent entrapment of air bubbles under the float, and/or increase the time an air bubble spends in the water (as opposed to taking a shorter path directly upward towards the surface of the water) to increase the amount of oxygen transfer to the water that occurs before the air bubble reaches the surface.

In at least one embodiment, a bottom surface of the float bottom 704 and/or any of the float bottoms described herein increases the amount of air bubble-to-water contact time, allowing for an increased transfer of oxygen into the water. Generally, air bubbles can travel at about 15 inches per second underwater when moving upwards towards the water surface. In at least one example, the bottom surface of the floats and/or floatation modules introduces horizontal distance and/or length such that, for instance, air bubbles must travel a path of approximately 30 inches to go from the bottom center of the float to the water's surface over what would otherwise be about 15 inches of vertical distance. Accordingly, any given air bubble would have, on average, about one extra second of air bubble-to-water contact time. As a non-limiting example, if bubbles are being produced (e.g., via any of the diffuser devices described herein) at a depth of about 48 inches, any given bubble would take about 3.2 seconds to reach the water surface (i.e., about 3.2 inches of air bubble-to-water contact time). If, for instance, the bottom surface of the float and/or floatation module results in about an extra 15 inches of distance, then each bubble would have about a 4.2 second travel time to the water surface. As a result, the bottom surface would increase bubble-to-water contact time of, for instance, about 31.25%. The cumulative impact of such an increase per bubble results for a significant increase in the transfer of oxygen into the water.

In at least one embodiment, a bottom surface of the float bottom 704 and/or any of the float bottoms described herein distributes fine air bubbles, thereby preventing them from collecting in pockets underneath the float and/or floatation module. Such distribution of fine air bubbles occurs as described above herein; specifically, these air bubbles contact a bottom surface of the float bottom 704 and/or any of the float bottoms described herein. In at least one example, this bottom surface slopes evenly upwards and outwards from a central point, thereby causing the fine air bubbles to be redirected upwards and outwards, preventing them from collecting in pockets underneath the float and increasing stability of the float.

In at least one embodiment, a bottom surface of the float bottom (e.g., any of the float bottoms described herein) directs air bubbles towards one or more pontoons and/or pontoon accessories, described below herein, to further direct flow.

Turning now to FIG. 8A, a side view of a float and/or floatation module 800 is shown with a float cover 802, bottom 826, and an attached PV panel 804. The float cover, bottom, and/or PV panel may be similar to, or the same as, any other float, cover, and/or PV panel described herein. Tabs 822 enable attachment of one or more external portions of the float and/or floatation module 800 such as, for instance, legs for attaching PV panel 804 (e.g., legs 816) and/or wind turbine stays (not shown). Interior surface 808 (which may be configured as either a grate, as shown in FIG. 8A, or as a solid surface without any openings) provides a platform or surface for storage and/or attachment of internal components 810, which are disposed within the internal cavity 812 of the float module 800. The internal components 810 can comprise any one or more components that benefit from protection against water and/or natural elements (e.g., batteries, compressor, power subsystem, etc.). The interior surface 808 permits the use of various different configurations of one or more components 810 (e.g., adjustment of the number, type, and/or orientation of these components). As a non-limiting example, the surface 808 can be used for strapping down and/or securing one or more batteries, attaching and/or securing one or more electronics boxes, attaching and/or securing one or more compressors, etc., thereby keeping these components stationary and ensuring the float is balanced correctly (e.g., so that the components do not move around as the float moves). Also shown are depressions 818 and holes 820, which may be similar to, or the same as, any depressions and/or holes described herein (e.g., depressions 506 and/or holes 508). Also shown are the cavities/protrusions 806 along the perimeter of the float bottom that are fitted with the detachable pontoons 824.

Attachment points 814 and/or tabs 822 (which may be similar to, or the same as, cover tabs 560 and 608) are used for attaching legs 816 that support PV panel 804 (also shown at FIG. 5E). These attachment points 814 and/or cover tabs 822 can be configured as raised and/or reinforced flat sections, as shown in further detail at FIG. 8B. Solar panel leg (e.g., leg 553, 555, and/or 816) may have a bottom portion 830 that is connected to attachment point and/or cover tab (e.g., 560, 608, and 814). FIG. 8C shows a non-limiting example of base 850 of a wind turbine, which can be attached and/or secured (e.g., via one or more bolts inserted through bolt holes 852) to an interior surface of the float and/or floatation module (e.g., interior surface 808).

In at least one embodiment, a bottom surface of the float bottom (e.g., any of the float bottoms described herein) is configured to facilitate net harvesting and/or reduction of nets catching on portions of the aeration system. In at least one example, the bottom surface is smooth to allow nets or other tools (e.g., seine nets) to be pulled or moved underneath the aeration system without snagging. In at least one example, the aeration system comprises one or more diffusers that can be lifted out of the way prior to a harvest.

In at least one embodiment, the float and/or floatation module (e.g., any of the floats and/or floatation modules described herein) comprises a single unit, a float cover and float bottom, or a plurality of pieces that together to create a weatherproof internal cavity that may house one or more components.

Pontoons

In at least one embodiment, the aeration system comprises one or more optional pontoons and/or pontoon accessories. The pontoons may have one or more of the following features: (1) the pontoons are attachable to the perimeter of each float bottom and/or float module, (2) the pontoons provide additional buoyancy (e.g., for extremely windy locations, if users need to place all their diffusers off of one side of the float rather than two opposing sides and require something to counteract the combined weight, etc.), and (3) the pontoons strategically direct the water flow and/or airflow, to direct water and/or air to a specific area of the pond and/or tank for fish, or to direct water and/or air away from a specific area of the pond and/or tank (e.g., to prevent bank erosion or other unwanted impacts of flowing water and/or air).

The various features above will now be described in further detail with reference to the below figures.

Figure 9:
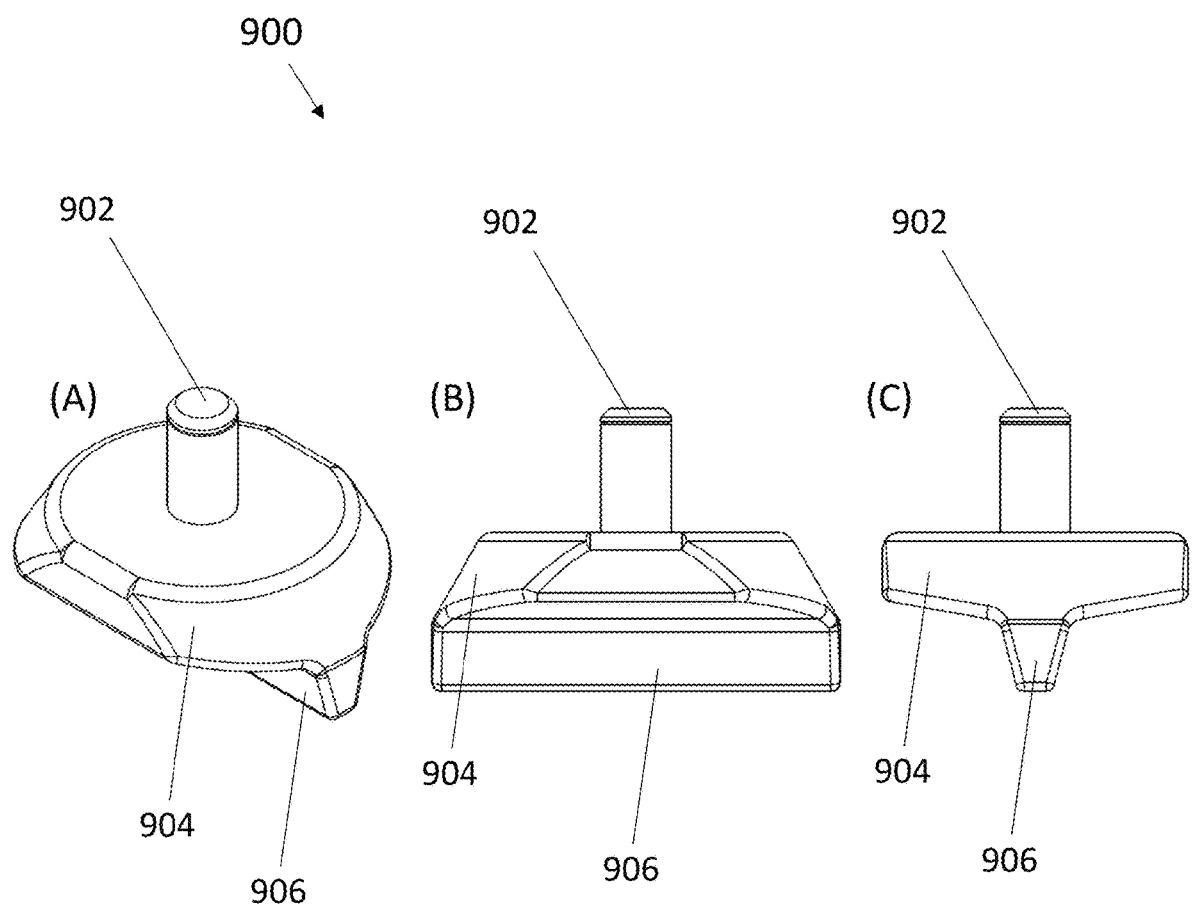
FIGS. 9A-9C show a pontoon and/or pontoon accessory from a perspective view (FIG. 9A), a side view (FIG. 9B), and another side view (FIG. 9C), each according to at least one embodiment of the present disclosure.

FIGS. 9A-9C show one embodiment of a pontoon and/or pontoon accessory 900 from a perspective view (FIG. 9A), a side view (FIG. 9B), and another side view (FIG. 9C). The pontoon 900 comprises an attachment knob 902 that is physically attached and/or connected to a body 904 which, in turn, is physically attached and/or connected to a fin 906. As can be seen, the body 904 tapers at a bottom surface to the fin 906, which directs water and/or air flow depending on the positioning and/or rotation of the pontoon 900 and the fin 906.

In at least one example, the pontoons and/or pontoon accessories 900 (e.g., any of the pontoons and/or pontoon accessories described herein) have one or more of the following: a size (length×width×height) of about 11.5 inches×8.6 inches×8 inches, a mass of 1.6 pounds, and a buoyancy of about 7.6 pounds.

Figure 10:
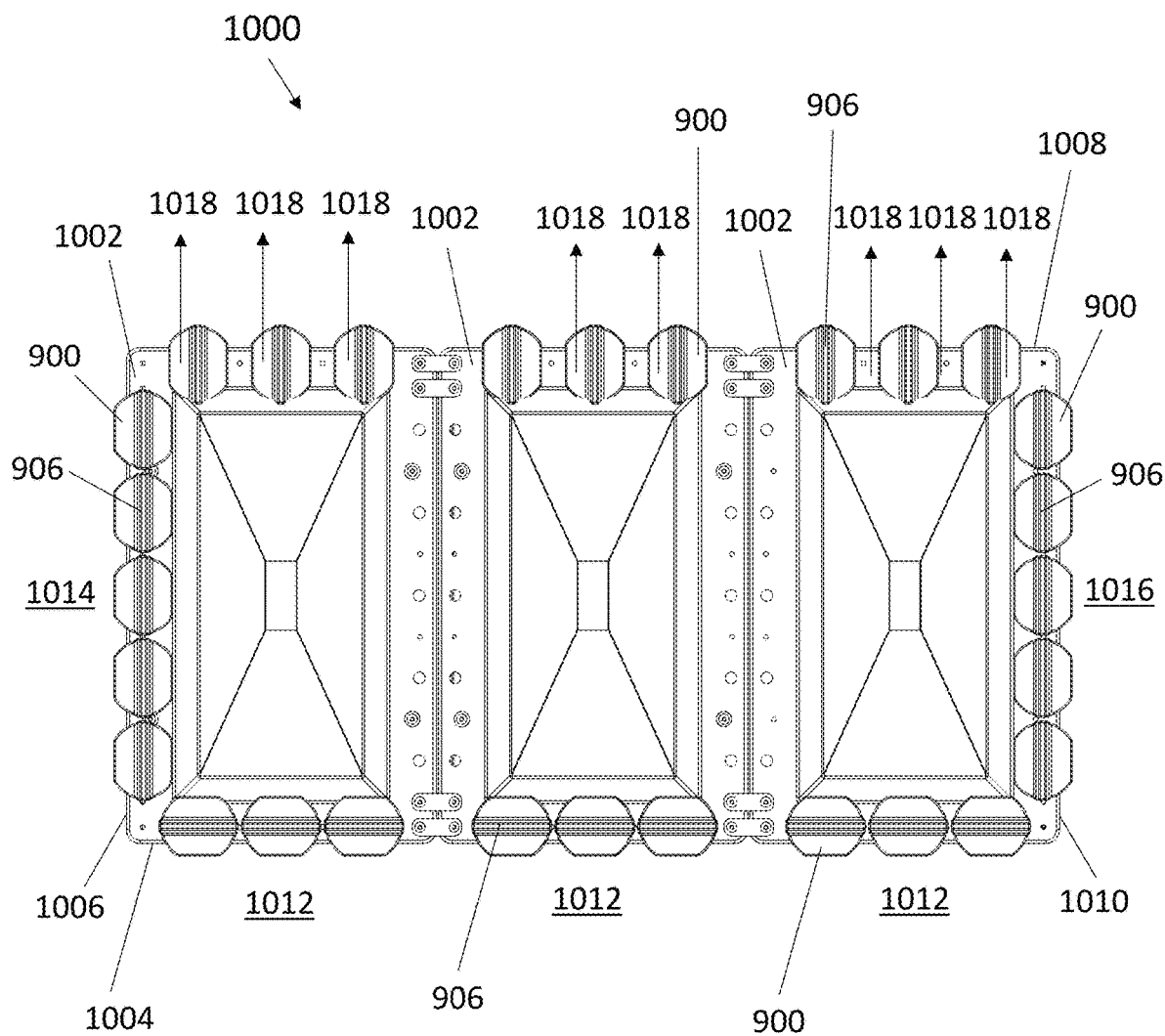
FIG. 10 shows the pontoons and/or pontoon accessories of FIGS. 9A-9C attached to an aeration system, according to at least one embodiment of the present disclosure.

FIG. 10 shows a plurality of one embodiment of the pontoons and/or pontoon accessories 900 used in an aeration system 1000. Specifically, a bottom view of the aeration system 1000 is shown. Three floats and/or float modules 1002 each have a plurality of the pontoons 900 attached, only four of which are labeled for the sake of convenience. The pontoons are positioned such that the fins 906, only four of which are labeled for the sake of convenience, are aligned parallel to the bottom edge 1004, left edge 1006, and right edge 1010, but perpendicular to the top edge 1008. This blocks water and/or air flow from areas 1012, 1014, and 1016, and moves flow towards direction 1018. The pontoon 900 need not be oriented only at parallel or perpendicular angles to the edge of the float, but can be rotated and fixed at a number of angles (e.g., 45-degree angle, not shown) to provide greater options for the direction of flow.

Figure 11:
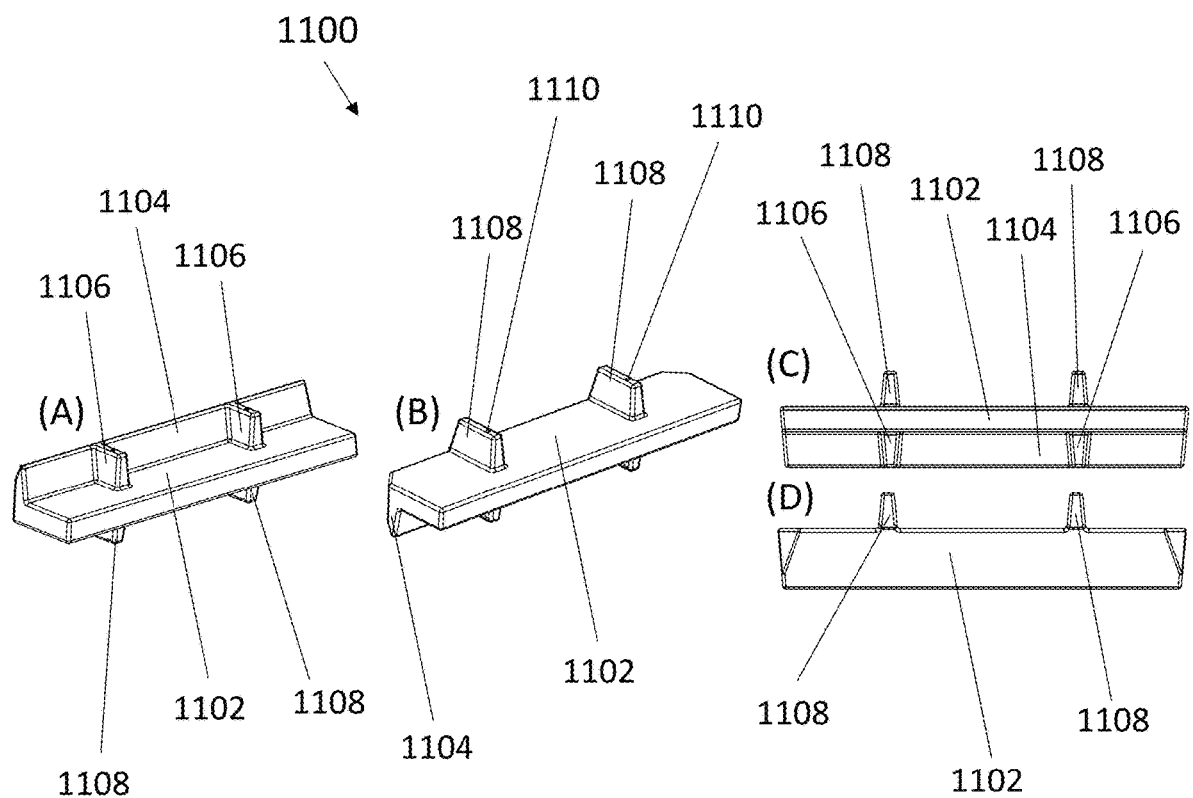
FIGS. 11A-11D show a pontoon and/or pontoon accessory from a perspective view in a first position (FIG. 11A), a perspective view in a second position (FIG. 11B), a side view in the second position (FIG. 11C), and another side view in the second position (FIG. 11D), each according to at least one embodiment of the present disclosure.

FIGS. 11A-11D shows one embodiment of a pontoon and/or pontoon accessory 1100 from a perspective view showing the pontoon oriented in an open position (FIG. 11A), a perspective view showing the pontoon oriented in a closed position (FIG. 11B), a side view showing the front side of the pontoon when in a closed position (FIG. 11C), and a side view showing the backside of the pontoon when in a closed position (FIG. 11D). The smaller pontoons 900 previously discussed may allow more fine-tuned control of the support and/or blocking/directing of flow provided by a pontoon accessory. Pontoon 1100 is larger and may serve to more easily provide support and/or block/direct flow for a larger segment of the float module at once. The pontoon 1100 comprises a base portion 1102, wall 1104, protrusions 1106, and fins 1108 that are physically attached. The pontoon protrusion 1106 wedges next to a protrusion on the perimeter of the float bottom (e.g., bottom 606 and 806) as a point of contact. The pontoon protrusions 1106 may further hold the pontoon in place by providing a surface to bolt the pontoon to the float module. When the pontoon 1100 is in an open position (FIG. 11A), there is no wall 1104 blocking water and/or air flow on the underside of the pontoon, and the fins 1108 help to direct flow. When the pontoon 1100 is flipped to a closed position (FIG. 11B), the fins 1108 wedge next to the protrusion on the perimeter of the float bottom (e.g., 606 and 806) and may further hold the pontoon in place by providing a surface 1110 to bolt the pontoon to the float module. In the closed position (FIG. 11B), the wall 1104 is on the underside of the pontoon and blocks the flow of water and/or air bubbles.

Figure 12:
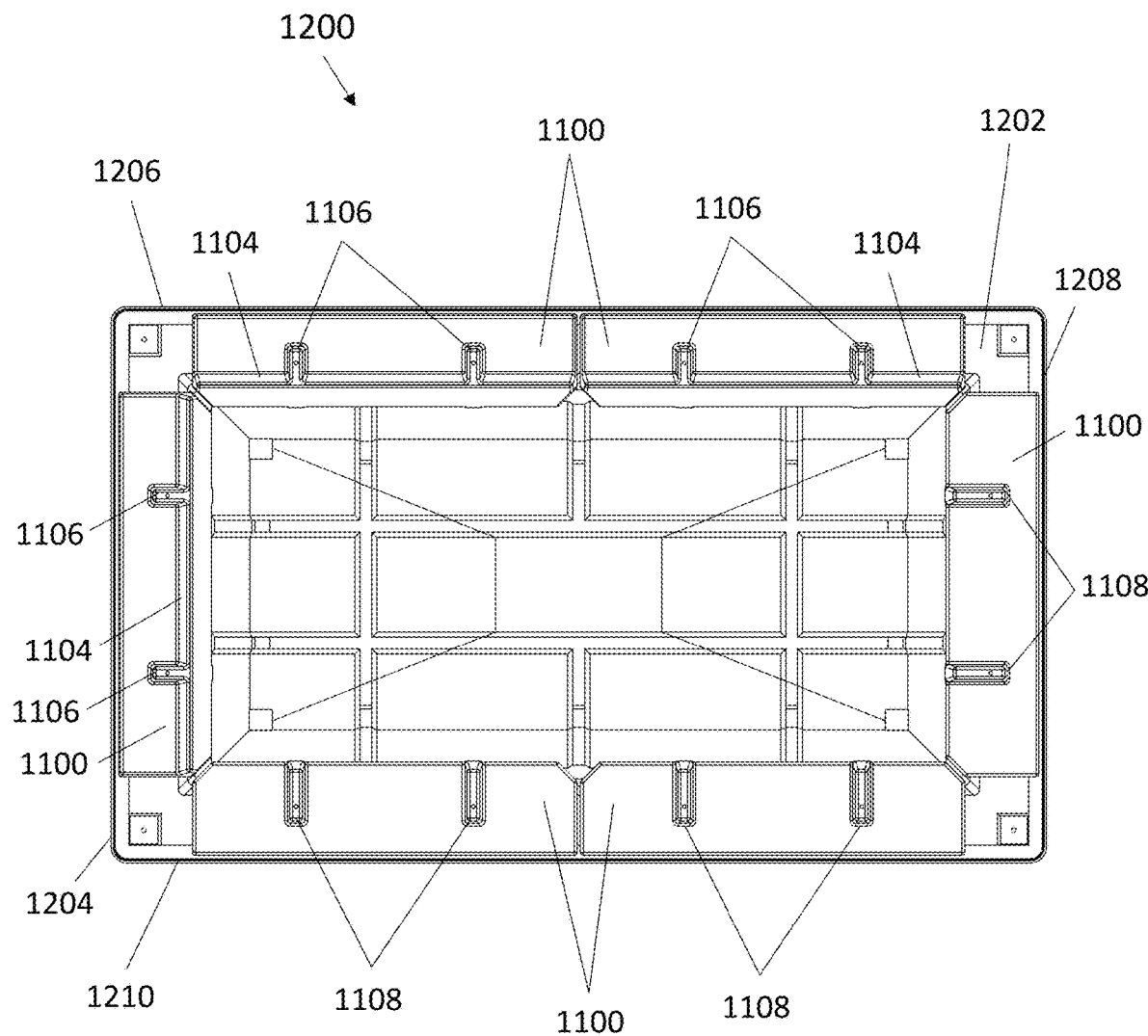
FIG. 12 shows the pontoons and/or pontoon accessories of FIGS. 11A-11D attached to an aeration system, according to at least one embodiment of the present disclosure.

FIG. 12 shows a plurality of the pontoons and/or pontoon accessories 1100 used in an aeration system 1200. Specifically, a bottom view of the aeration system 1200 is shown. A float and/or float module 1202 has a plurality of the pontoons 1100 attached. Three of the pontoons are in a closed position such that the wall 1104 is facing downward into the water along left edge 1204 and top edge 1206, thereby blocking water and/or air flow along those edges. However, three pontoons are in an open position such that the fins 1108 are facing downward into the water along the right edge 1208 and bottom edge 1210, thereby allowing water and/or air to flow outward along those edges. As mentioned above herein, the pontoons may be secured to the float and/or float module 1202 via, for instance, attachment/bolt holes 1110, as shown in FIG. 11B.

Figure 13A:
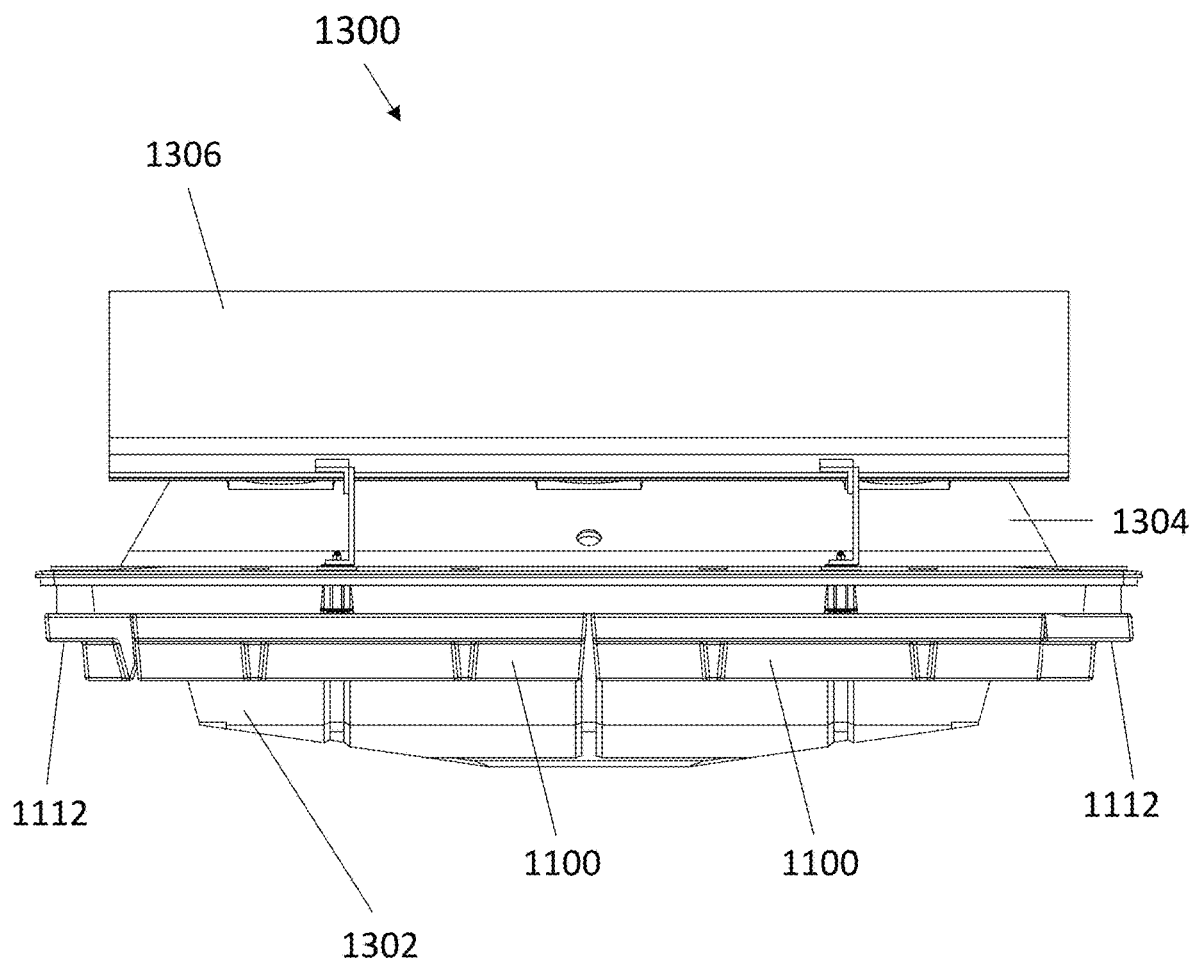
FIGS. 13A-13C show another aeration system to which the pontoons and/or pontoon accessories of FIGS. 11A-11D may be attached, including a side view of the aeration system with attached pontoons (FIG. 13A), another side view of the aeration system showing a bottom edge of the attached pontoons resting at a water line (FIG. 13B), and the aeration system without any attached pontoons (FIG. 13C), each according to at least one embodiment of the present disclosure.
Figure 13B:
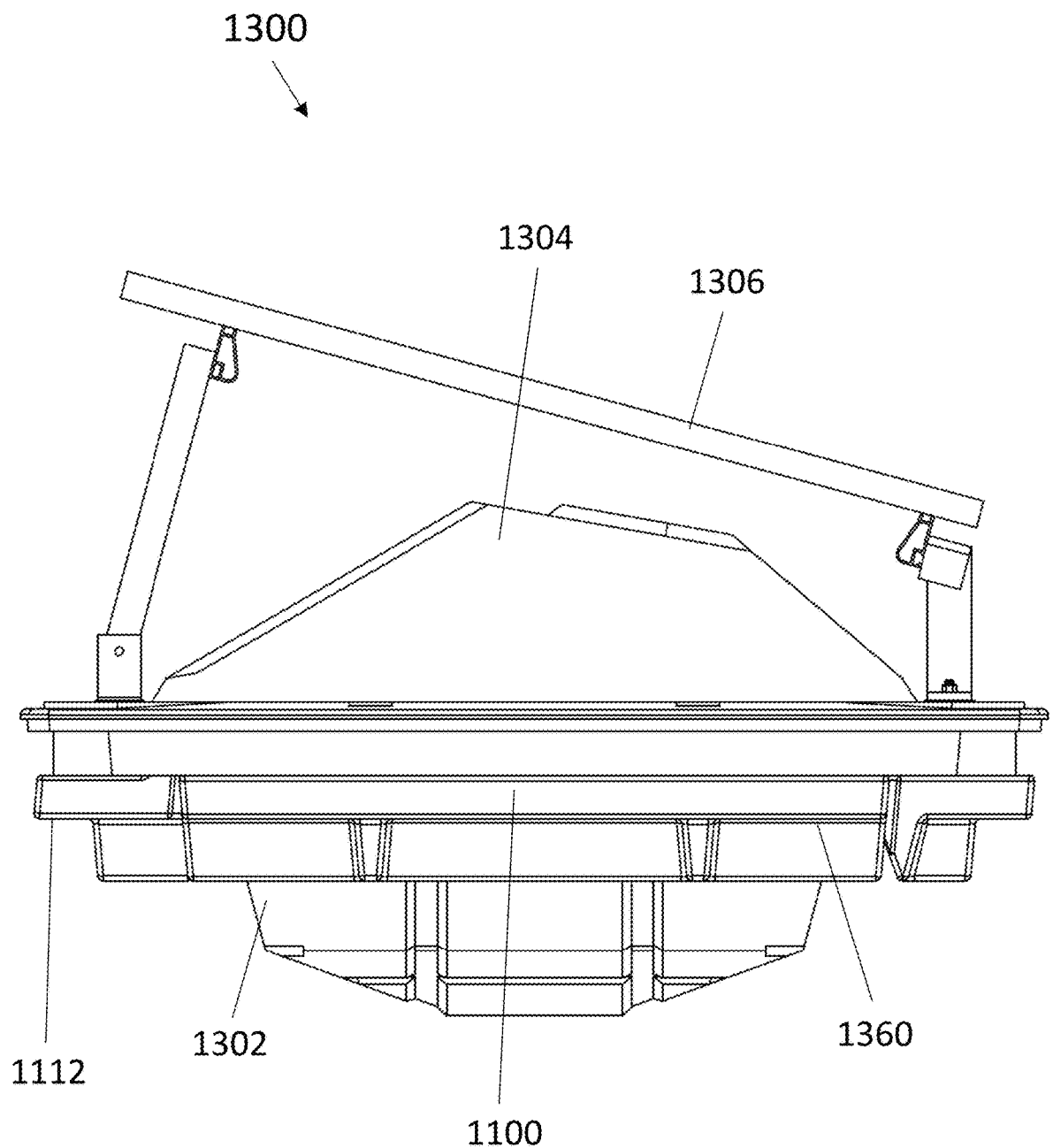
Figure 13C:
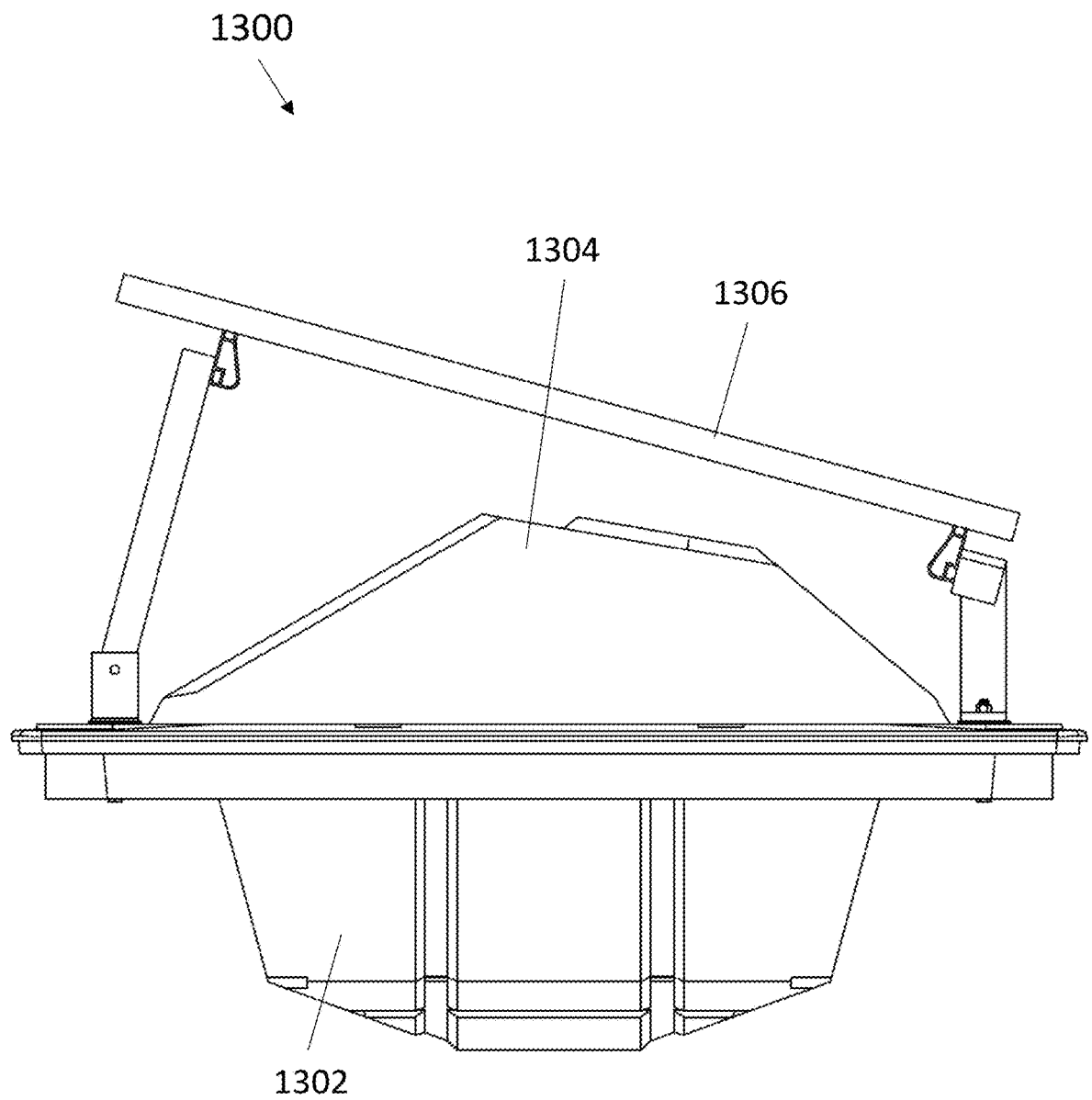

FIGS. 13A-13B show a plurality of the pontoons and/or pontoon accessories 1100 used in an float module 1300. Specifically, FIG. 13A shows a side view of the aeration system 1300 with two pontoons in a closed position. The system 1300 comprises a float cover 1304, float bottom 1302, and a PV panel 1306. The pontoons 1100 are attached along a perimeter edge of the float module 1300. FIG. 13B shows a bottom edge 1112 of the pontoon 1100 resting at the water line 1360 when the float module 1300 sits in the water (e.g., of a pond or tank), with the pontoon wall (e.g., 1104) beneath the water line to block flow at the edge 1112. FIG. 13C shows the same float module 1300 without any pontoons.

In at least one embodiment, the pontoons and/or pontoon accessories (e.g., any pontoons and/or pontoon accessories described herein) increase load capacity and/or stability of the aeration system. Such increased load capacity and/or stability may be achieved by an increase in buoyancy provided by the pontoon(s). Since each pontoon itself floats, attachment of pontoons and/or pontoon accessories to the float and/or floatation module (e.g., around the perimeter as shown in FIG. 12) results in the float and/or floatation module gaining extra buoyancy, making it more resistant to overturning. In other words, the attachment of pontoons and/or pontoon accessories lessens the chance that an edge of the float and/or floatation module overturns or is submerged underwater during windy periods, periods with high wave heights in the pond and/or reservoir, etc. In addition, in adverse external loading conditions when the float lists/tilts to one side, the pontoons may dip into the water and act as an outrigger (e.g., as on a canoe), increasing the restoring buoyancy moment force to return the float to its nominal position. In at least one embodiment, such pontoons and/or pontoon accessories comprise one or more walls to block aeration flow and/or one or more fins to direct aeration flow.

In at least one example, the pontoons and/or pontoon accessories 1100 (e.g., any of the pontoons and/or pontoon accessories described herein) have one or more of the following: a size (length×width×height) of about 33 inches×8 inches×8 inches and a buoyancy of about 24 pounds.

In at least one example, installation of pontoons and/or pontoon accessories around a perimeter of the aeration system results in an added buoyancy of about 168 pounds, an increased water line length of about 20 inches, and/or an increased water line width of about 18 inches. Such increases in buoyancy, water line length, and/or water line width results in increased stability to the aeration system. At least as used herein, the term "water line" is used for stability comparisons, commonly known as the beam in a boat, and refers to the line that the water in a water body (e.g., pond, tank, or reservoir comes up to on the side of a float and/or floatation device. FIGS. 13B-13C illustrate the increased water line length and width for an aeration system (e.g., system 1300) that can result from the installation of pontoons and/or pontoon accessories. As in FIG. 13A, float bottom 1302, cover 1304, and PV panel 1306 are shown. In FIG. 13C, no pontoons are installed on system 1300, resulting in water line 1350. In FIG. 13B, as in FIG. 13A, pontoons 1100 (with bottom edges 1112) are shown installed on system 1300, resulting in water line 1360. With pontoons 1100, the water line is increased in both length and width; that is, water line 1360 is larger in both length and width as compared to water line 1350. Specifically, water line 1360 extends to an outer edge of the system 1300, as shown in FIG. 13B. A wider and/or longer water line generally results in more stability due to a larger and/or flatter surface that rests in the water.

Diffuser Device for Aeration System

In at least one embodiment, the aeration system utilizes submerged diffuser aerators to provide aeration and/or water circulation. In at least one embodiment, the system comprises one or more novel diffuser units. In at least one example, the novel diffuser unit is configured to be suspended in a water column at variable water depths and to self-level to achieve optimum aeration capacity.

A skilled artisan will recognize that, ideally, all portions of a diffuser should be maintained at the same water depth or water pressure in order to maintain equally distributed air flow for optimal aeration. Unlevel diffusers will produce air from only the relatively higher portion of the diffuser, rather than utilizing all of the available top surface area to more efficiently diffuse air into the water.

Currently available diffuser aeration devices connect the diffuser material to flexible hosing that does not guarantee the diffusers will hang level and vertically in the water column due to the buoyant forces of the compressed air in the air hose and diffuser. To achieve a level state, these diffuser aerators are designed to have the diffusers rest on the bottom of the water body. However, such a design limits the placement of the diffuser aerator to only those locations where the water body bottom is at the appropriate depth for a given compressor and where the bottom is level and flat. Further, placement of the diffuser on the bottom of the water body can be problematic for various reasons, including, but not limited to, sub-optimal placement for addressing thermoclines that occur mid-water, increased diffuser fouling, and erosion of the ground beneath the diffuser(s).

By contrast, the novel diffuser device according to at least one embodiment of the disclosure is uniquely configured to be suspended in the water over a wide range of water depths that correspond with the performance capabilities of a given air compressor. The diffuser device achieves self-leveling by connecting a horizontally positioned manifold containing the diffuser material to a vertical, stiff, weighted tube or rigid pipe. This forces the diffuser material to maintain a plumb angle relative to the air tube or pipe. In addition, the combined weight of the weighted tube, the manifold, the diffuser material, and any additional attachments connected thereto establishes a vertical orientation in the water. In at least one example, rubber tubing (e.g., rubber aeration tubing) is used as the diffuser material that can easily accommodate the differing airflow requirements of different water depths by adjusting the total length of tubing segments used in a particular diffuser device. In addition to the length of the diffuser material segments, the total number of diffuser devices used in a system may be adjusted to accommodate the airflow of the compressor and the environment. A base plate may also be attached beneath the diffuser to prevent any air bubbles from eroding the ground should the diffuser be suspended close to the water body bottom. This attached base plate may provide additional weight to maintain the suspended diffuser's vertical orientation in the water. The novel diffuser described may be similar to, or the same as, any other similar devices described herein (e.g., with respect to FIG. 25B).

Figure 14A:
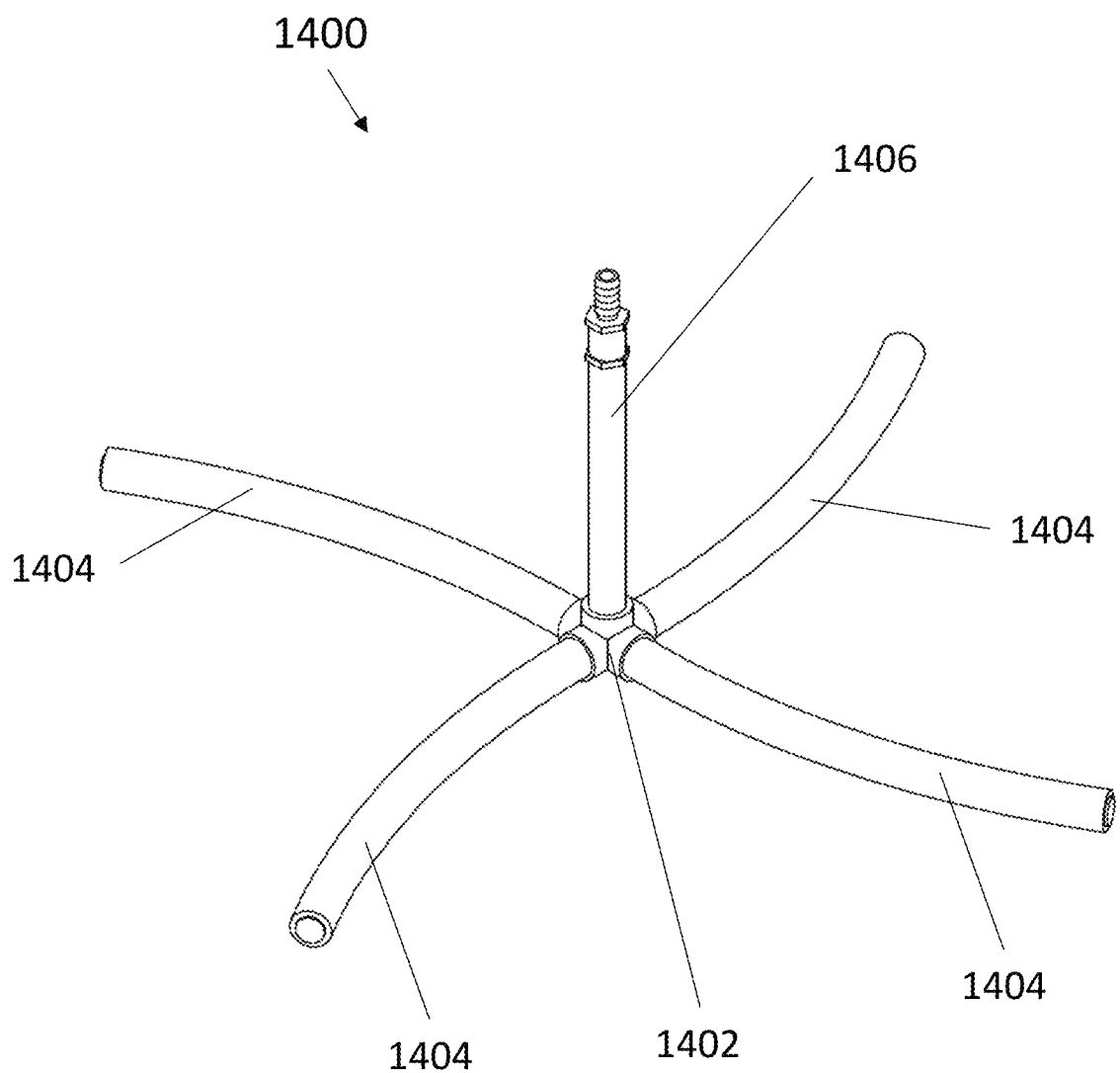
FIGS. 14A-14B show an aeration device with diffusers having two different lengths, a first length (FIG. 14A) and a second length (FIG. 14B), each according to at least one embodiment of the present disclosure.
Figure 14B:
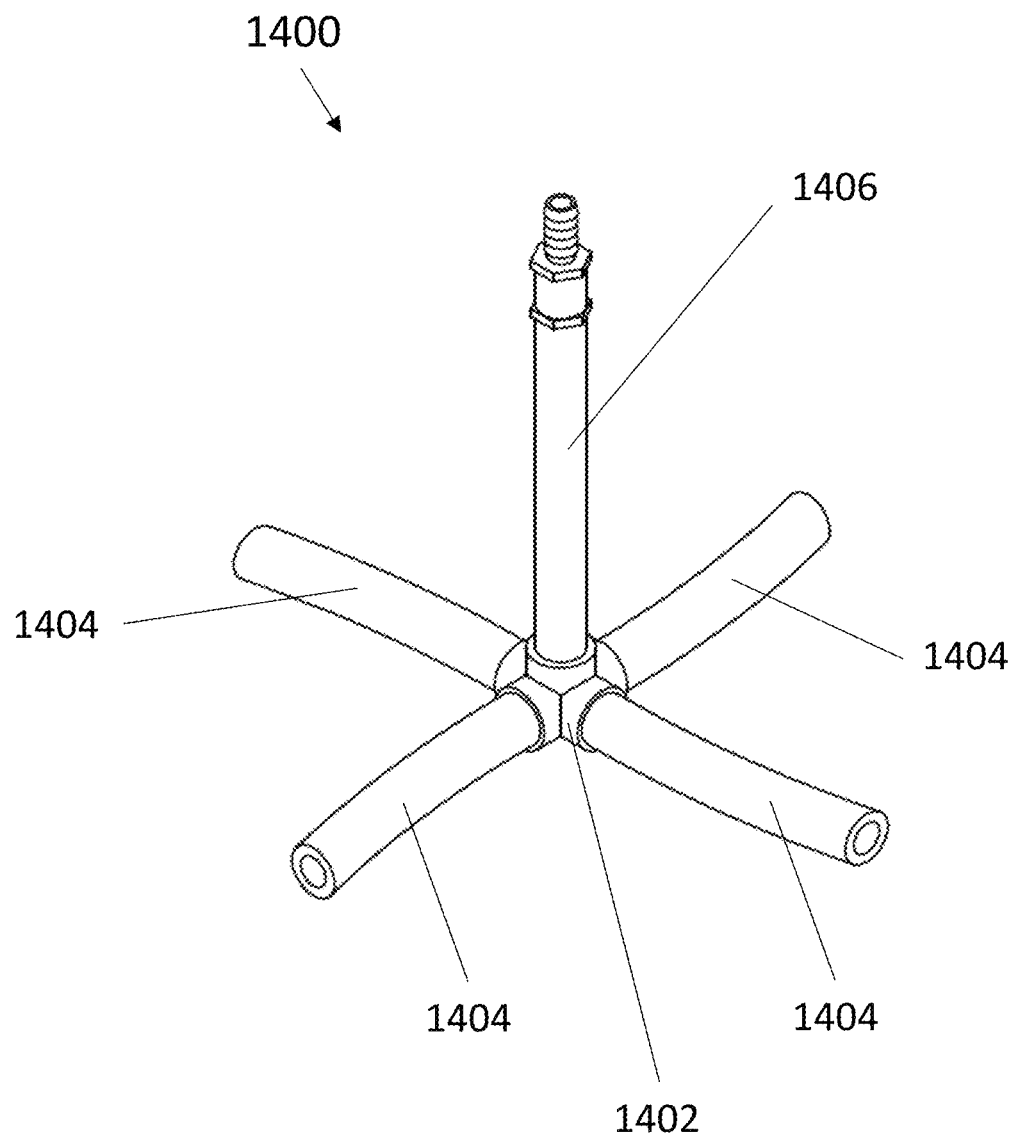

Turning now to FIGS. 14A-14B, a novel diffuser device 1400 is shown with diffuser segments having two different lengths, a first length (FIG. 14A) and a second shorter length (FIG. 14B), for two different compressors and/or air flows. The aeration device 1400 comprises a manifold 1402 that is arranged with horizontal connections to a plurality of diffuser material, which may include, but is not limited to, the rubber tubing segments 1404 shown. The manifold 1402 is also connected to a straight and rigid weighted pipe 1406. The pipe 1406 extends vertically upwards from the manifold 1402. In at least one example, the pipe 1406 is perpendicular to the manifold 1402. The pipe itself is connected to a weighted air hose (not shown). In at least one example, the manifold 1402 ensures that the rubber tubing segments 1404 are all arranged in a same horizontal plane with respect to each other. Thus the rubber tubing segments 1404 each maintain a plumb angle relative to the pipe 1406 and the air hose to which the pipe is connected to (not shown). The weight of the pipe 1406 helps ensure a vertical orientation of the diffuser device and the weighted air hose in the water. As described above, different lengths of diffuser tubing can be used in connection with the aeration device 1400 depending on differing airflow requirements. In addition to the length of the diffuser material segments, the total number of diffuser devices used in a system may be adjusted to accommodate differing airflow requirements.

Figure 25A:
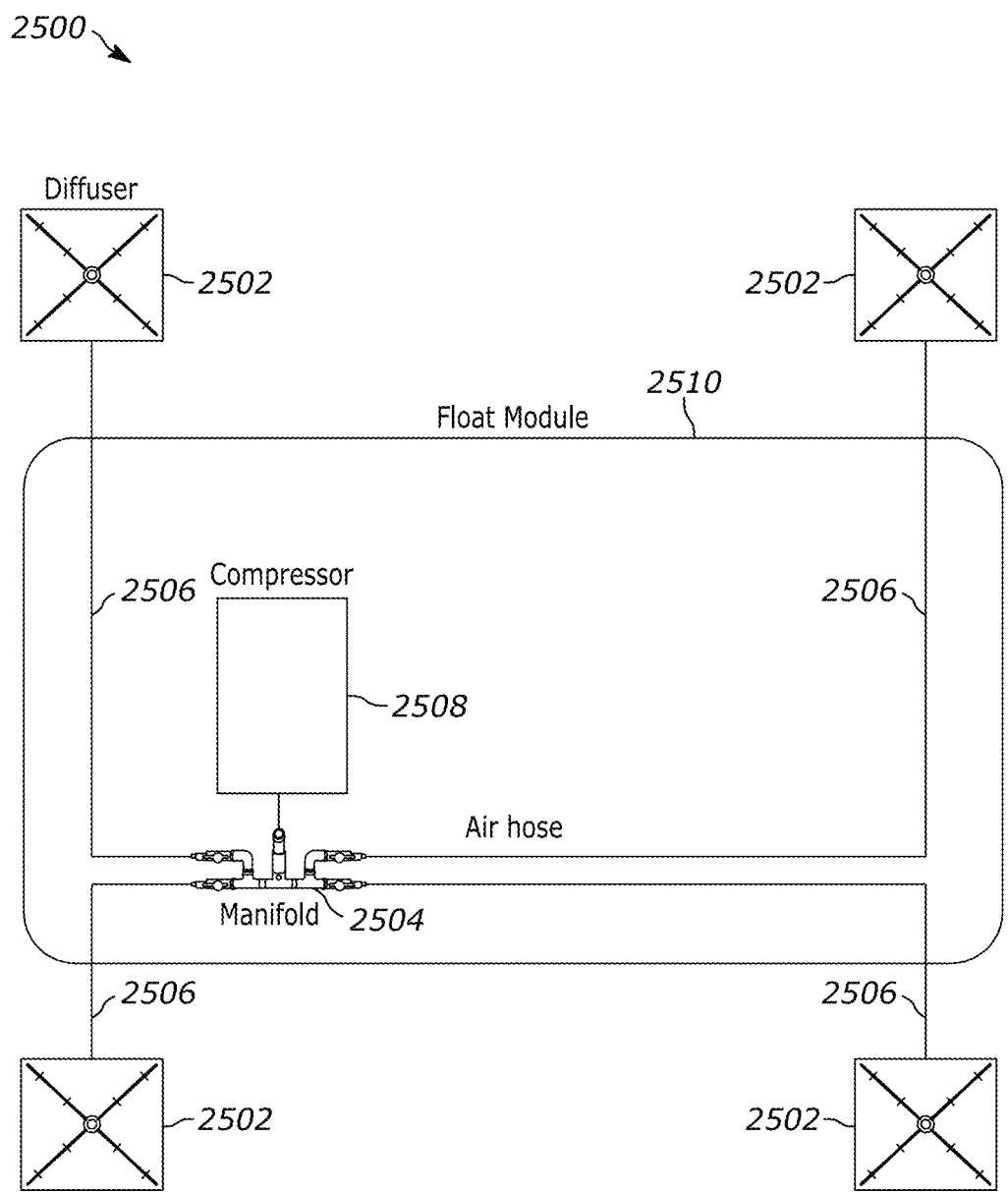
FIGS. 25A-25B show various diffusers, including a 4-diffuser arrangement used with a single float module system (FIG. 25A) and a single novel diffuser device (FIG. 25B), each according to at least one embodiment of the present disclosure.
Figure 25B:
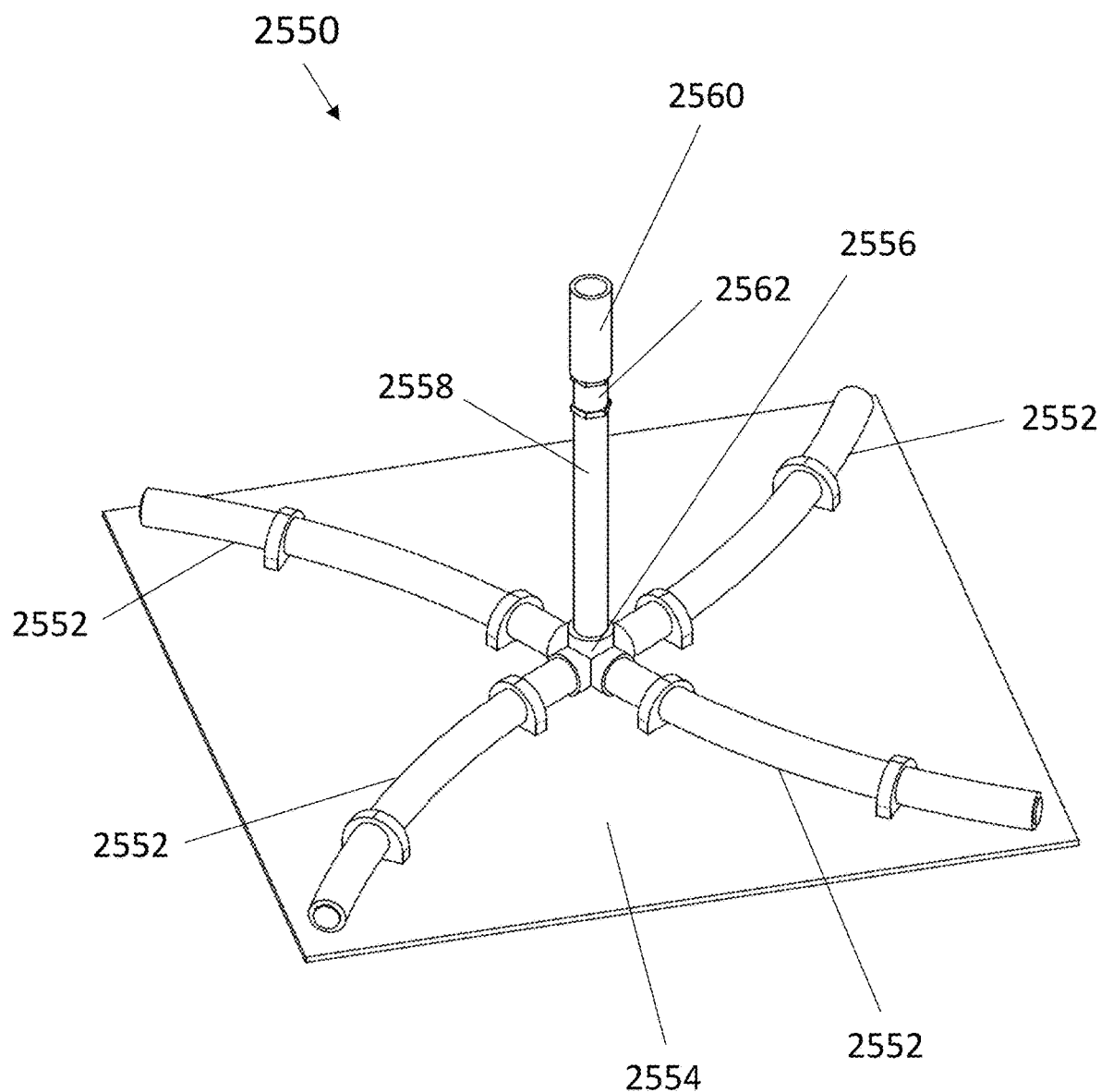

Turning now to FIG. 25B, a rigid, negatively-buoyant base plate 2554 may also be attached beneath a diffuser 2550 to prevent any diffused air bubbles from potentially eroding the water body bottom should the diffuser be suspended close to the water body bottom. This attached base plate 2554 may provide additional weight to help offset the buoyant forces of the compressed air in the air hose and diffuser, and thereby help maintain the suspended diffuser's desired depth and vertical orientation in the water. In addition to showing the diffuser features described above herein (e.g., diffuser segments 2552, 5-way manifold 2556, and rigid pipe 2558), FIG. 25B shows the air check valve 2562 and a portion of the weighted air hose 2560 that is suspended from the float module. In at least one example, the one or more check valves 2562 prevent water and/or air from being pushed back into the one or more air hoses and/or compressors. This may occur if, for instance, the compressor or compressors are turned off, lose power, and/or otherwise fail to operate and produce compressed air. Such backflow could result in entry of water into the air hose and/or compressor(s), potentially damaging the one or more compressors and, in freezing and/or wintertime conditions, potentially resulting in the intruding water freezing and rupturing the air hose(s).

In at least one example, the diffuser device may be made of one or more materials, including, but not limited to, stainless, steel, polyvinyl chloride (PVC), polypropylene plastic, and rubber. For instance, the weighted pipe (e.g., pipe 1406) and/or the manifold (e.g., manifold 1402) may be made of stainless steel. Hose clamps may also be made of stainless steel. Further, hose fittings and/or check valves may be made of PVC or polypropylene plastic. Finally, diffuser segments (e.g., segments 1404) may be made of rubber.

Thus, the diffuser device may have one or more of the following features: (1) the diffusers connected to the aeration device can be suspended at various water depths (e.g., midwater), allowing them to be placed at specific locations throughout the pond or tank and at optimal depths for the compressor and/or water body needs regardless of pond or tank topography, (2) the device is self-leveling due to the horizontally-positioned manifold connected to a straight weighted or rigid pipe, (3) the weight of the weighted pipe and associated components establishes a vertical orientation in the water column, (4) the material used for the diffusers accommodates differing airflow requirements by adjusting the total length of tubing used, and (5) the diffuser may have a base plate to prevent erosion and add additional weight.

As a non-limiting example, the diffuser device can be suspended at various water depths based on the compressor's air pressure capacity. The original length of the diffuser segments may represent a maximum air flow for a rated water depth at which the aeration device can be deployed underwater according to the compressor performance curve(s); however, in at least one example, the diffuser depth can be adjusted post-deployment without having to disassemble the aeration device or any portion thereof. Such adjustment can be achieved by, for instance, raising the diffuser, which results in a decrease in water pressure and more air exiting the diffuser, or lowering the diffuser, which results in an increase in water pressure and less air exiting the diffuser. This occurs because an aeration compressor's air flow and air pressure have an inverse relationship.

As a further non-limiting example, adjusting the length of the diffuser segments (e.g., the rubber tubing) can adjust the airflow as follows. Using a greater length of tubing (e.g., tubing 1404) results in a greater surface area for air to escape since such tubing is porous. Therefore, an increased amount of such tubing can accommodate an increase in the amount of air output from the compressor.

Shapes and/or Form Factors

In at least one embodiment, the aeration system comprises one or more float modules having different shapes and/or form factors that permit nesting, improved shipping and/or stacking, and are modular.

In at least one example, the float bottoms and/or covers (e.g., any float bottom and/or cover described herein) are configured to fit on a standard-size shipping pallet. The float bottoms and/or covers can also be configured to nest tightly within each other to allow for multiple floats and/or covers to be shipped efficiently. In other examples, float bottoms and/or covers and/or combinations thereof may be any desired size, including sizes up to 7.5'×30' that fit within a standard shipping container, or any size that fits on a flatbed truck. With larger floats, a single float may support multiple PV panels, and/or large PV panels. In at least another example, multiple float bottoms and/or covers are incorporated into one or more larger float modules each of which may be, for instance, about 7.5 ft by about 30 ft. Such larger float modules are larger than a standard-sized shipping pallet and can be configured to fit into, for instance, a standard shipping container or on a standard flatbed vehicle/truck. In various embodiments, floats, float bottoms, and/or float covers (as well as other components) may be various sizes and shapes, and differently sized floats may be attached to each other to create a wide variety of sizes and shapes of installations.

Turning now to FIGS. 15A-15B, two stacking or nesting configurations are shown, a first orientation (FIG. 15A) and a second orientation (FIG. 15B). In FIG. 15A, three float bottoms 1502, as well as three covers 1504, are shown stacked and/or nested within each other, arranged horizontally. In FIG. 15B, three float bottoms 1502, as well as three covers 1504, are shown stacked and/or nested within each other, arranged vertically on a standard shipping pallet 1506, with enough space for a box 1508 containing the corresponding assembly components. The sizing of the float modules may be based on optimizing space on a standard-size pallet. In another embodiment, the cover may also be flipped upside down and stacked in the float bottom such that the raised portion of the cover fits inside of the cavity of the float bottom (not shown).

In at least one example, a stacked arrangement of three floats and three covers has dimensions (length×width×height) of about 79 inches×about 47.3 inches×about 28 inches. In at least one example, such a stacked arrangement fits on a 48 inch×40 inch pallet and, with other components, has a total shipping dimension (length×width×height) of about 48 inches×about 40 inches×about 84 inches.

In at least another example, the aeration system, and/or one or more portions or components thereof, is modular such that it can be sized to meet the requirements of one or more users. For instance, the system can have a varying number of float modules, float bottoms, float covers, batteries, PV panels, wind turbines, subsystems, subsystem components, and the like.

As a non-limiting example, multiple floats and/or floatation modules are modular and can be connected together in varying numbers and/or configurations. FIGS. 16A-16B show two different arrangements and/or orientations of floats, a first orientation (FIG. 16A) and a second orientation (FIG. 16B). In the first orientation, three floats 1602 are shown attached and/or connected to each other length-wise in a 3×1 arrangement. In the second orientation, four floats 1602 are shown arranged in a 2×2 array. Also shown are connectors 1604, only two of which are labeled in each of FIGS. 16A and 16B for the sake of convenience. Such connectors may be made of, for instance, metal, rubber, plastic, or any other similar material. It should be appreciated that, in both the arrangements shown in FIGS. 16A and 16B, additional floats can be added as necessary, depending on user requirements and/or aeration needs. It should also be appreciated that, in FIGS. 16A-16B, only the float bottom of the float modules 1602 are shown for clarity to illustrate the connections and layout thereof. It should be appreciated that increasing the number of modules in the array also increases the stability of the overall system. In at least one embodiment, an array of float modules is much more stable than a single float module because an array can exert the restoring buoyancy force from a much larger righting arm than a single float. A single float relies on its center of gravity and center of buoyancy for stability, which is contained within its footprint (e.g., righting arm length is limited to the width of the single float). In contrast, in an array, the center of gravity can be located in the center of the array, but the righting arm length is from the center of gravity to the furthest float, which is a length much larger than that of a single float.

Figure 17:
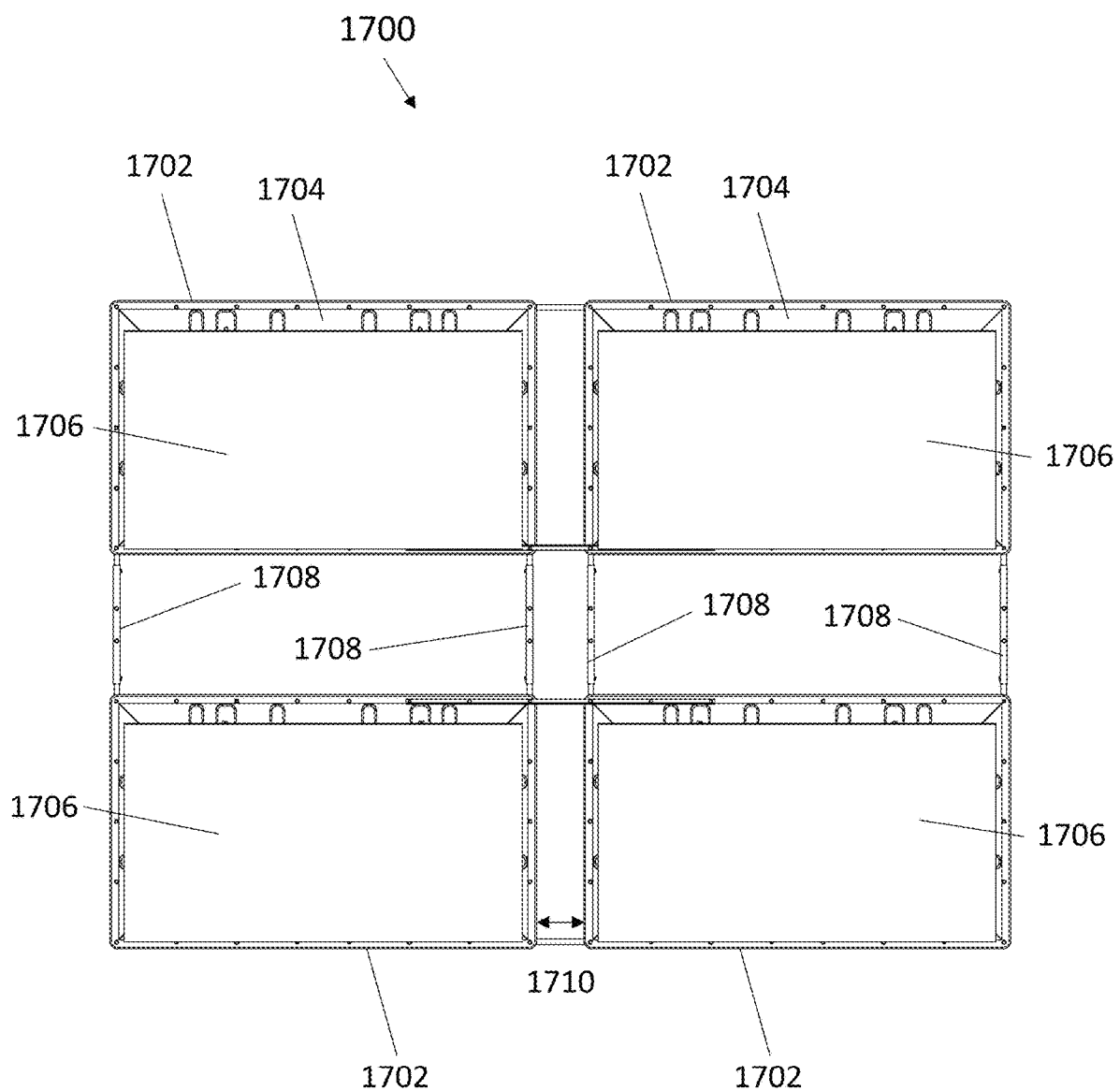
FIG. 17 shows an arrangement of modules of an aeration system, according to at least one embodiment of the present disclosure.

FIG. 17 shows another non-limiting example of an arrangement of float modules of an aeration system 1700. Four modules are shown in a top view, each module comprising a cover 1704, float bottom 1702, and a PV panel 1706. It should be appreciated that in a top view the float bottoms are fully obscured by the covers 1704 and are therefore not visible. The modules are arranged and/or connected in a 2×2 array via connectors 1708, which can comprise one or more pieces made of metal (e.g., aluminum, steel, stainless steel, angle iron, etc.), plastic, rubber (e.g., neoprene), or other similar material that connect the modules 1702 together, and are attached to the modules along their edges, as shown in FIG. 17. In at least one example, the connectors 1708 are made of steel angle iron, and are secured to each other and to the modules 1702 with bolts. Other attachment mechanisms (e.g., nuts, screws, etc.) are possible. The connectors 1708 can provide rigidity between float modules so that they act as one larger system and are therefore more stable (e.g., a larger system exerts the restoring buoyancy force from a much larger righting arm than a single float). The connectors 1708 may also serve to provide a pre-determined gap between the modules that corresponds with the latitude of the location where the aeration system is deployed, such that the shadow cast by one module does not cover the adjacent module and reduce the solar radiation received by the attached PV panel (e.g. aeration systems deployed at 38 degrees north latitude may require an approximate gap of 42 inches). In at least one example, a distance 1710 between any two of the modules 1702 is about 10 inches.

Figure 18:
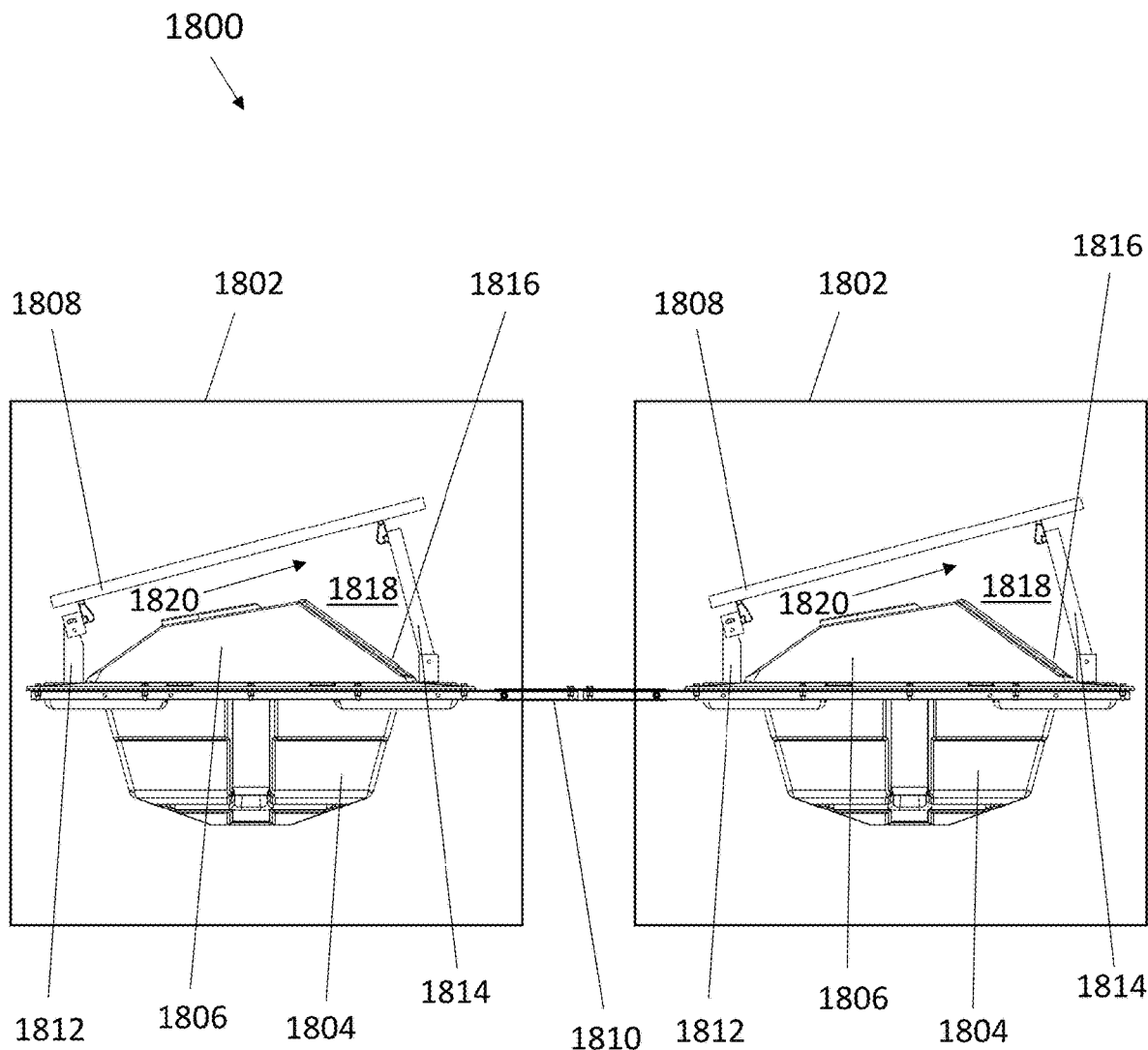
FIG. 18 shows various features of the float cover, specifically the raised portion of the cover and wind movement through an empty space between the cover and the PV panel, according to at least one embodiment of the present disclosure.

FIG. 18 shows another non-limiting example of an arrangement of modules of an aeration system 1800. Two modules 1802 are shown in a side view. Each module comprises, at minimum, a float bottom 1804, a cover 1806, and a PV panel 1808. The two modules 1802 are connected via connector 1810. The PV panel 1808 has a lower end supported by the shorter legs 1812 and a higher end supported by the longer legs 1814. Partially visible is a hatch 1816 located on the long side of the cover under the high end of the PV panel. Additionally shown is empty space and/or area 1818 that is disposed between the cover 1806 and the PV panel 1808. This empty space 1818 permits the flow 1820 of air and/or wind to pass through without encountering any surfaces that would block the air and/or wind and act as a wind dam, thereby minimizing the wind resistance of the aeration system. The cover is angled to support the shedding of water and/or snow, allow sufficient height to accommodate all the internal components of the system, and maximize the height of the hatch 1816 under the high end of the PV panel, while still maintaining the gap 1818 between the cover and the angled PV panel across the width of the system for wind passage. It is important to angle the cover to maximize the height of the hatch 1816 to ensure that internal components can fit out of the hatch opening for removal/replacement. In comparison, a flat cover with the same height as the low end of the angled cover would reduce the height of the hatch 1816 and may prevent certain internal components from being removed through the hatch 1816. A flat cover with the same height as the high end of the angled cover may not be possible since such a flat cover would obstruct the tilt of the PV panel, or else the PV panel would have to be raised, thereby raising the center of gravity of the system and reducing stability. By contrast, the raised cover utilizes the space under the PV panel to maximize room for the internal components and maximize the height of hatch 1816, while also providing a gap 1818 for wind passage.

Power Subsystem

In at least one embodiment, the aeration system comprises one or more power subsystems. The power subsystem may comprise of one or more PV panels and/or wind turbines mounted on a float, as well as one or more compressors and auxiliary equipment (e.g., electrical controls, sensors, and ventilation and safety equipment) housed within an internal cavity of the float. The power subsystem may also comprise an optional BSS that may be charged by the renewable energy resource (e.g., PV panels and/or wind turbines) and can be used to power the device's compressor(s) and auxiliary equipment. The power subsystem's auxiliary equipment includes but is not limited to the DACS, indicator equipment such as lights, safety equipment such as a SPD, and/or ventilation equipment such as cooling fans, which may be located inside the internal cavity or mounted on the float. The DACS monitor, assess and control the system's operations, and may include a charge controller, inverter, microcontroller, wireless communication device, DC bus, circuit breakers, relays, sensors (e.g. solar radiation, air pressure and temperature), analog to digital converter, and a real-time clock. The power subsystem may also power a secondary load including but not limited to additional compressor(s), sump pump(s), heating element(s), bird deterrent(s), automatic feeder(s), and/or solar panel cleaning device(s).

In at least one example, the electronic controls have one or more customizable settings, including, for instance, different programmable operation modes (e.g., daytime operation, nighttime operation, prioritizing continuous operation of the compressor(s), prioritizing battery charge, operating outside of selected operation hours if there is excess power, etc.), run times that can be established by a user (e.g., setting a start and end time and/or a duration), and/or established thresholds (e.g., DO level) measured by the system itself or communicated from external devices (e.g., existing DO monitors and/or aeration devices used by the user and/or pond manager) that can adjust the system's operation (e.g., turn it on or off). These customizable settings may be remotely programmable and/or controllable (e.g., via WiFi or other wireless connections) and enable the aeration system to function in different applications and environments, including, for instance, different types of ponds, tanks, and/or farms, and to accommodate different needs of users. In some embodiments, a wired data connection may also be made for data exchange/settings customization, for example in case of wireless connection failure, in which case the port for wired data connection may be watertight (e.g. with a watertight cover).

In at least one example, a first operation mode prioritizes running one or more portions, components, and/or subsystems of the aeration system (e.g., the aeration device described herein) at full power during time periods (e.g., the night and into the early morning hours) when dissolved oxygen levels are typically at their lowest, and to run less and/or prioritize battery charging during time periods (e.g., during the day) when dissolved oxygen levels and/or production are typically at their highest.

In at least one example, a second operation mode enables a user to run the compressor and charge the battery at, for instance, a 50-50 split. This mode could be activated if the user desired to enable aeration constantly or on a 24/7 basis.

In at least one example, at third operation mode enables a user to input and/or program a custom operation time and/or time period, where the user can pick the hours each day that they want the aeration system, or one or more portions, components, and/or subsystems thereof, to prioritize running over charging (e.g., prioritizing the aeration system to run after routine fish feeding, which is a period when fish are generally consuming more oxygen due to energy expended on digestion).

In at least one example, a fourth operation mode enables the aeration system, or one or more portions, components, and/or subsystems thereof, such as the aeration device described herein, to run only when the DO reaches a specific and/or pre-determined level. The aeration system, or one or more portions, components, and/or subsystems thereof, may comprise an integrated DO sensor to enable the aforementioned operation mode.

In at least one embodiment, the power subsystem can run the compressor(s) at variable power, instead of only in an ON/OFF setting at a set power level. This will allow the device to produce air at varying levels of available solar/wind power, battery charge/voltage, and/or other set or measured parameters, increasing the efficiency and effectiveness of the device when continuous aeration is a priority.

In at least one embodiment, the power subsystem comprises one or more ventilation systems to maintain one or more electronics components in a dry and well-ventilated area. In a non-limiting example, the aforementioned ventilation systems comprise holes (e.g., holes 508) in the cover, as described above herein and shown with particular reference to FIGS. 5A-5D and 6C. The holes (e.g., holes 508) can be used for ventilation of air; specifically, air can be drawn into the float cavity through the holes to maintain an internal temperature. The holes (e.g., holes 508) may have a filter disposed over them (e.g., filter 512 as shown in FIG. 5C) to prevent particulate matter (e.g., leaves, twigs, insects, etc.) from entering the internal cavity.

Figure 19A:
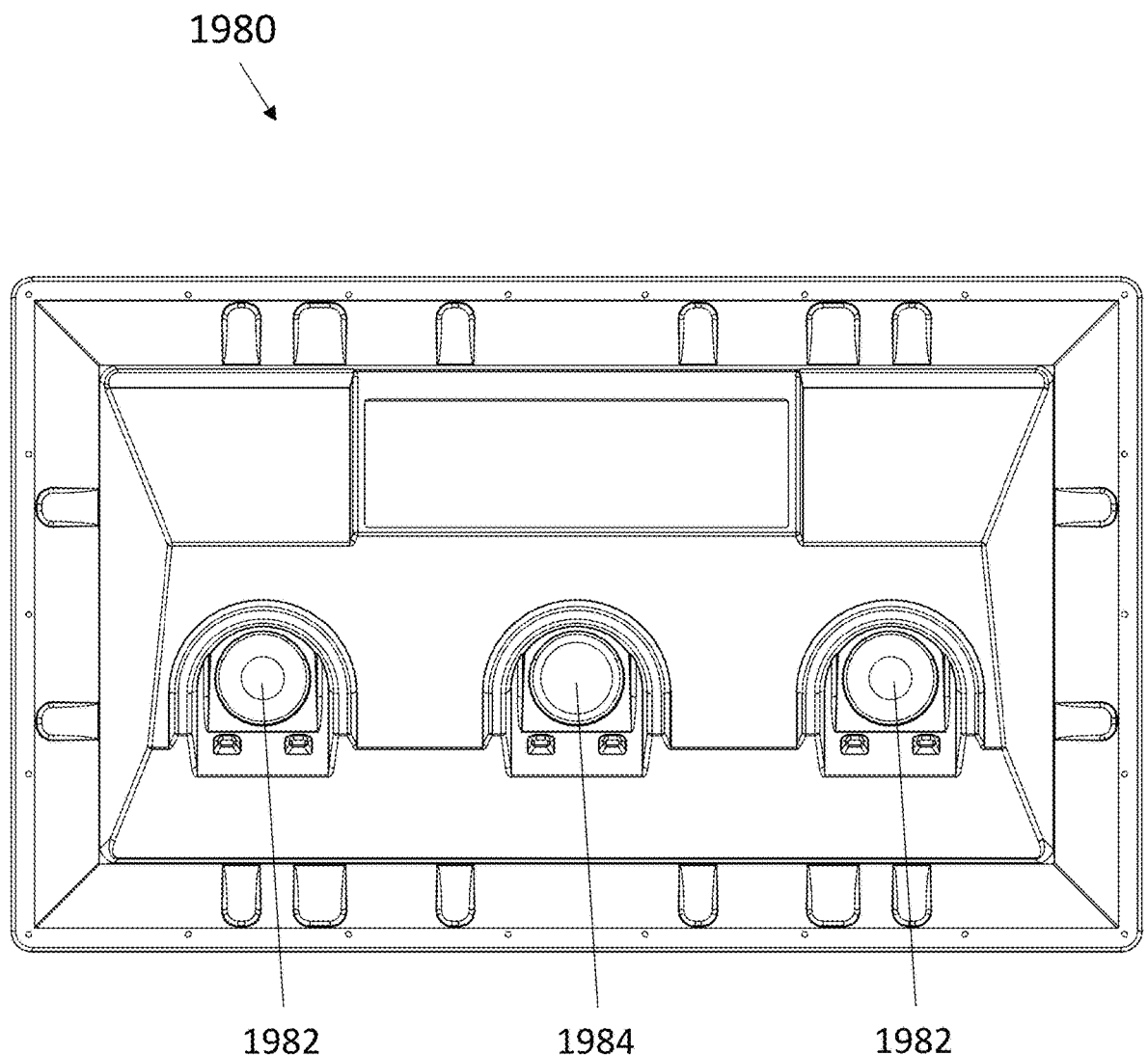
FIGS. 19A-19F show various aspects of the power subsystem, including a float cover with holes for the ventilation system (FIG. 19A), a side view of a cross-section of the ventilation system (FIG. 19B), a perspective view of a cross-section of the ventilation system with airflow arrows (FIG. 19C), a schematic diagram of a battery-power power subsystem (FIG. 19D), an enclosure with sensitive electronics (FIG. 19E), and the enclosure and other components in an example of an internal cavity (FIG. 19F), each according to at least one embodiment of the present disclosure.
Figure 19B:
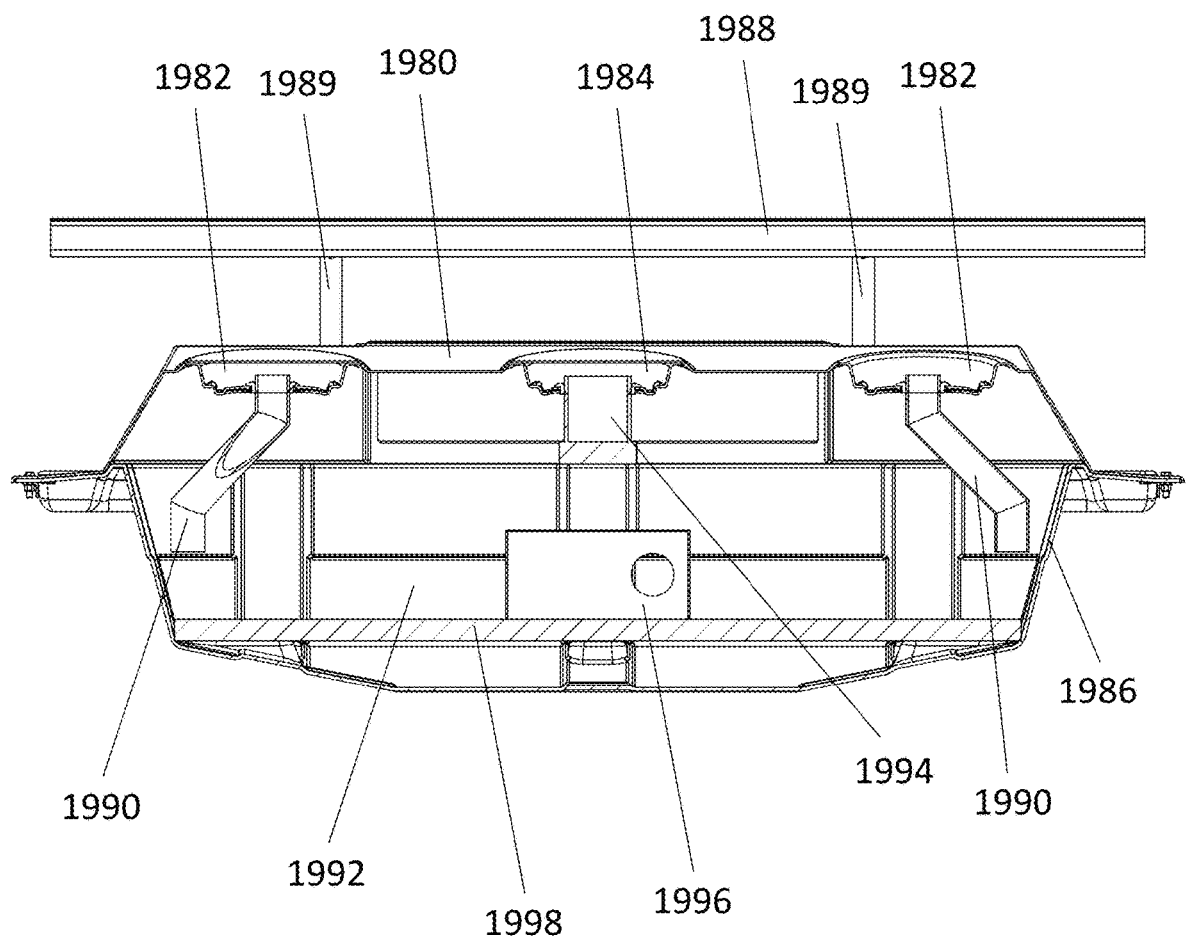

FIG. 19A shows a further non-limiting example of a cover with holes, which may be similar to, or the same as, any other cover with holes described herein (e.g., cover 500 with holes 508). Cover 1980, shown in a top view, comprises two holes 1982 and a central hole 1984. The holes 1982, as with holes 508, can be used as air inputs. Further, the hole 1984 may be larger than each of the two holes 1982. An exhaust fan (which is not shown, but may be similar to, or the same as, fan 1936) can be disposed in the hole 1984. The air drawn out through the fan can create a vacuum inside the float and/or internal cavity, thereby pulling in air through the holes 1982 (as with holes 508). As seen in FIG. 19B, air hoses (e.g., 1990) may be attached at the air inlet holes 1982 to direct the inflow of air to a particular location (e.g., next to the compressor to cool the compressor). The placement of the types of holes in FIG. 19A is a non-limiting example and the holes may be placed in any position and/or combination of positions (e.g., the larger exhaust fan hole 1984 may be placed to the left-most position and the two air inlet holes 1982 may be placed in the two right-most positions, or any combination thereof).

Turning now to FIG. 19B, a side view of a float module with a float cover 1980, a float bottom 1986, and a PV panel 1988 is shown, each of which may be similar to, or the same as, any other cover, float bottom, and/or PV panel described herein. FIG. 19B also shows a side view of one embodiment of a ventilation system. The cover 1980 comprises holes 1982 and central hole 1984, as also shown in FIG. 19A. Conduits 1990, which may be made of material such as pipe or hose, are attached to holes 1982 (e.g., via a fitting) and extend into the internal cavity 1992 to provide air intake, as described above herein. The conduit 1990 may be placed such that it directs the air inflow to a particular component or area within the internal cavity 1992 (e.g., to the compressor) for optimal cooling of the system. Fitting 1994, which may be made of a material such as a pipe, extends through central hole 1984 into internal cavity 1992; fitting 1994 can be connected to an exhaust fan, as described above herein. Box 1996, which is inside the cavity 1992, can be disposed on surface 1998, which may be similar to, or the same as, any solid surface or platform as described above herein (e.g., with respect to FIG. 8A). Box 1996 contains electronics components (e.g., controllers, inverters, printed circuit board (PCB), etc.) and therefore may be similar to, or the same as, any other similar enclosure or container described herein (e.g., box 1950).

Figure 19C:
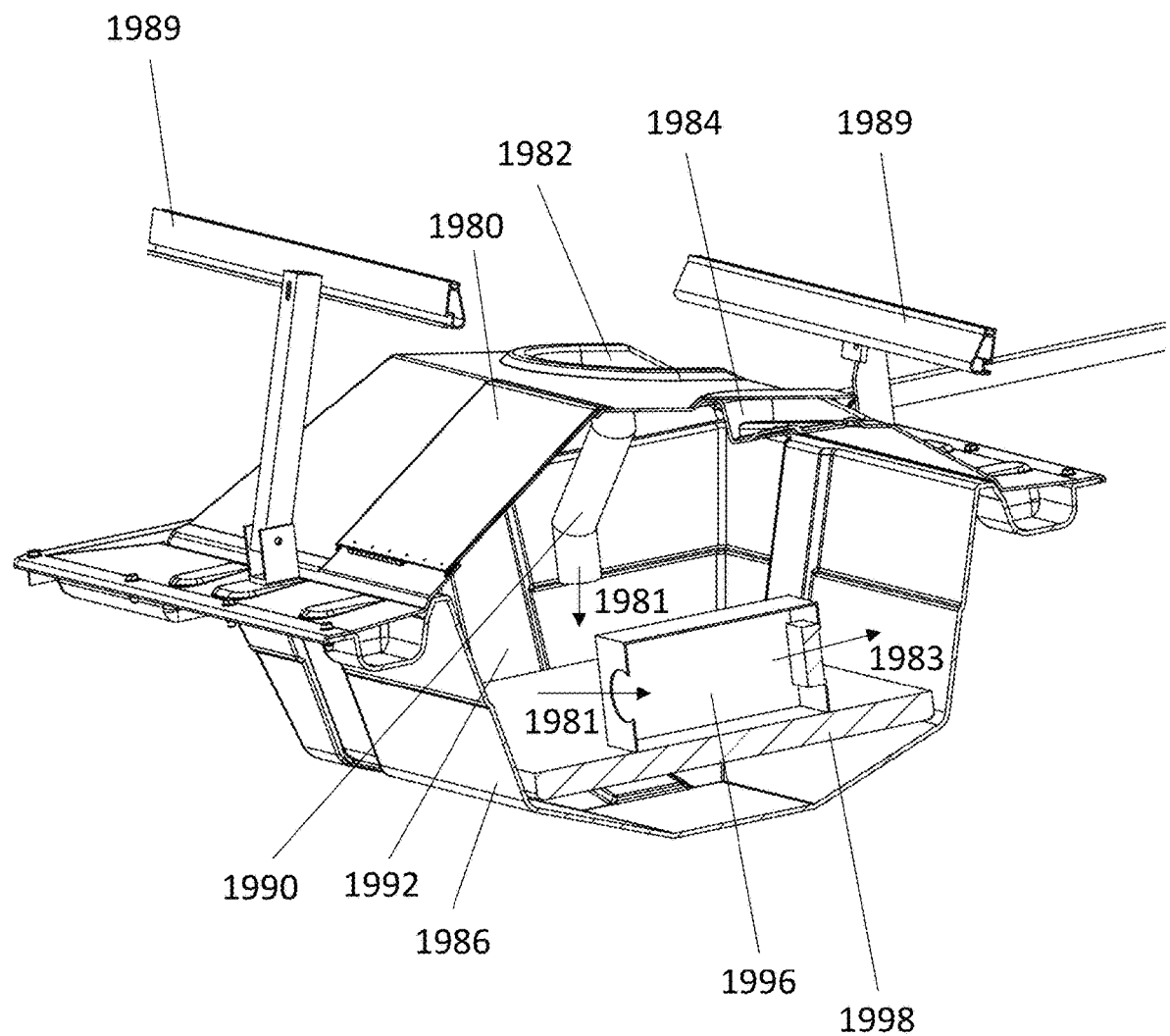

FIG. 19C shows a cross-section of the float module with a similar ventilation system. In addition, FIG. 19C shows the movement of air throughout the ventilation system, as indicated by the arrows. The arrows 1981 indicate air being pulled into the system via air inlets and the arrows 1983 indicate air being pulled out of the system via exhaust fans.

In at least one embodiment, the power subsystem is configured to allow for the adjustment of the desired aeration power level based on the available solar and/or wind availability, battery charge and/or voltage, and/or other set or measured parameters. This capability makes it possible to prioritize providing continuous aeration even in limited solar and/or wind conditions (e.g. cloudy conditions). In at least one example, this is accomplished using a signal relay, PWM signal, controller, and/or VFD to manage the power to the compressor(s) based on the level of battery charge and/or voltage, solar radiation, and/or wind availability. In at least one embodiment, a custom plug-in PCB (e.g., PCB 1918 in FIG. 19D) can convert and control the compressor power using a VFD. Two types of VFD PCBs may be used: one for low voltage/3-phase operation to power 12V or 24V compressors, and another for high voltage/one-phase operation suitable for other AC compressor types (e.g., linear diaphragm, linear piston, rocking piston, etc.).

In at least one embodiment, one or more communication subsystems enable remote communication with the electronics through, for instance, a wireless Internet (Wi-Fi) network (e.g., within 300 meters in open air) and/or cellular network that enables features including but not limited to control of system parameters and downloading of data. In at least one example, the communication subsystem may be a plug-in board. Remote access capabilities and/or remote connectivity capabilities (e.g., via WiFi, cell phone networks, etc.) may be provided by, for instance, an on-board computing device and/or one or more other pieces of computer hardware.

In at least one embodiment, a Human-Machine Interface (HMI) enables a user to adjust one or more operating parameters of the aeration system and/or one or more subsystems or portions thereof, such as compressor hours of operation, power level, and the like. In at least one example, the HMI is a software application with a graphical user interface (GUI), which can be accessible through a computing device (e.g., tablet, laptop computer, desktop computer, smartphone, and/or another computing device) reaching a microcontroller (e.g., via Wi-Fi), and can provide an overview of the operations of the aeration system and/or one or more subsystems or portions thereof. The HMI may include, for instance, one or more login credentials (e.g., a unique login per user), readouts of aeration system and/or subsystem data, and the like. A user may also use the HMI to modify, set, and/or control the operation of the aeration system and/or one or more portions thereof (e.g., the hours of operation and power for the compressors). Connection between the HMI and the aeration system and/or one or more portions thereof may be accomplished via WiFi, Bluetooth, direct Ethernet connections, cellular network, and other similar networks or connections. Alternatively or additionally to the software application, a control panel may be physically disposed on the aeration system. Such a control panel may have one or more buttons for modifying, setting, and/or controlling the operation of the aeration system and/or one or more portions thereof. One or more operating parameters can be set and/or saved in a configuration file (e.g., stored on a microcontroller's flash drive, SD card, or other local storage, such as local storage 1922). In at least one example, the configuration file can be modified remotely through a user's computing device.

In at least one embodiment, the DACS collect detailed performance data and generate daily data files saved on a local storage device. The stored data files can be collected via a wired connection or remotely (e.g., via Wi-Fi and/or a cellular network) in order to complete performance analysis and improve operations of the aeration system and/or one or more subsystems or portions thereof remotely (e.g., through a user's computing device).

In at least one embodiment, one or more components of the power subsystem (e.g., PCBs, microcontroller, power conversion devices, etc.) are enclosed in a weatherproof enclosure to protect such components from rain, humidity, waves, and the like. The enclosure may be outfitted with a ventilation system, such as seen in FIG. 19E with the air intake hole 1938 and exhaust fan 1936, and in FIG. 19C with the air inflow 1981 and outflow 1983.

In at least one embodiment, one or more bird deterrent mechanisms protect one or more components of the power subsystem and/or one or more renewable energy generators (e.g., PV panels), Such bird deterrent mechanisms can prevent and/or eliminate bird droppings on the PV panels, minimizing maintenance needs. In at least one example, a bird deterrent mechanism comprises one or more physical objects (e.g., rotating arms) installed on the aeration system and/or one or more portions thereof. Such physical objects can, due to their size, shape, and/or movement, scare birds and/or other wildlife in the area of the pond or reservoir. The physical objects may be, for instance, rotating arms, wires, reflective objects, or the like.

In at least one embodiment, the microcontroller controls one or more indicators that provide operational feedback (e.g., visual feedback) to allow users to more easily identify the location and/or operational status of the aeration system and/or one or more subsystems or portions thereof. In at least one example, the one or more indictors enable a user to determine location and/or operational status from the land or shore. In at least a further example, the one or more indicators can comprise differently colored lights (e.g., red, green, or any other color and/or color combination) that can turn on and/or off (e.g., blink on and/or off in a predetermined sequence) to indicate one or more operational statuses of the aeration system and/or one or more subsystems or portions thereof. For instance, a specific light sequence can be used to indicate that the aeration system is running, while a different light sequence can be used to indicate that the system has a fault or is not operational. The lights may, for instance, be light emitting diode (LED) lights. Usage of different colored lights and/or light sequences can permit a user to determine or confirm that the system is running or not by simply glancing out at the pond or reservoir.

In at least one embodiment, one or more lightning/surge protection devices (SPD) and/or one or more ground fault protection (GFP) devices are provided, which can further ensure safety for operators and/or wildlife while protecting electronics components from surges and faults. In at least one example, a ground plate can be implemented at a bottom portion of the float module or suspended in the water from a grounding lug on the float module to divert energy from potential ground faults and surge protection equipment, minimizing downtime for electrical damage repairs.

SPDs and GFP devices can further protect the aeration system and connected equipment from electrical faults and/or transient voltage spikes. An SPD, which is also known as a surge suppressor or lightning arrester, can be configured to divert excessive voltage and/or current spikes caused by transient events such as lightning strikes, power surges, and the like. These events can cause damage to sensitive electronic equipment and disrupt the normal functioning of the power subsystem or one or more components thereof. A GFP device provides ground fault protection, which is a safety feature that detects and responds to ground faults in the electrical system. A ground fault occurs when an unintended path for electric current is created between an electrical system's conductors and the ground. This can happen due to insulation failures, damaged wires, equipment malfunctions, and the like.

If any of the above faults or issues occur, SPDs and/or GFP devices provide a low-resistance path to divert the excess energy to the ground, thereby limiting the voltage surge and protecting the aeration system and/or one or more subsystems or portions thereof.

In at least one example, the power subsystem is a battery-power subsystem. In at least another example, the power subsystem is a direct-power subsystem. The battery-power and direct-power subsystems may have some or all of the power subsystem features described above herein in addition to their unique battery-power and direct-power features described below herein.

Battery-Power Subsystem

Figure 19D:
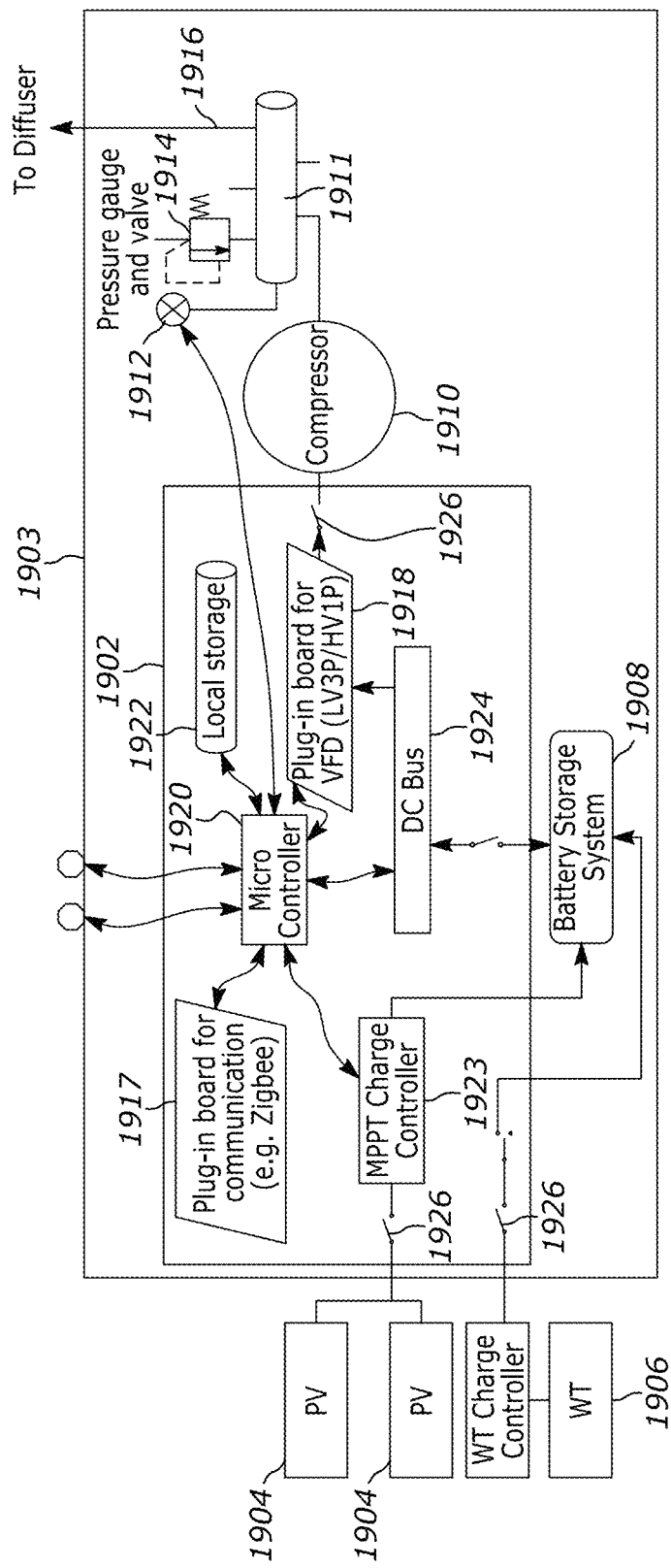
Figure 19E:
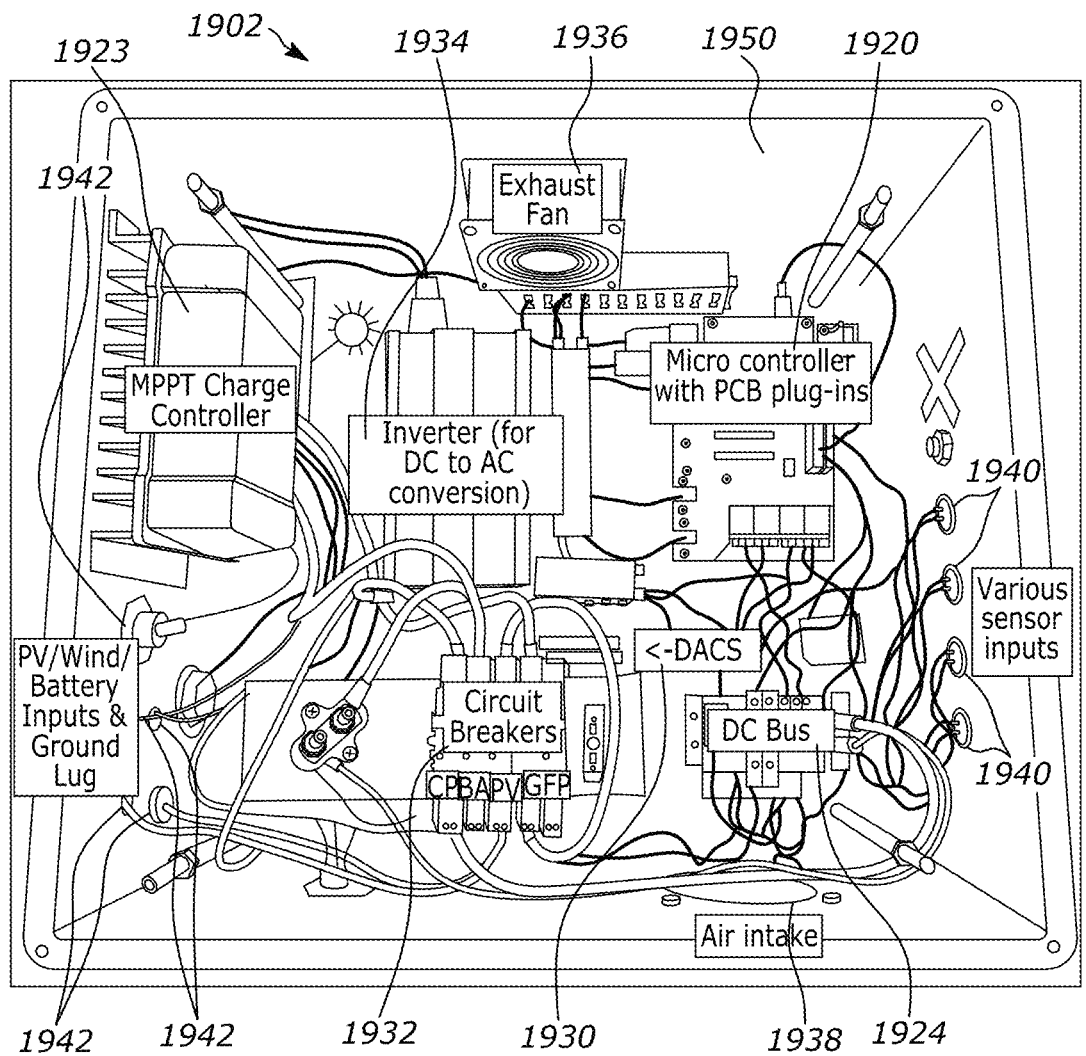
Figure 19F:
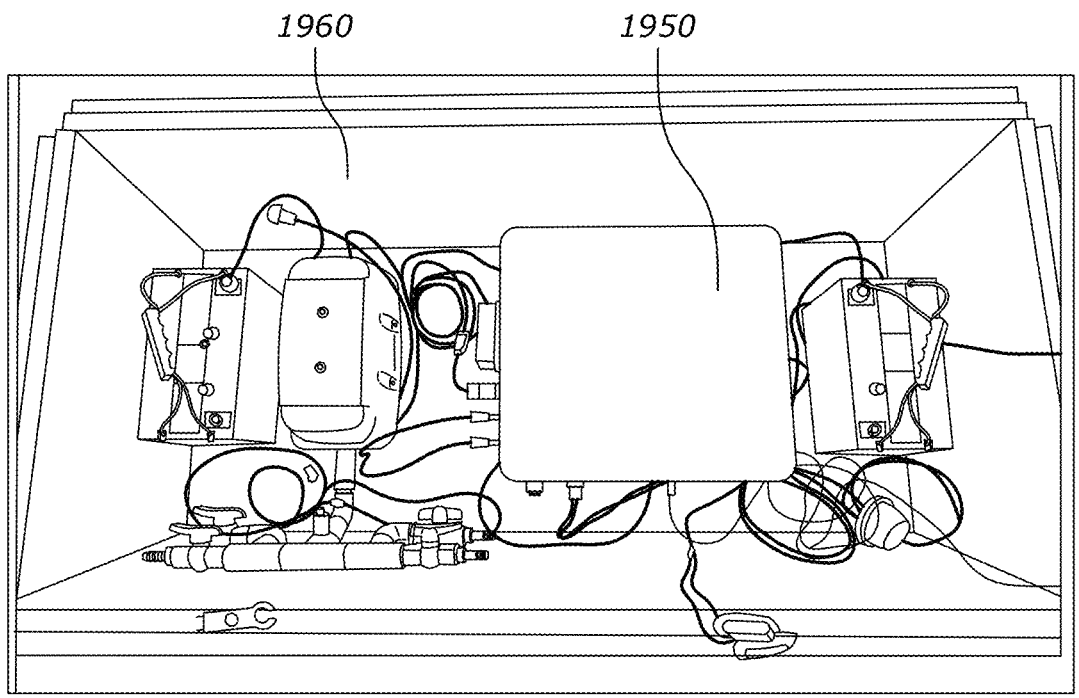

Turning now to FIG. 19D, a schematic diagram of one embodiment of a power subsystem that is a battery-power subsystem is shown. The diagram further shows portions of an aeration subsystem (e.g., compressor 1910, as described further below herein, manifold 1911 with valves to adjust the air flow to each diffuser (not shown), pressure sensor 1912, pressure relief valve 1914, and air outputs 1916). A Conversion and Control System (CCS) 1902 is shown and comprises a plurality of sensitive electronics including printed circuit boards (PCBs) (e.g., PCB 1917, PCB 1918) fabricated to fulfill specific power subsystem functions. Breaker switches 1926 are included and are accessible to users to turn on and/or off different portions of the power subsystem, including, but not limited to, PV panels 1904, Wind Turbine (WT) 1906, batteries and/or battery storage system 1908, and compressor 1910. Also shown are a microcontroller 1920, local storage 1922, charge controller 1923, and DC bus 1924. In at least one example, the components of CCS 1902 are contained within a weatherproof electronics box or similar container, thereby enclosing these components within a second, separate container inside the internal float cavity 1903. FIG. 19E shows an image of a non-limiting example of CCS 1902 housed within an electronics box 1950. As in FIG. 19D, FIG. 19E shows a microcontroller 1920, charge controller 1923, and DC bus 1924. Also shown is the DACS 1930, circuit breakers 1932, inverter 1934, exhaust fan 1936, air intake 1938, sensor inputs 1940, and PV panel, wind turbine, and/or battery inputs 1942. The exhaust fan 1936 can draw air out of the box 1950, thereby creating a vacuum inside and pulling air in from the air intake 1938. FIG. 19F shows an image of a non-limiting example of such an electronics box 1950 disposed within an internal cavity of float 1960, which may be similar to, or the same as, any float and/or floatation module described herein. Components outside of the CCS 1902, which may be outside of the electronics box (e.g., box 1950), can nonetheless be protected from the elements (e.g., rain and potential waves) and properly ventilated by their placement inside the float cavity. The float cavity itself may be a dry and cool environment that enables proper functioning of any components (e.g., battery storage system 1908, compressor 1910, etc.) disposed outside of the electronics box (e.g., box 1950).

In at least one embodiment, the power subsystem enables scheduled operation by setting specific power levels and/or operating hours for the compressor. A microcontroller (e.g., microcontroller 1920) can activate the compressor and configure the power level through hours of operation and/or set power level.

To keep the battery healthy, the power subsystem may always maintain a pre-determined minimum battery charge level with the renewable energy. For instance, when the battery depletes to a pre-determined minimum charge percentage or amount, the load (e.g., the compressor) will be turned off. Thus, the system may avoid depleting the battery to very low levels that can shorten the lifespan of a battery, to maintain the battery and facilitate a long useful battery life. Additionally, the subsystem may set a threshold charge level for starting to power the load (e.g., run the compressor) in order to minimize the frequency of powering the load on and off. By way of example, the system in one embodiment shuts off the compressor at 25% battery charge, and only turns the compressor back on when reaching 75% charge.

In at least one embodiment, the power subsystem enables optimized power utilization by utilizing surplus renewable energy. For instance, during the day, there might be an excess of renewable energy beyond what is needed to charge the battery to a level required to run the load (e.g., the compressor(s) and the auxiliary components) for the set operation time and/or compressor power. In at least one example, the battery state of charge (SOC) can be used as an indicator of the excess renewable energy availability. When the pre-determined battery charge level has been met and renewable energy is still available, the subsystem can use the excess renewable power for other uses (e.g., to run the compressor). The state of operation of the charge controller is also collected and used to indicate that the battery has been sufficiently charged for a specific operational period (e.g., enough for that day) and that excess energy may be available.

In one example, a system with PV panel(s) and/or wind turbine(s) and one or more batteries has been programmed by an operator to run its compressor at 100 W between 8 am and 4 pm each day. When renewable energy is available and generating power for the system, the controller is programmed to use the generated power to charge the batteries to a level sufficient to guarantee (barring fault/failure) sufficient energy to carry out the programmed operation for the day (running the compressor at 100 W for eight hours) or the remaining portion thereof (i.e. at 12 pm, the system only needs enough energy for another four hours that day). Once the battery has reached that level of charge, and as long as it remains at such level, the controller is programmed to use the excess renewable energy to run the compressor at more than 100 W or, if outside the hours of 8 am to 4 pm, to run the compressor at whatever power level is achievable with the available energy.

In an example, during the day, the battery may go through the following three steps if there is sufficient renewable energy available. The first step, which may be referred to as "bulk," occurs when the battery charge is maximal, allowing the battery voltage to increase. When it reaches the absorption voltage, the battery charge switches to a second step, which may be referred to as "absorption," in which the battery is maintained at this absorption voltage for a pre-determined amount of time depending on the charge controller settings and/or set points. Once the absorption is complete, the battery is full and the battery charge switches to the third and final step, which may be referred to as "float." In this step, the battery voltage is now maintained to a pre-determined float voltage, which may be lower than the battery's absorption voltage. This "float" step can be triggered when excess renewable energy is available. The microcontroller (e.g., microcontroller 1920) can send a PWM signal to the VFD PCB (e.g., PCB 1918) that is proportional to the indicator level/the battery level. When the battery voltage is the float voltage, the compressor PWM is maximal. When the battery voltage decreases, the compressor PWM also decreases.

In at least one embodiment, the power subsystem can monitor the SOC of the batteries to estimate the available energy for aeration and accommodate varying levels of renewable energy availability, ensuring continuous operation even in fluctuating conditions. This may happen especially at night or during periods of overcast weather. The batteries may run low in energy to supply the requested aeration power overnight. In this case, the microcontroller, based on the battery SOC, evaluated by the battery voltage and current history, will decrease the compressor power to match the stored energy and avoid stopping aeration without depleting the batteries.

Figure 20:
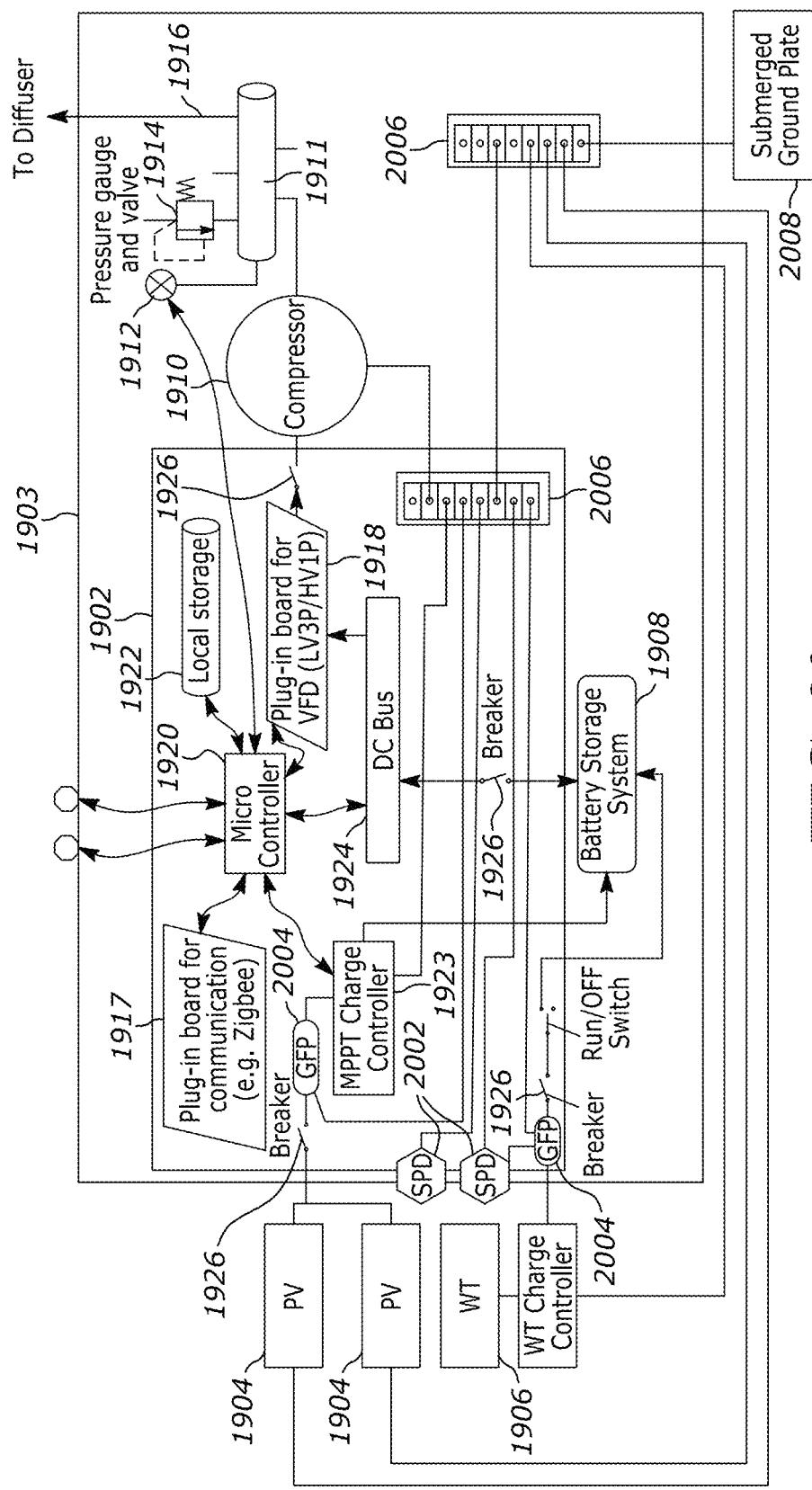
FIG. 20 is a schematic diagram of a battery-power power subsystem with surge protection devices and ground fault protection devices, according to at least one embodiment of the present disclosure.

Turning now to FIG. 20, a schematic diagram of a battery-power subsystem is shown with SPDs and GFP devices. As in FIG. 19D, CCS 1902, internal float cavity 1903, PV panels 1904, WT 1906, batteries and/or battery storage system 1908, and compressor 1910 are shown, along with other portions of an aeration subsystem (e.g., manifold 1916, pressure sensor 1912, pressure valve 1914, and air outputs 1916). Also shown are plug-in boards (e.g., PCBs 1917, 1918), microcontroller 1920, and local storage 1922. Further portions of the aeration subsystem (e.g., diffusers) are not shown. SPDs 2002 and GFP devices 2004 act on one or more portions of the CCS 1902 to divert energy, when necessary, to ground bars 2006, which are connected to a submerged ground plate 2008.

Figure 21:
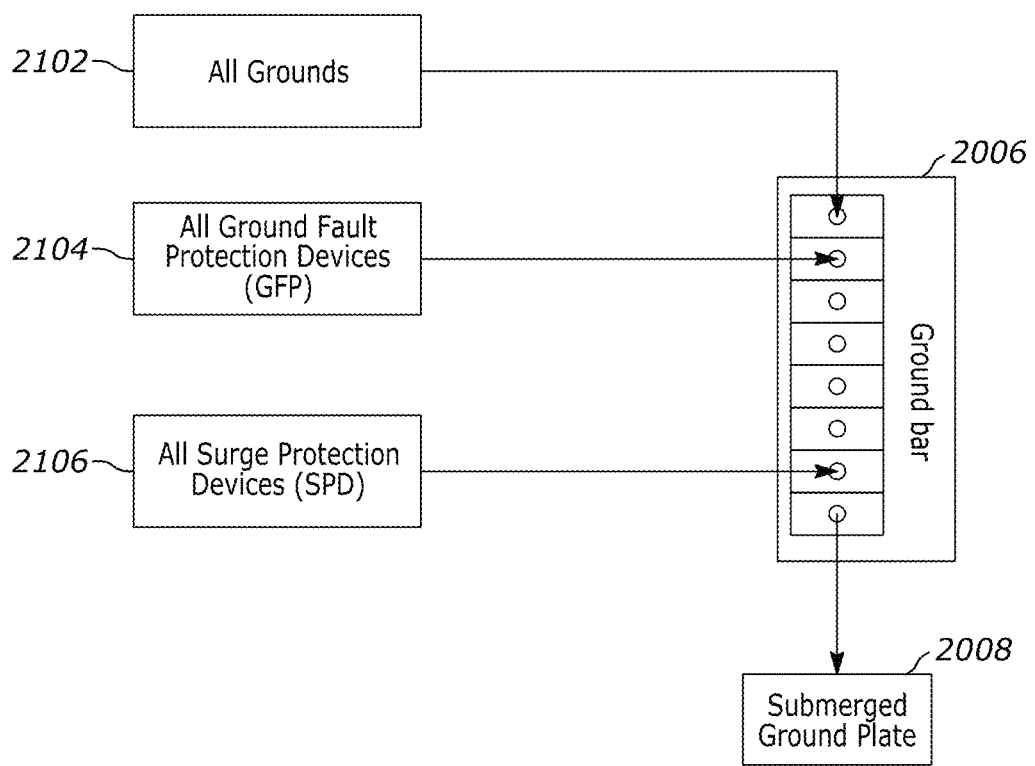
FIG. 21 shows the connections between the surge protection devices and ground fault protection devices of FIG. 20 with a ground bar and a ground plate, according to at least one embodiment of the present disclosure.

FIG. 21 shows one such ground bar 2006 connected to the ground plate 2008. All grounds (block 2102), all GFP devices (block 2104), and all SPDs (block 2106) are connected to the ground bar 2006 to allow a path to the ground plate 2008. Additional ground lugs (not shown) may exist along the pathways to connect additional wires (e.g., from the PV panels, batteries, or other components) with the grounding system.

Direct-Power Subsystem

Figure 22:
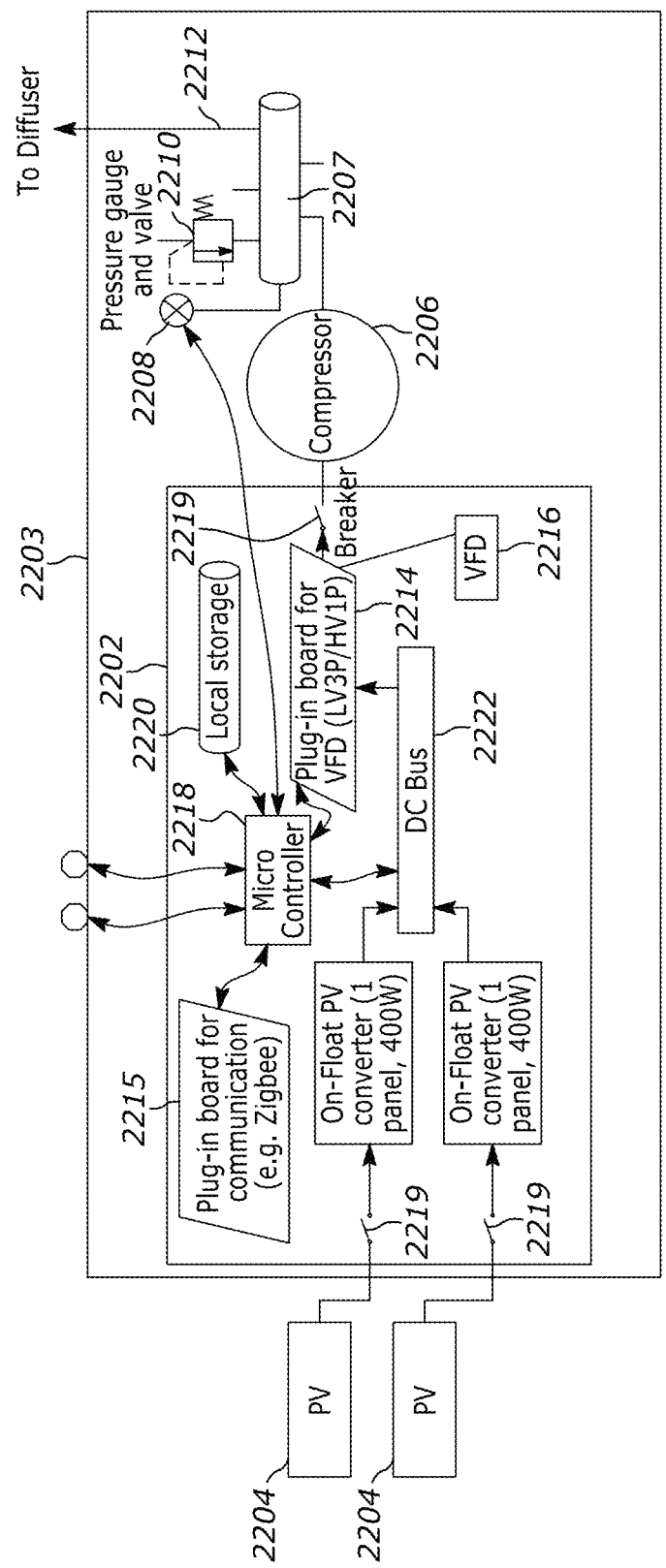
FIG. 22 is a schematic diagram of the power subsystem of a direct-power system, according to at least one embodiment of the present disclosure.

Turning now to FIG. 22, a schematic diagram of one embodiment of a power subsystem that is a direct-power subsystem is shown. The diagram further shows portions of an aeration subsystem (e.g., compressor 2206, as described further below herein, manifold 2207 with valves to adjust the air flow to each diffuser (not shown), pressure sensor 2208, pressure valve 2210, and air outputs to the diffusers 2212 disposed inside an internal float cavity 2203. A CCS 2202 is shown and comprises a plurality of sensitive electronics including PCBs (e.g., PCB 2214, PCB 2215) fabricated to fulfill specific power subsystem functions. Breaker switches (shown as breaks 2219 in the wiring) are included and are accessible to users to turn on and/or off different portions of the power subsystem, including, but not limited to, PV panels 2204 and compressor 2206. The CCS is contained in a waterproof enclosure with its own ventilation (e.g., box 1950 in FIG. 19E, box 1996 in FIG. 19B, as described above herein). Components outside of the CCS 2202, including but not limited to the compressor, batteries, manifold, and ballast, can be contained in the sealed cavity created by the float bottom and the cover and ventilated to protect from the elements (e.g., rain) and potential waves, while maintaining a dry and cool environment, as described above herein.

In at least one embodiment, the power subsystem enables scheduled operation by setting specific power levels and/or operating hours for the compressor. A microcontroller (e.g., microcontroller 2218) can activate the compressor and configure the power level (e.g., via a VFD PCB, such as PCB 2214) through hours of operation and/or set power level.

Figure 23:
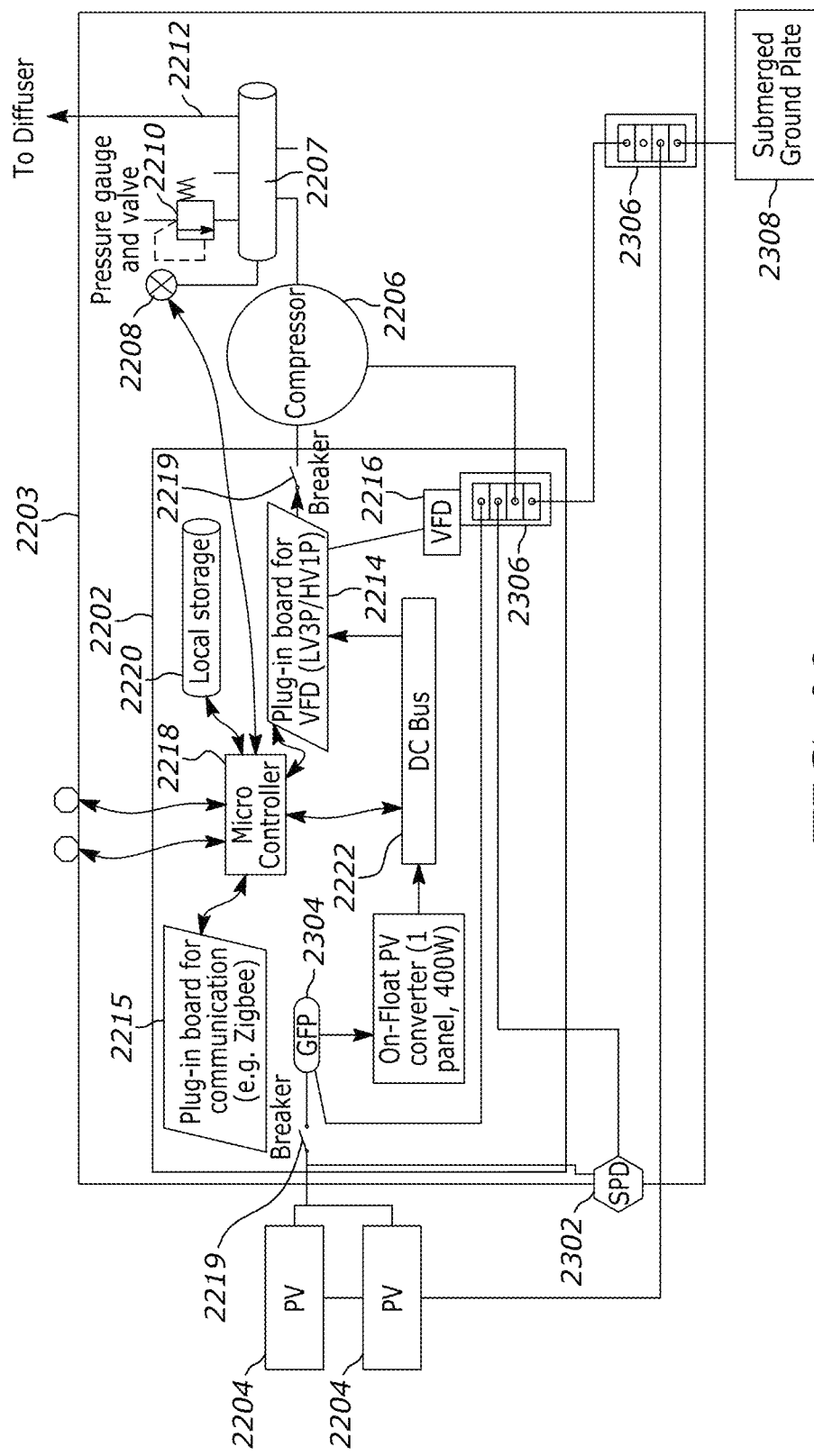
FIG. 23 is a schematic diagram of the power subsystem of a direct-power system with surge protection devices and ground fault protection devices, according to at least one embodiment of the present disclosure.

Turning now to FIG. 23, a schematic diagram of a direct-power subsystem is shown with SPDs and GFP devices. As in FIG. 22, CCS 2202, internal float cavity 2203, PV panels 2204, and compressor 2206 are shown, along with other portions of an aeration subsystem (e.g., manifold 2207, pressure sensor 2208, pressure valve 2210, and air outputs 2212). Also shown are plug-in boards (e.g., PCBs 2214, 2215), VFD 2216, microcontroller 2218, and local storage 2220. SPD 2302 and GFP 2304 act on one or more portions of the CCS 2202 to divert energy, when necessary, to ground bars 2306, which are connected to a submerged ground plate 2308. Breaker switches (shown as breaks 2219 in the wiring) are included and are accessible to users to turn on and/or off different portions of the direct-power subsystem, including, but not limited to, PV panels 2204 and compressor 2206.

Figure 24:
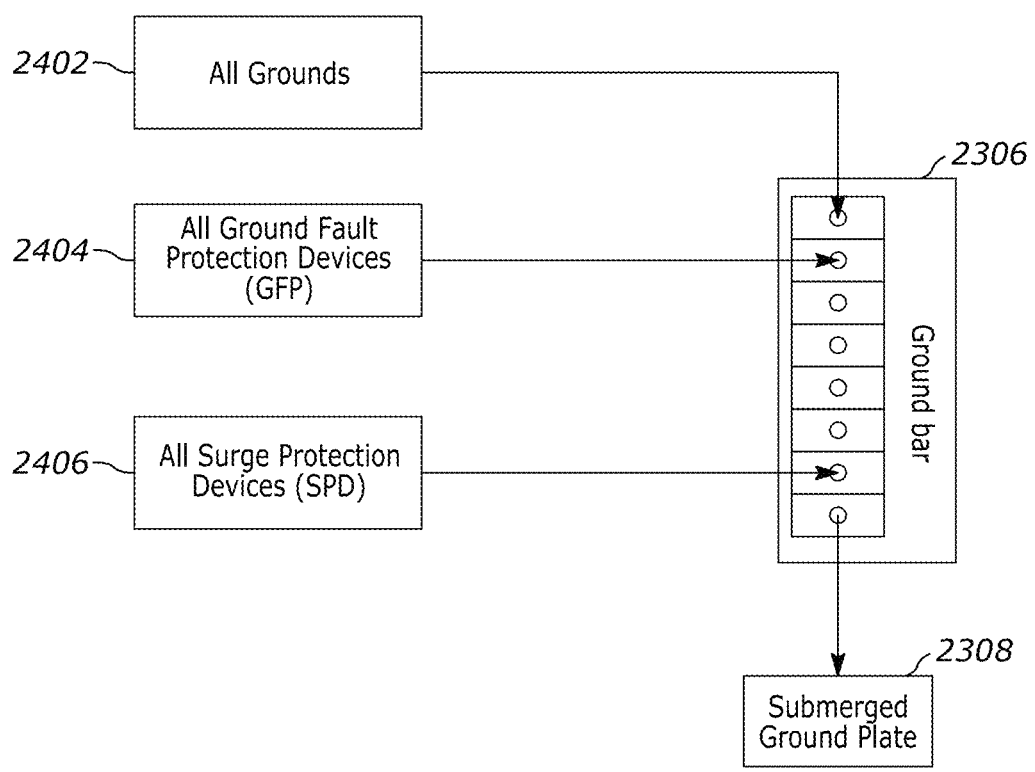
FIG. 24 shows the connections between the surge protection devices and ground fault protection devices of FIG. 23 with a ground bar and a ground plate, according to at least one embodiment of the present disclosure.

FIG. 24 shows one such ground bar 2306 connected to the ground plate 2308. All grounds (block 2402), all GFP devices (block 2404), and all SPDs (block 2406) are connected to the ground bar 2306 to allow a path to the ground plate 2308. Additional ground lugs (not shown) may exist along the pathways to connect additional wires (e.g., from the PV panels, batteries, or other components) with the grounding system.

In at least one example, the ground bars 2306, and/or the ground plate 2308, are similar to, or the same as, ground bars 2006 and/or ground plate 2008, respectively.

Wind Turbines

In at least one embodiment, the aeration system comprises one or more optional wind turbines for further renewable energy generation, renewable energy capture, and/or extended aerator run time. As described above herein, such wind turbines could float on the surface of a pond or tank by being attached and/or connected to one or more floats and/or floatation modules described herein. A skilled artisan will appreciate that no small-scale floating wind turbines currently exist to power aeration components and/or systems, including, for instance, one or more compressors for aeration and/or circulation of water in bodies of water (e.g., ponds, tanks, and/or reservoirs).

In at least one embodiment, the pairing of wind resources and/or wind energy with solar resources and/or solar energy allows for more continuous and/or frequent operation of the aeration system and/or greater aeration capacity. For instance, when solar energy is unavailable, wind energy may be used, and vice versa. Indeed, solar energy often decreases in conjunction with an increase in wind energy availability (e.g., during stormy weather or during the winter season). Many aquaculture ponds may have abundant solar resources during specific parts of the year and abundant wind resources during other parts of the year; accordingly, the presence of one or more wind turbines in the aeration system specifically allows for more operational flexibility.

Aeration Subsystem

In at least one embodiment, the aeration system comprises one or more aeration subsystems. The aeration subsystem can comprise one or more compressors (e.g., AC/DC compressors, piston compressors, linear piston compressors, etc.), one or more manifolds, one or more pressure valves, one or more pressure sensors, one or more air hoses (e.g., one or more weighted and/or UV-stabilized output hoses), and one or more diffusers. A non-limiting example of an aeration subsystem 2500 is shown in FIG. 25A. The subsystem 2500 comprises diffusers 2502 connected to a manifold 2504 via air hoses 2506. Portions of the air hoses 2506 may be comprised of one or more types, including, but not limited to, weighted polyvinyl chloride (PVC) tubing (e.g., to be suspended in the water), polyethylene tubing (e.g., to distribute air outside of the float module to the weighted PVC tubing), and braided vinyl tubing (e.g., to distribute air inside of the internal cavity from the compressor). The manifold 2504 is also connected to an air compressor 2508. In at least one example, the one or more pressure relief valves may be present on the manifold 2504 to release excess pressure that may occur if the diffusers are placed at a depth that is greater than the operating pressure limit for a given compressor 2508, which could potentially damage the compressor 2508. The diffusers 2502, manifold 2504, and/or air hoses 2506 may each be similar to, or the same as, other similar elements described above herein (e.g., with respect to FIG. 14), The manifold 2504 and the compressor 2508 are disposed within a float and/or floatation module 2510, which may be similar to, or the same as, any other float and/or floatation module described herein.

FIG. 25B shows another non-limiting example of a novel diffuser 2550, which may be similar to, or the same as, any other similar devices described above herein (e.g., with respect to FIG. 14). Rubber tubing segments 2552 (which may be aero-tube hoses and may have an easily adjustable length based on the air capacity of the compressor used, which corresponds to the depth at which the diffuser is placed in the pond or reservoir) are attached and/or connected to a rigid, negatively-buoyant base plate 2554, which prevents erosion from aeration should the diffuser be suspended close to the water body bottom. The rubber tubing segments 2552 are also attached and/or connected to a 5-way manifold 2556. A rigid straight pipe 2558 is attached and/or connected to the manifold 2556 as well. The pipe 2558 is perpendicular to the rubber tubing segments to create a plumb angle, can prevent hose kinking, and/or provides additional weight to diffuser 2550 to maintain a vertical orientation in the water and to prevent movement thereof in the pond, tank, and/or reservoir. The pipe 2558 may also be connected to an air check valve 2562 to prevent backflow of water and/or air that could result in entry of water and/or air into the air hose and/or compressor(s), potentially damaging the one or more compressors and, in freezing wintertime conditions, potentially resulting in the intruding water freezing and rupturing the air hose(s). The air check valve may then be connected to a weighted air hose 2560, which provides further weight to maintain a vertical orientation in the water and to prevent movement thereof in the pond, tank, and/or reservoir.

In at least one embodiment, the diffusers are made of one or more materials that resist biofouling, are non-toxic, are durable, are self-sinking, and/or provide fine air bubbles with low-pressure air flow of about 0.4 cubic feet per minute (CFM) per linear foot of hose. In at least one embodiment, the diffusers are corrosion-resistant, can be replaced with standard hand tools, and/or can be disassembled or reassembled with standard hand tools. Such replacement and/or assembly or disassembly can be important in the diffusers of the at least one embodiment, since aquaculture equipment (including the diffusers) can undergo a large deal of wear and tear due to the aqueous environment. Thus, it can be beneficial to farmers and users to have diffusers or other components of the aeration system that can be fixed and/or replaced by hand tools. Non-limiting examples of materials used in the diffuser device include stainless steel, PVC, polypropylene plastic, rubber, and the like. Other common diffuser materials that may be used instead of, or in addition to, the rubber tubing may include ceramic, EPDM, silica, and aluminum oxide.

In at least one embodiment, the diffusers are suspended from a hanging airline rather than resting on a pond or tank bottom, to ensure that diffuser hose portions can be maintained at an equal depth and/or pressure. In at least one example, total diffuser material length (e.g., rubber tubing) is pre-matched to rated compressor air flow and/or the total number of diffusers. Specifically, since the rubber tubing is porous to allow air to escape, the longer the length, the more air can potentially flow out of the diffuser. A compressor with a high capacity and only a relatively small amount or length of air hose will result in a build-up of pressure in the air lines and result in an increased workload for the compressor (e.g., expending more power and/or using power more inefficiently) and larger bubble size, which will decrease aeration efficiency.

In at least one example, an air flow rate of one or more compressors ranges from about 0.5 CFM to 7.1 CFM over a range of rated operating pressures such as, for instance, between about 2 to 3 pounds per square inch (PSI) for linear diaphragm compressors and between about 30 to 60 PSI for compressors more powerful than linear diaphragm compressors. In at least one example, the diffusers utilize between about 1.25 to about 17.75 linear feet of tubing, which can be evenly distributed amongst a selected number of diffusers per aeration system (e.g., two diffusers, four diffusers, or more than four diffusers). For instance, a different number of diffusers may be on the same module and/or split between more than one module, depending on the number and/or type of air compressors selected for the needs of a particular environment and operation.

Sample Dimensions and Materials

In at least one example of an aeration system described herein, the bottom dimensions (length×width×height) of a single module (e.g., any module described herein, such as, for instance, module 301) are about 79 inches×about 46 inches×about 15 inches. In at least one example, the dimensions (length×width×height) of the cover (e.g., any cover described herein, such as, for instance, cover 308) are about 79.3 inches×about 47.3 inches×about 9.4 inches. In at least one example, the weight of a single module (e.g., any module described herein, such as, for instance, module 301) is about 72 pounds.

Figure 16:
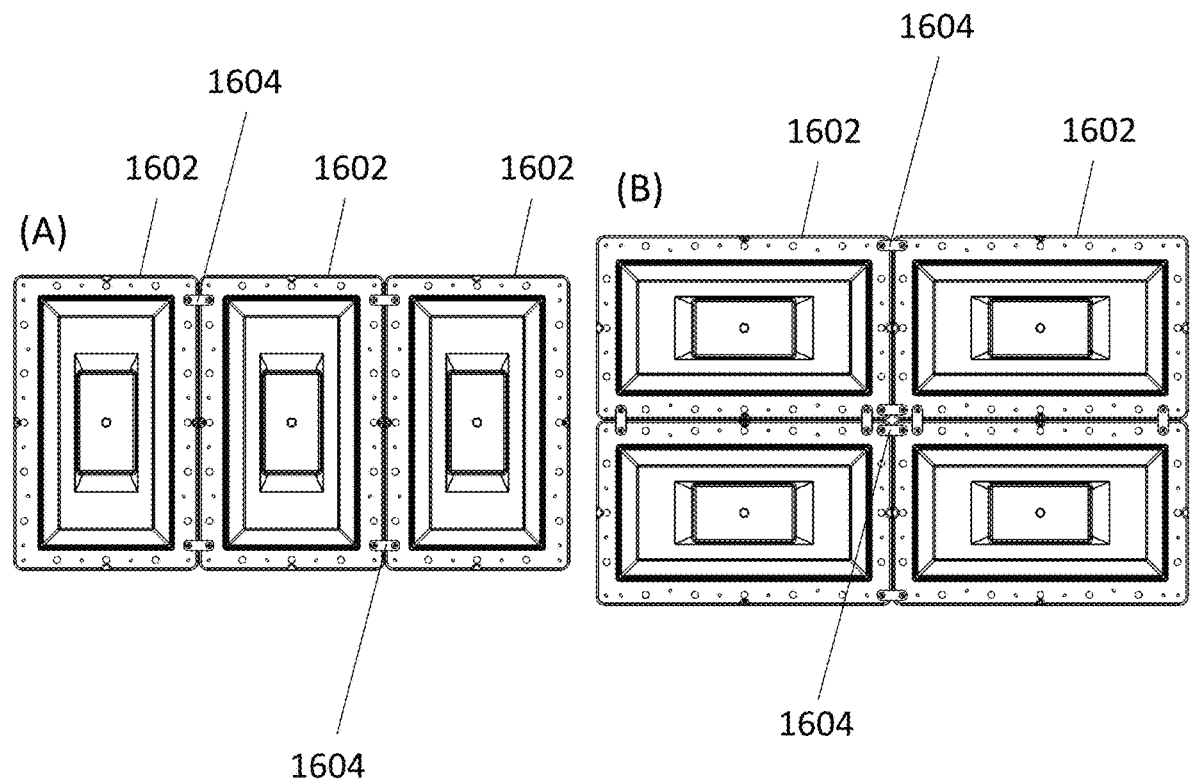
FIGS. 16A-16B show two different arrangements and/or orientations of floats, specifically a first orientation (FIG. 16A) and a second orientation (FIG. 16B), each according to at least one embodiment of the present disclosure.

In at least one example, one or more float modules (e.g., any module described herein, such as, for instance, module 301) comprises areas designed for creating holes (e.g., areas with precut holes, depressions to be used as guides for holes, and/or flat areas to drill holes during assembly) to receive bolts 562 e.g., which can be about ⅜ inch in diameter and about 1 inch in length) for mounting and connecting (e.g., as seen in FIG. 5E, FIG. 10, and FIG. 16). For instance, tabs 560 (as seen in FIG. 5F) and surface 564 (as seen in FIG. 5F) may receive holes and bolts 562, or bolts of a similar size, to mount one or more PV panels (e.g., any PV panels described herein, such as, for instance, panels 307), mount one or more wind turbine mast stays (e.g., any mast stays described herein, such as, for instance, stays 317), attach anchoring to the system, connect together float modules (e.g., through rail or neoprene connectors), and/or seal together the float cover and bottom.

In at least one example, one or more float bottoms (e.g., any float bottom described herein, such as, for instance, module 301) comprises holes (e.g., about 0.5 to 1 inch holes) for attaching pontoon accessories (e.g., any pontoons and/or pontoon accessories described herein, such as, for instance, accessory 900 and 1100). These attachment holes (non-limiting examples of which are shown as holes 1110 in FIG. 11B) can also provide an alternative method to anchor or connect other float modules. Non-limiting examples of such alternatives include, for instance, bolts, screws, pins, or other rigid strong attachment pieces of hardware made of one or more metals (e.g., angle iron, stainless steel, and the like).

In at least one example, the cover (e.g., any cover described herein, such as, for instance, cover 308) is raised such that it provides ventilation at an about 12 inch height, or more, above float freeboard.

In at least one example, the dimensions (length×width×height) of an internal cavity 104 of one or more float modules (e.g., any module described herein, such as, for instance, module 100) are about 56 inches×about 23 inches×about 16 inches (as measured from floor board to bottom of ventilation holes).

In at least one example, an aeration system (e.g., a system comprised of two float modules) has overall dimensions (length×width×height) of about 130 inches (varying depending on latitude)×about 79 inches×about 35 inches. In at least one example, the top of a wind turbine is about 112 inches above the waterline.

In at least one example, the weight of the aeration system (e.g., a system comprised of two float modules) with ballast is about 800 pounds, the freeboard height is about 6 inches, the reserved buoyancy is about 1,900 pounds, the snow load rating is about 7 psf, and/or the wind load rating is about 85 miles per hour (mph), in any combination.

In at least one example, the aeration system (e.g., a system comprised of two float modules) has at least 25% excess buoyancy beyond expected loading. In at least one example, such an aeration system weighs about 800 pounds with about 1,900 pounds of reserved buoyancy, and about 70% of system buoyancy capacity reserved.

In at least one example, the aeration system (e.g., any of the aeration systems described herein) is made of one or more different materials. Non-limiting examples include one or more types of plastic (e.g., ultraviolet (UV)-resistant high-density polyethylene (HDPE)) for the floatation modules and/or cover, aluminum for the tilting legs and/or rack with stainless steel hardware, and stainless steel for connectors, anchors, racks, mast supports, and the like. Further non-limiting examples of possible materials are shown below in Table 1.

TABLE 1

Non-limiting examples of materials for one or more portions of the aeration system.

| Material | Properties | Examples of usage |
| --- | --- | --- |
| High Density Polyethylene (HDPE) | UV stabilized with expected life of at least 25 years, Excellent chemical resistance. High tensile strength. Excellent moisture barrier properties | Float bottom, cover, pontoons |
| Stainless Steel | ~30-50 year typical service life. Increased corrosion resistance, strong, non-porous, non-reactive, 304 | Hardware (e.g., connectors, anchors, PV racking, windmill) |

TABLE 1-continued

Non-limiting examples of materials for one or more portions of the aeration system.

| Material | Properties | Examples of usage |
| --- | --- | --- |
| | type 145 year 1 mm deep pitting corrosion penetration time. | |
| Aluminum | ~40-80 year typical service life. Excellent corrosion resistance, lightweight, strong, non-porous, non-reactive. | PV racking, windmill mast, connectors |
| Neoprene | Neoprene is a non-toxic synthetic material, good heat and cold resistance, low oxidation rate, high UV resistance, chemically inert, excellent water resistance. ~5-15 service life | Connectors, gaskets, seals, insulation, vibration isolation |

In at least one example, the aeration system is composed of various materials that are resistant to corrosion, weathering, and/or UV degradation for at least 10 years. As a non-limiting example, such materials include air hoses made of thick-walled polyvinyl chloride (PVC), polyethylene, and/or braided vinyl, which may be in a black or substantially dark color to provide UV resistance.

Accordingly, some embodiments of the invention described herein include aeration devices, systems, and methods that have one or more of the following features: (1) the ability to customize and scale the aeration system to the needs of a water body or operation by selecting, for example, the type and number of compressor(s), type and number of diffuser(s), type and number of PV panels, number of modules (e.g., floatation modules), number of power subsystems, and/or battery storage capacity, as needed for specific ponds/growth conditions, (2) the ability to select a battery-power or direct-power system, (3) one or more optional wind turbines as an additional power source, (4) sub-surface aeration from diffuser(s), for instance a novel diffuser that can be deployed and adjusted at various water depths (as opposed to traditional surface aerators and diffuser aerators), (5) unique shapes and/or form factors (e.g., depressions, holes, guides, tabs, slopes, etc.) for various anchoring, mounting, connecting, ventilation, access, relief, weatherproofing, optimizing space, and distribution of flow, as well as for nestable shipping, (6) an electronic system with programmable operation parameters and modes for aeration (e.g., setting start and end times, durations, DO thresholds, prioritizing battery charge during the day for nighttime operation, prioritizing continuous aeration, etc.), (7) an electronic system that can be accessed remotely (e.g., via WiFi or a cellular network) and/or through a wired connection, (8) an electronic system with an HMI accessible through a computing device and/or built in control panel, (9) an electronic system with variable power to the air compressor based on available solar and or wind energy and/or the battery charge and/or voltage (rather than typical on-or-off operation), (10) being fully self-contained, mobile, and having a smooth profile to avoid interference with other equipment (e.g., harvesting nets or tools), (11) light emitting diode (LED) lights or other visual indicators or signals to indicate when the system is operating (e.g., green light) and when the system is off (e.g., red light), thereby enabling visual shore-based determination of operating status and/or physical location of the system, even in low-light or nighttime conditions, (12) submerged lightning strike protection components to help minimize lightning strike damage, (13) bird deterrents, (14) optional secondary loads such as a sump pump, and (15) optional pontoons for increasing stability and/or directing flow.

These and other objectives and features of the invention are apparent in the disclosure, which includes the above and ongoing written specification.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

What is claimed is:

1. An aeration system comprising:
   one or more float modules, each of the one or more float modules comprising one or more pieces that fit together to form an internal cavity;
   one or more diffusers that aerate and circulate water around the one or more float modules;
   one or more photovoltaic (PV) panels on the one or more float modules that provide solar energy to power the aeration system; and
   a plurality of tabs disposed on one or more surfaces of the one or more float modules,
   wherein the plurality of tabs comprise at least a first tab that is level with respect to the one or more surfaces and at least a second tab that is raised with respect to the one or more surfaces, and wherein the plurality of tabs are configured for installation of one or more external components.

2. The aeration system of claim 1, further comprising one or more connections to a land-based power source.

3. The aeration system of claim 1, wherein the one or more pieces comprises:
   one or more float covers; and
   one or more float bottoms,
   wherein each of the one or more float covers attach to the one or more float bottoms to form the internal cavity.

4. The aeration system of claim 1, wherein the aeration system floats entirely in the water.

5. The aeration system of claim 1, wherein the aeration system is autonomous such that the aeration system is operational without any connection to land.

6. The aeration system of claim 1, wherein the aeration system is modular such that a size of the aeration system can be increased or decreased based on one or more operational requirements.

7. The aeration system of claim 1, wherein the one or more float modules are sized to fit on a standard pallet having a length of 48 inches and a width of 40 inches.

8. The aeration system of claim 1, wherein the one or more pieces are stackable and/or nestable within each other.

9. The aeration system of claim 1, wherein the one or more pieces comprises one or more float covers that have one or more surfaces that are sloped toward one or more outer edges of the one or more float modules.

10. The aeration system of claim 1, wherein the one or more pieces comprises one or more float covers and one or more float bottoms, and further comprising one or more contours disposed on the one or more float covers and/or the one or more float bottoms, wherein the one or more contours correspond with placement of one or more air hoses to prevent pinching of the one or more air hoses when the one or more air hoses are suspended in the water.

11. The aeration system of claim 1, further comprising one or more tabs disposed within the internal cavity to mount a surface for placement of one or more internal components.

12. The aeration system of claim 1, wherein the one or more pieces comprise:
   one or more float covers; and
   one or more float bottoms,
   wherein the one or more float covers have a shape that corresponds to, and fits with, a shape of the one or more float bottoms, thereby generating a water-tight seal between the one or more float covers and the one or more float bottoms.

13. The aeration system of claim 1, further comprising an indicator that corresponds to a pre-determined water line when the one or more float modules are placed in the water.

14. The aeration system of claim 1, wherein the one or more pieces comprise:
   one or more float covers having a raised portion to increase a size of the internal cavity.

15. The aeration system of claim 1, wherein the one or more pieces comprise:
   one or more float covers,
   wherein the one or more PV panels are disposed on a top surface of the one or more float covers.

16. The aeration system of claim 1, further comprising one or more air compressors, wherein the one or more air compressors are disposed within internal cavities of the one or more float modules.

17. The aeration system of claim 16, wherein the one or more air compressors comprise different types of compressors.

18. The aeration system of claim 1, further comprising one or more pontoons that increase load capacity and/or stability of the aeration system.

19. The aeration system of claim 18, further comprising a plurality of areas for receiving one or more attachments to secure one or more pontoons to the one or more float modules.

20. The aeration system of claim 19, wherein the plurality of areas comprise at least one area that is level with respect to one or more surfaces on the one or more float modules and at least one area that is raised with respect to the one or more surfaces.

21. The aeration system of claim 1, further comprising one or more indentations in a perimeter area of the one or more float modules, wherein the one or more indentations are configured to attach to one or more pontoons.

22. The aeration system of claim 1, further comprising one or more diffuser aerators that are adjustable in total diffuser hose length, thereby allowing aeration to be adjusted based on aeration capacity of a predetermined air compressor and a body of water in which the aeration system is disposed.

23. The aeration system of claim 1, further comprising a diffuser device that is self-leveling at a mid-water depth in-between a surface of a body of water and a bottom of the body of water.

24. The aeration system of claim 23, wherein the diffuser device further comprises a valve configured to (i) allow air to flow to the diffuser device, and (ii) prevent the water from flowing into the diffuser device.

25. The aeration system of claim 23, wherein the diffuser device is attached to a weighted air hose, thereby maintaining a vertical orientation in the water.

26. The aeration system of claim 1, wherein the one or more float modules comprise one or more bottom surfaces that disperse air bubbles and water flow around the one or more float modules.

27. The aeration system of claim 26, wherein the one or more bottom surfaces disperse the air bubbles laterally to increase an amount of air bubble-to-water contact time, resulting in an increased transfer of oxygen into a body of water.

28. The aeration system of claim 26, wherein the one or more bottom surfaces further distribute the air bubbles to prevent the air bubbles from collecting in pockets underneath the one or more float modules.

29. The aeration system of claim 26, wherein the one or more bottom surfaces further direct the air bubbles towards one or more pontoons disposed around one or more edges of the one or more float modules.

30. The aeration system of claim 26, wherein the one or more bottom surfaces have a smooth profile to minimize interference with one or more other pieces of equipment.

31. The aeration system of claim 26, further comprising one or more indentations on the one or more bottom surfaces for attaching a ground plate for protection against lightning strikes.

32. The aeration system of claim 1, further comprising one or more electronic systems with a plurality of programmable settings, wherein the plurality of programmable settings comprise data acquisition settings and operation settings.

33. The aeration system of claim 32, wherein the plurality of programmable settings are adjustable to prioritize a predetermined mode in a plurality of different modes when the aeration system is operating.

34. The aeration system of claim 33, wherein the one or more electronic systems are accessible via a wired connection connected to one or more ports on the one or more float modules.

35. The aeration system of claim 32, wherein the operation settings comprise a start time and an end time for powering one or more compressors.

36. The aeration system of claim 32, wherein the operation settings comprise a time duration for powering one or more compressors.

37. The aeration system of claim 32, wherein the operation settings comprise selection of a distribution of power between charging one or more batteries and powering one or more loads.

38. The aeration system of claim 32, further comprising one or more measuring device(s), wherein the one or more measuring device(s) comprise:
a dissolved oxygen measuring device to determine when dissolved oxygen in the water reaches a pre-determined level,
a device to measure battery voltage, current, and/or charge so that power to one or more air compressors can be adjusted,
a device to measure air pressure,
a device to measure temperature,
a device to measure solar radiation, and/or
a device to measure wind strength and/or direction.

39. The aeration system of claim 38, wherein the measuring devices are sensors.

40. The aeration system of claim 32, wherein the one or more electronic systems are configured to communicate with one or more external dissolved oxygen sensors, thereby determining when dissolved oxygen in the water reaches a pre-determined level.

41. The aeration system of claim 1, further comprising a power subsystem, wherein the power subsystem is configured to run one or more air compressors at variable power in proportion to one or more pre-defined parameters.

42. The aeration system of claim 41, wherein the one or more pre-defined parameters comprise an available amount of renewable energy, battery charge, and/or battery voltage.

43. The aeration system of claim 1, further comprising one or more batteries to (i) store renewable energy, and/or (ii) power the aeration system.

44. The aeration system of claim 1, further comprising a lightning protection system, wherein the lightning protection system further comprises a ground plate submerged beneath a surface of the water.

45. The aeration system of claim 1, further comprising a plurality of lights configured to indicate operational status and/or physical location of the aeration system.

46. The aeration system of claim 45, wherein the plurality of lights comprise one or more light-emitting diode (LED) lights.

47. The aeration system of claim 1, each of the one or more float modules comprising one or more holes along a perimeter for attaching an anchoring or tethering system and/or for securing together two or more of the one or more float modules.

48. The aeration system of claim 1, wherein each of the one or more float modules is configured to float on a surface of the water.

49. An aeration system comprising:
one or more float modules, each of the one or more float modules comprising one or more pieces that fit together to form an internal cavity;
one or more diffusers that aerate and circulate water around the one or more float modules;
one or more photovoltaic (PV) panels on the one or more float modules that provide solar energy to power the aeration system; and
one or more outer perimeters of the one or more float modules on which one or more connectors are disposed,
wherein the one or more connectors attach the one or more float modules to each other.

50. An aeration system comprising:
one or more float modules, each of the one or more float modules comprising one or more pieces that fit together to form an internal cavity;
one or more diffusers that aerate and circulate water around the one or more float modules;
one or more photovoltaic (PV) panels on the one or more float modules that provide solar energy to power the aeration system, wherein the one or more pieces comprise:
one or more float covers; and
one or more float bottoms,
wherein the one or more float bottoms have an edge that is raised above a contact surface with a perimeter of the one or more float covers, thereby preventing intrusion of the water into the internal cavity.

51. An aeration system comprising:
one or more float modules, each of the one or more float modules comprising one or more pieces that fit together to form an internal cavity;
one or more diffusers that aerate and circulate water around the one or more float modules;
one or more photovoltaic (PV) panels on the one or more float modules that provide solar energy to power the aeration system,
wherein the one or more pieces comprise:
one or more float covers having one or more sloped surfaces,
wherein the one or more sloped surfaces are disposed vertically underneath the one or more PV panels such that one or more empty spaces exist between the one or more sloped surfaces and the one or more PV panels,
wherein the one or more empty spaces enable wind to flow through the one or more empty spaces, thereby reducing wind resistance of the aeration system.

52. An aeration system comprising:
one or more float modules, each of the one or more float modules comprising one or more pieces that fit together to form an internal cavity;
one or more diffusers that aerate and circulate water around the one or more float modules;
one or more photovoltaic (PV) panels on the one or more float modules that provide solar energy to power the aeration system,
wherein the one or more pieces comprise:
one or more float covers having one or more covered openings,
wherein the one or more covered openings provide access to the internal cavity.

53. An aeration system comprising:
one or more float modules, each of the one or more float modules comprising one or more pieces that fit together to form an internal cavity;
one or more diffusers that aerate and circulate water around the one or more float modules;
one or more photovoltaic (PV) panels on the one or more float modules that provide solar energy to power the aeration system,
wherein the one or more pieces comprise:
one or more float covers having one or more depressions disposed on one or more surfaces of the one or more float covers.

54. The aeration system of claim 53, wherein one or more holes are cut into the one or more depressions, and receive one or more components, wherein the one or more components comprise ventilation components and/or power components.

55. An aeration system comprising:
one or more float modules, each of the one or more float modules comprising one or more pieces that fit together to form an internal cavity;
one or more diffusers that aerate and circulate water around the one or more float modules;
one or more photovoltaic (PV) panels on the one or more float modules that provide solar energy to power the aeration system; and
one or more pontoons that increase load capacity and/or stability of the aeration system,
wherein the one or more pontoons comprise one or more fins for blocking and/or directing aeration flow from underneath a bottom surface of the aeration system.

56. The aeration system of claim 55, wherein the one or more pontoons are rotatable to alter directional flow of the water.

57. The aeration system of claim 56, wherein the alteration of directional flow comprises blocking a flow of the water, allowing a flow of the water, and/or directing a flow of the water.

58. An aeration system comprising:
one or more float modules, each of the one or more float modules comprising one or more pieces that fit together to form an internal cavity;
one or more diffusers that aerate and circulate water around the one or more float modules;
one or more photovoltaic (PV) panels on the one or more float modules that provide solar energy to power the aeration system; and
a diffuser device that is self-leveling at a mid-water depth in-between a surface of a body of water and a bottom of the body of water,
wherein the diffuser device comprises:
a manifold;
a plurality of diffuser segments; and
a tube,
wherein the manifold is connected to (i) the plurality of diffuser segments, and (ii) the tube.

59. The aeration system of claim 58, wherein the tube is a vertical weighted or rigid tube.

60. The aeration system of claim 58, wherein the diffuser device further comprises a base plate attached underneath a plurality of diffuser segments, thereby preventing erosion beneath the diffuser device.

61. The aeration system of claim 58,
wherein the manifold and the plurality of diffuser segments are arranged in a horizontal plane that is perpendicular to the tube.

62. The aeration system of claim 58, wherein the plurality of diffuser segments that are adjustable in length.

63. An aeration system comprising:
one or more float modules, each of the one or more float modules comprising one or more pieces that fit together to form an internal cavity;
one or more diffusers that aerate and circulate water around the one or more float modules;
one or more photovoltaic (PV) panels on the one or more float modules that provide solar energy to power the aeration system; and
one or more electronic systems with a plurality of programmable settings,
wherein the plurality of programmable settings comprise data acquisition settings and operation settings, wherein the plurality of programmable settings are adjustable to prioritize a predetermined mode in a plurality of different modes when the aeration system is operating, and
wherein the one or more electronic systems are accessible via a wireless connection.

64. An aeration system comprising:
one or more float modules, each of the one or more float modules comprising one or more pieces that fit together to form an internal cavity;
one or more diffusers that aerate and circulate water around the one or more float modules;

one or more photovoltaic (PV) panels on the one or more float modules that provide solar energy to power the aeration system;
one or more electronic systems with a plurality of programmable settings, wherein the plurality of programmable settings comprise data acquisition settings and operation settings; and
a human-machine interface (HMI) accessible through one or more computing devices and/or one or more control panels disposed on the one or more float modules.

65. An aeration system comprising:
one or more float modules, each of the one or more float modules comprising one or more pieces that fit together to form an internal cavity;
one or more diffusers that aerate and circulate water around the one or more float modules;
one or more photovoltaic (PV) panels on the one or more float modules that provide solar energy to power the aeration system; and
one or more electronic systems with a plurality of programmable settings, wherein the plurality of programmable settings comprise data acquisition settings and operation settings,
wherein the operation settings comprise a setting programmed to run the aeration system only when dissolved oxygen in the water reaches a pre-determined level.

66. An aeration system comprising:
one or more float modules, each of the one or more float modules comprising one or more pieces that fit together to form an internal cavity;
one or more diffusers that aerate and circulate water around the one or more float modules;
one or more photovoltaic (PV) panels on the one or more float modules that provide solar energy to power the aeration system;
one or more electronic systems with a plurality of programmable settings, wherein the plurality of programmable settings comprise data acquisition settings and operation settings; and
one or more batteries, wherein the operation settings comprise a setting programmed to run the aeration system only when the one or more batteries reaches one or more pre-determined charge and/or voltage levels and to stop the aeration system when the one or more batteries reaches one or more second pre-determined charge and/or voltage levels.

67. An aeration system comprising:
one or more float modules, each of the one or more float modules comprising one or more pieces that fit together to form an internal cavity;
one or more diffusers that aerate and circulate water around the one or more float modules;
one or more photovoltaic (PV) panels on the one or more float modules that provide solar energy to power the aeration system; and
one or more electronic systems with a plurality of programmable settings, wherein the plurality of programmable settings comprise data acquisition settings and operation settings, and
wherein the operation settings comprise a setting programmed to run the aeration system only when available renewable energy reaches one or more pre-determined levels.

68. An aeration system comprising:
one or more float modules, each of the one or more float modules comprising one or more pieces that fit together to form an internal cavity;
one or more diffusers that aerate and circulate water around the one or more float modules;
one or more photovoltaic (PV) panels on the one or more float modules that provide solar energy to power the aeration system;
one or more electronic systems with a plurality of programmable settings, wherein the plurality of programmable settings comprise data acquisition settings and operation settings;
one or more batteries, and
one or more compressors,
wherein the operation settings comprise (i) a first setting programmed to prioritize charging the one or more batteries over powering one or more compressors up to a set battery voltage level and/or a set battery charge level, (ii) a second setting programmed to split available power between charging the one or more batteries and powering the one or more compressors, and/or (iii) a third setting programmed to power the one or more compressors to maximize aeration over charging the one or more batteries.

69. An aeration system comprising:
one or more float modules, each of the one or more float modules comprising one or more pieces that fit together to form an internal cavity;
one or more diffusers that aerate and circulate water around the one or more float modules;
one or more photovoltaic (PV) panels on the one or more float modules that provide solar energy to power the aeration system; and
one or more electronic systems with a plurality of programmable settings, wherein the plurality of programmable settings comprise data acquisition settings and operation settings,
wherein the operation settings comprise a setting programmed to provide additional power to a compressor beyond a predetermined power level, and/or powers the compressor outside of a predetermined time period, when a battery has met a predetermined charge level and renewable energy is still available.

70. An aeration system comprising:
one or more float modules, each of the one or more float modules comprising one or more pieces that fit together to form an internal cavity;
one or more diffusers that aerate and circulate water around the one or more float modules;
one or more photovoltaic (PV) panels on the one or more float modules that provide solar energy to power the aeration system; and
one or more electronic systems with a plurality of programmable settings, wherein the plurality of programmable settings comprise data acquisition settings and operation settings,
wherein the one or more electronic systems are configured to communicate with one or more external aeration systems, thereby coordinating operation of the aeration system with the one or more external aeration systems.

71. An aeration system comprising:
one or more float modules, each of the one or more float modules comprising one or more pieces that fit together to form an internal cavity;
one or more diffusers that aerate and circulate water around the one or more float modules; and one or more photovoltaic (PV) panels on the one or more float modules that provide solar energy to power the aeration system, wherein the aeration system (i) does not contain a battery-powered energy source for operating one or more compressors, and/or (ii) is powered directly by renewable energy.

72. An aeration system comprising:

one or more float modules, each of the one or more float modules comprising one or more pieces that fit together to form an internal cavity;

one or more diffusers that aerate and circulate water around the one or more float modules;

one or more photovoltaic (PV) panels on the one or more float modules that provide solar energy to power the aeration system; and one or more wind turbines to provide wind energy to power the aeration system, wherein the one or more wind turbines are mounted on the one or more float modules.

73. An aeration system comprising:

one or more float modules, each of the one or more float modules comprising one or more pieces that fit together to form an internal cavity;

one or more diffusers that aerate and circulate water around the one or more float modules;

one or more photovoltaic (PV) panels on the one or more float modules that provide solar energy to power the aeration system;

one or more batteries;

one or more primary compressor loads, and one or more secondary loads that are powered with excess power not required to (i) operate the one or more primary compressor loads, and/or (ii) charge the one or more batteries.

74. The aeration system of claim 73, wherein the one or more secondary loads comprise one or more heating elements to heat the one or more PV panels, one or more pumps to remove water from the internal cavity and/or a surface of the one or more float modules, one or more bird deterrents, one or more solar panel cleaning devices, one or more water quality sensors, one or more additional compressors, and/or one or more automatic feeders.

75. The aeration system of claim 73, wherein the one or more secondary loads comprise one or more power outlets.

76. An aeration system comprising:

one or more float modules, each of the one or more float modules comprising one or more pieces that fit together to form an internal cavity;

one or more diffusers that aerate and circulate water around the one or more float modules;

one or more photovoltaic (PV) panels on the one or more float modules that provide solar energy to power the aeration system; and one or more bird deterrents mounted to the one or more float modules.

77. An aeration system comprising:

one or more float modules, each of the one or more float modules comprising one or more pieces that fit together to form an internal cavity;

one or more diffusers that aerate and circulate water around the one or more float modules; and one or more photovoltaic (PV) panels on the one or more float modules that provide solar energy to power the aeration system, wherein the one or more pieces comprise one or more double-walled float bottoms, wherein the one or more double-walled float bottoms comprise an exterior wall and an interior wall, and wherein the interior wall surrounds at least a portion of an interior cavity.

78. The aeration system of claim 77, wherein the interior wall comprises a floor on which rest one or more components disposed within the interior cavity, wherein the floor comprises (i) one or more partitions for positioning one or more of the one or more components, and/or (ii) one or more depressions in which at least one of the one or more components is disposed.

79. The aeration system of claim 77, wherein the exterior wall and the interior wall are separated by a space that is compartmentalized to contain and isolate any water that enters into the space.

80. The aeration system of claim 77, wherein the exterior wall is shaped so as to disperse (i) air bubbles in the water from an underside of the exterior wall, and (ii) flow of the water from the underside of the exterior wall.

* * * * *